United States Patent
Takagi et al.

(10) Patent No.: US 6,259,790 B1
(45) Date of Patent: Jul. 10, 2001

(54) SECRET COMMUNICATION AND AUTHENTICATION SCHEME BASED ON PUBLIC KEY CRYPTOSYSTEM USING N-ADIC EXPANSION

(75) Inventors: Tsuyoshi Takagi; Shozo Naito, both of Tokyo (JP)

(73) Assignee: Nippon Telegraph and Telephone Corporation (JP)

( * ) Notice: Subject to any disclaimer, the term of this patent is extended or adjusted under 35 U.S.C. 154(b) by 0 days.

(21) Appl. No.: 08/907,852

(22) Filed: Aug. 8, 1997

(30) Foreign Application Priority Data

Aug. 9, 1996 (JP) .................................... 8-211654
Jun. 11, 1997 (JP) .................................... 9-154095
Jun. 13, 1997 (JP) .................................... 9-156903

(51) Int. Cl.$^7$ ........................................ H04L 9/30
(52) U.S. Cl. .............................. 380/30; 380/28
(58) Field of Search ........................ 380/30, 28

(56) References Cited

PUBLICATIONS

Weyl, Algebraic Theory of Numbers, 1948, pp. 94–97.*
Weisstein, The CRC Concise Encyclopedia of Mathematics, 1999, pp. 1295.*
Rabin, M. O.; "Digitalized Signatures and Public–Key Functions as Intractable as Factorization"; p. 1–16; undated.
Koyama, K.; "Security and Unique Decipherability of Two–Dimensional Public Key Cryptosystems"; The Transactions of the IEICE, vol. E 73, No. 7; p. 1058–1067; Jul. 1990.
Coopersmith, D.; "Finding a Small Root of a Univariate Modular Equation", Ueli Maurer (Ed.): EUROCRYPT '96 Proceedings, pp. 155–165; 1996.
Coopersmith, D., Franklin, M., Patarin, J., and Reiter, M.; "Low–Exponent RSA with Related Messages", Ueli Maurer (Ed.): EUROCRYPT '96 Proceedings, pp. 1–9; 1996.
Hastad, J.; "Solving Simultaneous Modular Equations"; Siam J . Comput. vol. 17, No. 2, pp. 336–341; Apr. 1988.
Rivest, R. L., Shamir, A., and Adleman, L.; "A Method for Obtaining Digital Signatures and Public–Key Cryptosystems"; Communications of the ACM, vol, 21(2), pp. 120–126; Feb. 1978.

* cited by examiner

Primary Examiner—Gilberto Barron, Jr.
Assistant Examiner—Jeffrey Scott Leaning
(74) Attorney, Agent, or Firm—Kilpatrick Stockton LLP

(57) ABSTRACT

A secret communication and authentication scheme based on a public key cryptosystem in which a decryption speed is improved while maintaining a security level. In the RSA type secret communication, a plaintext is expressed in a form of a k-digit base n number and a ciphertext is obtained by applying a calculation using the first public key n and the second public key e to the base n number and transmitted. Then, from the received ciphertext, a lowest digit of the base n number is decrypted by using the first public key n and the second secret key d, upper digits of the base n number are sequentially decrypted by using a decrypted value of the lowest digit of the base n number at the receiver side, and the plaintext is recovered by using decrypted values of respective digits of the base n number. The Rabin type secret communication can also be realized by the similar scheme. Moreover, the same principle of the base n pubic key cryptosystem can also be used in realizing the RSA type or the Rabin type Authentication.

50 Claims, 40 Drawing Sheets

FIG.6

| DATA NO. | DATA CONTENT | ATTRIBUTE |
|---|---|---|
| 1 | SECRET KEY SK1a p | INPUT |
| 2 | SECRET KEY SK1b q | INPUT |
| 3 | LEAST COMMON MULTIPLE L | WORK AREA |
| 4 | PUBLIC KEY PK2 e | OUTPUT |
| 5 | SECRET KEY SK2 d | OUTPUT |

FIG.8

| DATA NO. | DATA CONTENT | ATTRIBUTE |
|---|---|---|
| 1 | PUBLIC KEY PK1 n | INPUT |
| 2 | PUBLIC KEY PK2 e | INPUT |
| 3 | NUMBER OF PARTIAL BLOCKS k | OUTPUT |
| 4 | PARTIAL PLAINTEXT LENGTH $[\log_2 n]$ | INPUT |
| 5 | PLAINTEXT M(M') | INPUT |
| 6 | PLAINTEXT BLOCK $M_0$ | WORK AREA |
| ... | ... | ... |
| 5+k | PLAINTEXT BLOCK $M_{k-1}$ | WORK AREA |
| 5+k+1 | CIPHERTEXT C | OUTPUT |

FIG.10

| DATA NO. | DATA CONTENT | ATTRIBUTE |
|---|---|---|
| 1 | PUBLIC KEY PK1, PK2 n, e | INPUT |
| 2 | SECRET KEY SK2 d | INPUT |
| 3 | NUMBER OF PARTIAL BLOCKS k | INPUT |
| 4 | PARTIAL PLAINTEXT LENGTH $[\log_2 n]$ | INPUT |
| 5 | $K_0$ | WORK AREA |
| ... | ... | ... |
| 4+k | $K_{k-1}$ | WORK AREA |
| 4+k+1 | $K'_0$ | WORK AREA |
| ... | ... | ... |
| 4+2k | $K'_{k-1}$ | WORK AREA |
| 4+2k+1 | CIPHERTEXT C | INPUT |
| 4+2k+2 | PLAINTEXT BLOCK $M_0$ | WORK AREA |
| ... | ... | ... |
| 4+3k+1 | PLAINTEXT BLOCK $M_{k-1}$ | WORK AREA |
| 4+3k+2 | PLAINTEXT M | OUTPUT |

FIG.16

| DATA NO. | DATA CONTENT | ATTRIBUTE |
|---|---|---|
| 1 | PUBLIC KEY PK1, PK2 n, e | INPUT |
| 2 | SECRET KEY SK2 d | INPUT |
| 3 | NUMBER OF PARTIAL BLOCKS k | INPUT |
| 4 | PARTIAL PLAINTEXT LENGTH $[\log_2 n]$ | INPUT |
| 5 | $K_0$ | WORK AREA |
| ... | ... | ... |
| 4+k | $K_{k-1}$ | WORK AREA |
| 4+k+1 | $K'_0$ | WORK AREA |
| ... | ... | ... |
| 4+2k | $K'_{k-1}$ | WORK AREA |
| 5+2k | AUTHENTICATION MESSAGE M | INPUT |
| 6+2k | AUTHENTICATOR h(M) | WORK AREA |
| 7+2k | AUTHENTICATOR BLOCK $h(C)_0$ | OUTPUT |
| 8+2k | AUTHENTICATOR BLOCK $h(C)_1$ | OUTPUT |
| ... | ... | ... |
| 6+3k | AUTHENTICATOR BLOCK $h(C)_{k-1}$ | OUTPUT |

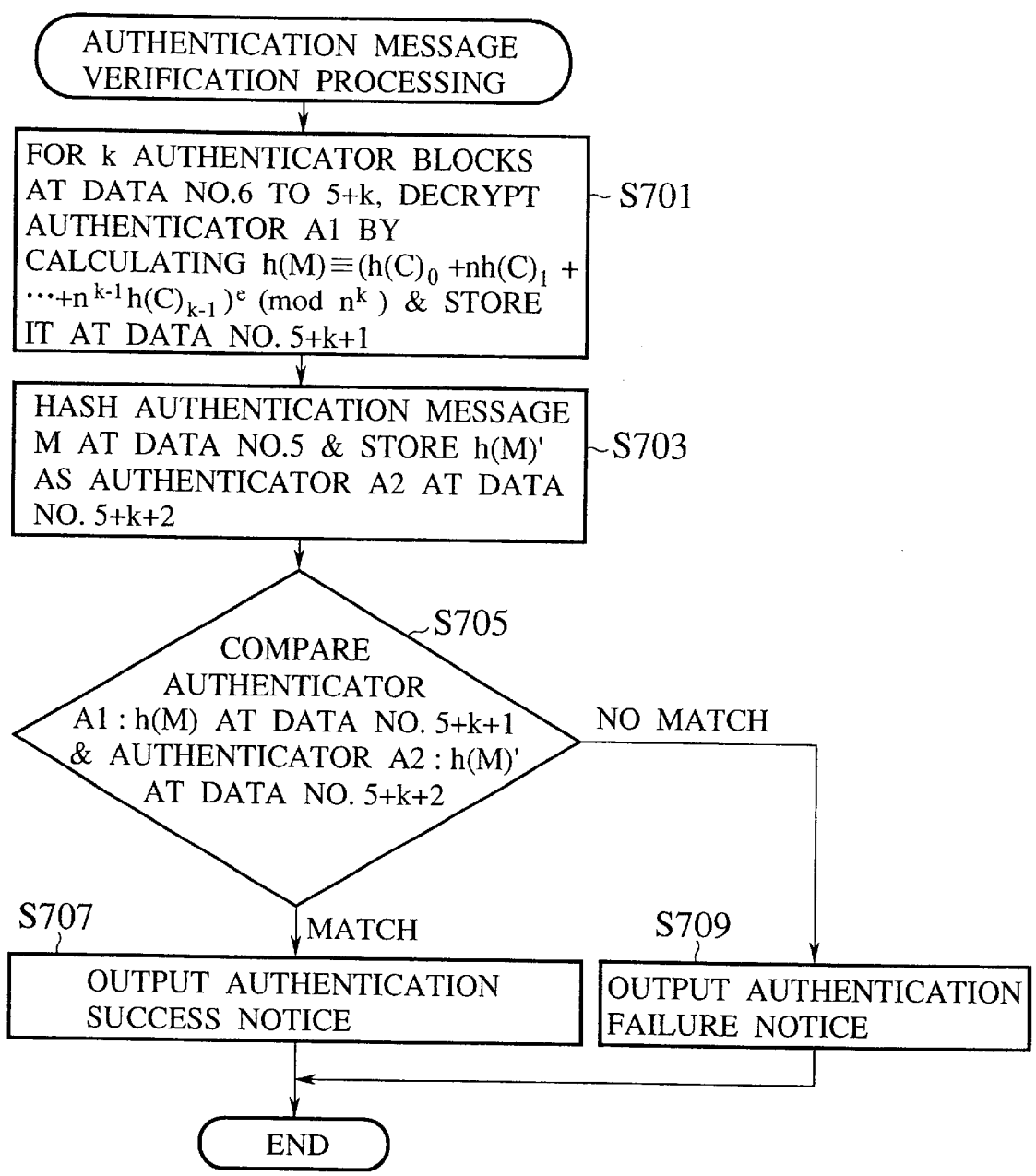

FIG.18

| DATA NO. | DATA CONTENT | ATTRIBUTE |
|---|---|---|
| 1 | PUBLIC KEY PK1 n | INPUT |
| 2 | PUBLIC KEY PK2 e | INPUT |
| 3 | NUMBER OF PARTIAL BLOCKS k | INPUT |
| 4 | PARTIAL PLAINTEXT LENGTH $[\log_2 n]$ | INPUT |
| 5 | AUTHENTICATION MESSAGE M | INPUT |
| 6 | AUTHENTICATOR BLOCK $h(C)_0$ | INPUT |
| 7 | AUTHENTICATOR BLOCK $h(C)_1$ | INPUT |
| ... | ... | ... |
| 5+k | AUTHENTICATOR BLOCK $h(C)_{k-1}$ | INPUT |
| 5+k+1 | AUTHENTICATOR A1 h(M) | WORK AREA |
| 5+k+2 | AUTHENTICATOR A2 h(M)' | WORK AREA |

FIG.21

| DATA NO. | DATA CONTENT | ATTRIBUTE |
|---|---|---|
| 1 | PUBLIC KEY PK n | INPUT |
| 2 | NUMBER OF PARTIAL BLOCKS k | OUTPUT |
| 3 | PARTIAL PLAINTEXT LENGTH $[\log_2 n]$ | INPUT |
| 4 | PLAINTEXT M(M') | INPUT |
| 5 | PLAINTEXT BLOCK $M_0$ | WORK AREA |
| ... | ... | ... |
| 4+k | PLAINTEXT BLOCK $M_{k-1}$ | WORK AREA |
| 4+k+1 | CIPHERTEXT C | OUTPUT |

FIG.24

| DATA NO. | DATA CONTENT | ATTRIBUTE |
|---|---|---|
| 1 | PUBLIC KEY PK n | INPUT |
| 2 | SECRET KEY SK p, q | INPUT |
| 3 | NUMBER OF PARTIAL BLOCKS k | OUTPUT |
| 4 | PARTIAL PLAINTEXT LENGTH $[\log_2 n]$ | INPUT |
| 5 | CIPHERTEXT C | INPUT |
| 6 | PLAINTEXT BLOCK $M_0$ | WORK AREA |
| 7 | PLAINTEXT BLOCK $M_1$ | WORK AREA |
| ... | ... | ... |
| 6+i | PLAINTEXT BLOCK $M_i$ | WORK AREA |
| ... | ... | ... |
| 6+k-1 | PLAINTEXT BLOCK $M_{k-1}$ | WORK AREA |
| 6+k | PLAINTEXT M | OUTPUT |

FIG.29

| DATA NO. | DATA CONTENT | ATTRIBUTE |
|---|---|---|
| 1 | PUBLIC KEY PK n | INPUT |
| 2 | SECRET KEY SK p, q | INPUT |
| 3 | NUMBER OF PARTIAL BLOCKS k | INPUT |
| 4 | PARTIAL PLAINTEXT LENGTH $[\log_2 n]$ | INPUT |
| 5 | AUTHENTICATION MESSAGE M | INPUT |
| 6 | AUTHENTICATOR h(M) | WORK AREA |
| 7 | AUTHENTICATOR BLOCK $h(C)_0$ | OUTPUT |
| 8 | AUTHENTICATOR BLOCK $h(C)_1$ | OUTPUT |
| ... | ... | ... |
| 6+k | AUTHENTICATOR BLOCK $h(C)_{k-1}$ | OUTPUT |

FIG.31

| DATA NO. | DATA CONTENT | ATTRIBUTE |
|---|---|---|
| 1 | PUBLIC KEY PK n | INPUT |
| 2 | | UNUSED |
| 3 | NUMBER OF PARTIAL BLOCKS k | INPUT |
| 4 | PARTIAL PLAINTEXT LENGTH $[\log_2 n]$ | INPUT |
| 5 | AUTHENTICATION MESSAGE M | INPUT |
| 6 | AUTHENTICATOR BLOCK $h(C)_0$ | INPUT |
| 7 | AUTHENTICATOR BLOCK $h(C)_1$ | INPUT |
| ... | ... | ... |
| 5+k | AUTHENTICATOR BLOCK $h(C)_{k-1}$ | INPUT |
| 5+k+1 | AUTHENTICATOR A1 h(M) | WORK AREA |
| 5+k+2 | AUTHENTICATOR A2 h(M)' | WORK AREA |

FIG.33

| DATA NO. | DATA CONTENT | ATTRIBUTE |
|---|---|---|
| 1 | PUBLIC KEY PK1, PK2 n, e | INPUT |
| 2 | SECRET KEY SK2 d | INPUT |
| 3 | NUMBER OF PARTIAL BLOCKS k | INPUT |
| 4 | PARTIAL PLAINTEXT LENGTH $[\log_2 n]$ | INPUT |
| 5 | CIPHERTEXT C | INPUT |
| 6 | PLAINTEXT BLOCK $M_0$ | WORK AREA |
| 7 | LOOP COUNTER i (INITIAL VALUE 1) | WORK AREA |
| 8 | $A_{i-2}$ (INITIAL VALUE 0) | WORK AREA |
| 9 | $A_{i-1}$ | WORK AREA |
| 10 | $F_{i-1}$ | WORK AREA |
| 11 | $E_i$ | WORK AREA |
| 12 | $B_i$ | WORK AREA |
| 13 | PLAINTEXT BLOCK $M_1$ | WORK AREA |
| ... | ... | ... |
| 12+k-1 | PLAINTEXT BLOCK $M_{k-1}$ | WORK AREA |
| 12+k | PLAINTEXT M | OUTPUT |

FIG.35

| DATA NO. | DATA CONTENT | ATTRIBUTE |
|---|---|---|
| 1 | PUBLIC KEY PK1, PK2 n, e | INPUT |
| 2 | SECRET KEY SK2 d | INPUT |
| 3 | NUMBER OF PARTIAL BLOCKS k | INPUT |
| 4 | PARTIAL PLAINTEXT LENGTH $[\log_2 n]$ | INPUT |
| 5 | AUTHENTICATION MESSAGE M | INPUT |
| 6 | AUTHENTICATOR A1 h(M) | WORK AREA |
| 7 | AUTHENTICATOR BLOCK $h(C)_0$ | WORK AREA |
| 8 | LOOP COUNTER i (INITIAL VALUE 1) | WORK AREA |
| 9 | $A_{i-2}$ (INITIAL VALUE 0) | WORK AREA |
| 10 | $A_{i-1}$ | WORK AREA |
| 11 | $F_{i-1}$ | WORK AREA |
| 12 | $E_i$ | WORK AREA |
| 13 | $B_i$ | WORK AREA |
| 14 | AUTHENTICATOR BLOCK $h(C)_1$ | WORK AREA |
| ... | ... | ... |
| 13+k-1 | AUTHENTICATOR BLOCK $h(C)_{k-1}$ | WORK AREA |
| 13+k | AUTHENTICATOR A2 h(M)' | OUTPUT |

FIG.37

| DATA NO. | DATA CONTENT | ATTRIBUTE |
|---|---|---|
| 1 | PUBLIC KEY PK n | INPUT |
| 2 | SECRET KEY SK p, q | INPUT |
| 3 | NUMBER OF PARTIAL BLOCKS k | INPUT |
| 4 | PARTIAL PLAINTEXT LENGTH $[\log_2 n]$ | INPUT |
| 5 | CIPHERTEXT C | INPUT |
| 6 | PLAINTEXT BLOCK $M_0$ | WORK AREA |
| 7 | LOOP COUNTER i (INITIAL VALUE 1) | WORK AREA |
| 8 | $A_{i-2}$ (INITIAL VALUE 0) | WORK AREA |
| 9 | $A_{i-1}$ | WORK AREA |
| 10 | $F_{i-1}$ | WORK AREA |
| 11 | $E_i$ | WORK AREA |
| 12 | $B_i$ | WORK AREA |
| 13 | PLAINTEXT BLOCK $M_1$ | WORK AREA |
| ... | ... | ... |
| 12+k-1 | PLAINTEXT BLOCK $M_{k-1}$ | WORK AREA |
| 12+k | PLAINTEXT M | OUTPUT |

FIG.39

| DATA NO. | DATA CONTENT | ATTRIBUTE |
|---|---|---|
| 1 | PUBLIC KEY n | INPUT |
| 2 | | UNUSED |
| 3 | NUMBER OF PARTIAL BLOCKS k | INPUT |
| 4 | PARTIAL PLAINTEXT LENGTH $[\log_2 n]$ | INPUT |
| 5 | AUTHENTICATION MESSAGE M | INPUT |
| 6 | AUTHENTICATOR A1 h(M) | WORK AREA |
| 7 | AUTHENTICATOR BLOCK $h(C)_0$ | WORK AREA |
| 8 | LOOP COUNTER i (INITIAL VALUE 1) | WORK AREA |
| 9 | $A_{i-2}$ (INITIAL VALUE 0) | WORK AREA |
| 10 | $A_{i-1}$ | WORK AREA |
| 11 | $F_{i-1}$ | WORK AREA |
| 12 | $E_i$ | WORK AREA |
| 13 | $B_i$ | WORK AREA |
| 14 | AUTHENTICATOR BLOCK $h(C)_1$ | WORK AREA |
| ... | ... | ... |
| 13+k-1 | AUTHENTICATOR BLOCK $h(C)_{k-1}$ | WORK AREA |
| 13+k | AUTHENTICATOR A2 h(M)' | OUTPUT |

FIG.40

| | RSA TYPE | RABIN TYPE |
|---|---|---|
| p, q | (SECRET KEY) | SECRET KEY p, q |
| n=pq | PUBLIC KEY n | PUBLIC KEY n |
| e | PUBLIC KEY e | — |
| d | SECRET KEY d | — |
| ENCRYPTION FUNCTION | $C \equiv M^e \pmod{n^k}$ | $C \equiv M^2 \pmod{n^k}$ |
| DECRYPTION FUNCTION | $M \equiv C^d \pmod{n}$ | SOLVING SIMULTANEOUS QUADRATIC MODULAR EQUATIONS $x^2 \equiv C \pmod{p}$ $x^2 \equiv C \pmod{q}$ |
| CHARACTERISTIC | ENCRYPTION SPEED : LOW<br>DECRYPTION SPEED : LOW | ENCRYPTION SPEED : HIGH<br>DECRYPTION SPEED : HIGH |

$ed \equiv 1 \pmod{L}$, $L = \text{LCM}(p-1, q-1)$

SECRET COMMUNICATION AND AUTHENTICATION SCHEME BASED ON PUBLIC KEY CRYPTOSYSTEM USING N-ADIC EXPANSION

BACKGROUND OF THE INVENTION

1. Field of the Invention

The present invention relates to a public key cryptosystem in which an encryption key is publicly disclosed while a decryption key is kept in secret, and more particularly, to a secret communication and authentication scheme based on a public key cryptosystem which can improve a decryption speed while maintaining an equivalent security level as the known public key cryptosystem such as RSA (Rivest-Shamir-Adleman) cryptosystem and Rabin cryptosystem and resolving problems associated with the known public key cryptosystem.

2. Description of the Background Art

In the field of communication, the cryptographic techniques are indispensable for protecting communication contents from a wiretapping or a forgery. In particular, the public key cryptosystem which only requires a simple key management is effective and has been widely used. The representative public key cryptosystems include the RSA cryptosystem which uses the modular exponent calculation and the Rabin cryptosystem which uses the encryption function in a form of a quadratic polynomial in modulo a product of two prime numbers, both of which are already in practical use.

Here, the RSA cryptosystem and the Rabin cryptosystem will be briefly described in this order. Note that, in the following description, (mod N) denotes a calculation in modulo N, $\equiv$ denotes a congruence, LCM denotes the least common multiplier, GCD denotes the greatest common divisor, [A] denotes the Gaussian symbol for the largest integer not exceeding a number A, and $\sqrt{(B)}$ denotes a square root of a number B.

[Basic Principles of RSA Cryptosystem]

An encryption key of the RSA cryptosystem is given by a set (e, N) and a corresponding decryption key is given by a set (d, N), where e and N are public keys and d is a secret key. N is a product of two prime numbers (N=pq), and a set of prime numbers p and q for generating N is also referred to as a secret key.

Denoting a plaintext by M and a ciphertext by C, algorithms for the encryption E and the decryption D can be expressed by the following equations (1) and (2).

$$C = E(M) = M^e \pmod{N} \qquad (1)$$

$$M = D(C) = C^d \pmod{N} \qquad (2)$$

Here, it is assumed that M and C are integers in a range between 0 and N−1. If the original message is larger than N, the original message is to be divided into blocks of size N and the encryption and the decryption are to be applied block by block.

The encryption and the decryption are the one-to-one and onto mapping. Consequently, when M and C are represented by M for short, the following equation (3) holds.

$$D(E(M)) = E(D(M)) = M \qquad (3)$$

More specifically, the following equation (4) holds.

$$M^{ed} \equiv M \pmod{N} \qquad (4)$$

The procedure for generating the cipher keys e, d and N such that the equation (4) holds for all M is as follows.

<Key Generation in RSA Cryptosystem>

First, arbitrary two large and mutually different prime numbers p and q are selected, and their product N=pq is calculated (first step).

Next, the least common multiplier L of (p−1) and (q−1) is calculated, and an arbitrary small integer e which is relatively prime with respect to L and smaller than L is selected (second step). That is:

$$L = LCM(p-1, q-1) \qquad (5)$$

$$GCD(e, L) = 1, \ 1 < e < L \qquad (6)$$

Next, using e and L obtained at the second step, the following congruence (7) is solved to obtain d (third step).

$$ed \equiv 1 \pmod{L} \qquad (7)$$

In order to obtain d from the congruence (7), it is possible to use the Euclidean algorithm.

Note that this generation procedure selects e at the second step first and then calculate d at the third step, but it is also possible to select d first and then calculate e if desired.

<Authentication Using RSA Cryptosystem>

The authenticated communication using the RSA cryptosystem is carried out as follows.

First, a sender hashes an authentication message by using a hash function h so as to obtain an authenticator h(M).

Next, the authenticator h(M) is encrypted by using the sender's secret key d so as to obtain an encrypted authenticator S.

Next, a set of the encrypted authenticator S and the authentication message M are sent from the sender to a receiver. That is:

$$S \equiv (h(M)^d \pmod{N} \qquad (8)$$

When this set of the encrypted authenticator S and the authentication message M is received, the receiver decrypts the encrypted authenticator S by using the public key e of the sender, so as to obtain the authenticator h(M). That is:

$$h(M) \equiv (S)^e \pmod{N} \qquad (9)$$

Next, the received authentication message M is hashed by using the hash function h so as to obtain an authenticator h(M)'. Then, the decrypted authenticator h(M) and the authenticator h(M)' obtained by hashing the authentication message M are compared to judge the authenticity. Namely, when they coincide the authentication message is judged as authentic and when they don't the authentication message is judged as not authentic.

In this manner, the RSA type public key cryptosystem device can also be used as an authenticated communication device by applying the public key calculation and the secret key calculation in reverse order.

Note that it is also possible to combine this authenticated communication with the secret communication so as to realize the authenticated secret communication in which a set of the encrypted authenticator S and the authentication message M is further encrypted by using the public key of the receiver.

[Basic Principles of Rabin Cryptosystem]

An encryption key of the Rabin cryptosystem is given by a set (b, N) and a decryption key is given by a set (b, p, q), where b and N are public keys and p and q are secret keys and N=pq.

Denoting a plaintext by M and a ciphertext by C, algorithm for the encryption E can be expressed by the following equation (10).

$$C=E(M)=M(M+b) \pmod{N} \tag{10}$$

On the other hand, algorithm for the decryption D corresponds to the solving of the following equation (11) for M.

$$M^2+Mb-C\equiv 0 \pmod{N} \tag{11}$$

Here, N is a product of two large prime numbers p and q, that is:

$$N=pq \tag{12}$$

so that the above equation (11) is equivalent to the following simultaneous congruences (13) and (14).

$$M^2+Mb-C\equiv 0 \pmod{p} \tag{13}$$

$$M^2+Mb-C\equiv 0 \pmod{q} \tag{14}$$

In other words, the decryption in the Rabin cryptosystem can be carried out only by an entity which knows the secret keys p and q. Also, the security of the Rabin cryptosystem relies on the difficulty in factoring N.

The decryption D amounts to obtaining M which simultaneously satisfies both congruences (13) and (14), and can be expressed by the following equations (15) and (16).

$$M=D(C)=-b/2\pm\sqrt{((b/2)^2+C)} \pmod{p} \tag{15}$$

$$M=D(C)=-b/2\pm\sqrt{((b/2)^2+C)} \pmod{q} \tag{16}$$

Here, b/2 (mod p) in the equation (15) represents an integer s which satisfies 2s≡b (mod p). Note that 2 and p are relatively prime so that it is always possible to obtain only one s.

Also, $\sqrt{((b/2)^2+C)}$ (mod p) in the equation (15) represents a non-negative integer t which satisfies $t^2\equiv(b/2)^2+C$ (mod p). Assuming that t exists and p is a prime number in a form of 4α+3 (α: integer), $(b/2)^2+C$ becomes the quadratic residue in mod p so that t can be easily obtained by the following equation (17).

$$t=((b/2)^2+C)^{\alpha+1} \pmod{p} \tag{17}$$

The equation (16) can also be solved similarly as the equation (15).

The encryption function E of the Rabin cryptosystem is defined for all integers in a range of [0, N−1] as should be apparent from the above equation (10), so that every plaintext can be encrypted. Also, the encryption function E is a single-valued function, so that a ciphertext C0 corresponding to a plaintext M0 can be determined uniquely. However, the decryption function D is a multi-valued function, so that M0 is not necessarily determined uniquely even when C0 corresponding to M0 is decrypted.

To cope with this problem, a meaningful attribute information (such as a sender ID, a receiver ID, a date, etc.) is included in the original plaintext M0. Then, the receiver determines the true plaintext as a message containing this attribute information among decrypted messages $M_i$ (1≦i≦4).

<Key Generation in Rabin Cryptosystem>

The key generation in the Rabin cryptosystem is similar to the first step alone of the key generation in the RSA cryptosystem described above in that arbitrary two large and mutually different prime numbers p and q are selected, and their product N=pq is calculated. In addition, b which satisfies 0≦b≦N is determined. Then, p and q are set as the secret keys while N and b are set as the public keys.

<Authentication Using Rabin Cryptosystem>

The decryption function D of the Rabin cryptosystem is defined for a part of integers in a range of [0, N−1]. That is, in the Rabin cryptosystem, it is not necessarily possible to realize the authenticated communication for an arbitrary plaintext M (0≦M≦N−1). Here, a condition required for realizing the authenticated communication is that the calculations of the equations (15) and (16) can be defined, or more specifically, that $(b/2)^2+M$ becomes the quadratic residue in mod p and mod q.

In terms of the quadratic residue symbols (also called Legendre symbols), this condition can be expressed as that the following congruences (18) and (19) hold.

$$\left(\frac{((b/2)^2+M)}{p}\right)\equiv 1 \tag{18}$$

$$\left(\frac{((b/2)^2+M)}{q}\right)\equiv 1 \tag{19}$$

When a digital signature transformation D is applied to a certain plaintext M0 for which the authenticated communication is possible, each one of four signed messages $S_1$, $S_2$, $S_3$ and $S_4$ is obtained at nearly equal probability of 1/4. The plaintext M0 can be recovered by applying the recovery processing to any of these four signed messages, so that it suffices to carry out a communication using any one signed message alone.

Next, a measure to be taken in order to make it possible to attach a digital signature to an arbitrary plaintext M (0≦M≦N−1) will be described.

To this end, it is necessary to apply a certain type of transformation $f_j$ to the plaintext M first. That is:

$$M_j=f_j(M), j=0, 1, 2 \ldots \tag{20}$$

where f0 represents a case of no transformation. As a concrete example of $f_j$, it is possible to use a function defined by the following equation (21) for example.

$$f_j(M)=M+j \tag{21}$$

Then, the necessary measure can be taken by the following procedure.

First, the sender checks whether $M_j$ satisfies the congruences (18) and (19) or not by setting j=0. If not, the checking of whether $M_j$ satisfies the same condition or not is repeated by sequentially updating j to j+1. By the repeated trials, the transformation that satisfies the condition can be found by checking four times in average, as can be seen from the following equation (22).

$$4=\sum_{i=1}^{\infty} i(1/4)(3/4)^{i-1} \tag{22}$$

The obtained transformation is denoted as $f_j^*$ and the plaintext after the transformation is denoted as $M_j^*$.

Next, the sender sends a signed message S (=$D(M_j^*)$) to the receiver by attaching $f_j^*$ thereto. The receiver recovers $M_j^*$ from S by using the public key, and also obtains M by further applying an inverse function $f_j^{*-1}$ of $f_j^*$ to $M_j^*$. If M is a meaningful information, the authenticity of the sender can be verified.

Note that it is also possible to realize the authenticated communication using the Rabin type cryptosystem similarly as in a case of the RSA type cryptosystem described above, by sending a set of the authentication message M and the encrypted authenticator S obtained by hashing the authentication message M and encrypting the hashed authenticator h(M) by using the sender's secret key from the sender to the receiver, and judging the authenticity at the receiver side by comparing the decrypted authenticator h(M) and the authenticator $h(M)^o$ obtained by hashing the authentication message M.

In this manner, the Rabin type public key cryptosystem device can also be used as an authenticated communication device by applying the public key calculation and the secret key calculation in reverse order.

Now, in general, the performance of the cryptographic technique is evaluated in terms of the security level against an attack that attempts to break the cryptosystem, and the speed of encryption/decryption. The cryptosystem with a high security level and a fast encryption/decryption speed can be considered as an excellent cryptosystem.

The security of the public key cryptosystem such as the RSA cryptosystem and the Rabin cryptosystem is based on the fact that it is difficult to obtain the secret key that functions as the decryption key from the public key that functions as the encryption key because of an enormous amount of calculations required.

For the RSA cryptosystem, it has been shown that the plaintext can be obtained from the ciphertext if the public key can be factorized (see, [1] R. L, Rivest, A. Shamir and L. Adleman: "A Method for Obtaining Digital Signatures and Public-Key Cryptosystems", Comm. ACM, Vol. 21, No. 2, pp. 120–126 (1978)).

Thus the security of the public key cryptosystem such as the RSA cryptosystem relies on the computational difficulty in obtaining the secret key from the public key. By increasing a size of the public key, the security level can also be increased accordingly.

On the other hand, the RSA cryptosystem requires the higher degree modular exponent calculations, so that a major drawback of the RSA cryptosystem has been the fact that an amount of required calculations is large and the encryption/decryption is time consuming.

In this regard, the encryption/decryption can be made faster by reducing an amount of the modular exponent calculations, but this can only be done by reducing a size of the public key and this in turn leads to a lowering of the security level of the cryptosystem.

For example, when the exponent factor of the cryptosystem given by the public key e is small, it has been shown that the RSA cryptosystem can be easily cryptanalyzed (see, [2] J. Hastad: "Solving simultaneous Modular Equations", SIAM Journal of Computing, Vol. 17, No. 2, pp. 336–341 (1988); [3] D. Coppersmith, M. Franklin, J. Patarin and M. Reiter: "Low-Exponent RSA with Related Messages", Advances in Cryptology—EUROCRYPT '96 Proceedings, LNCS 1070, pp. 1–9 (1996); [4] D. Coppersmith, "Finding a Small Root of a Univariate Modular Equation" Advances in Cryptology—EUROCRYPT '96 Proceedings, LNCS 1070, pp. 155–165 (1996)). In practice, this situation corresponds to a case of sending the same plaintext to plural correspondents (a case of multicast communication), a case of having a polynomial relationship between two plaintexts, a case of using a small number of bits in the plaintext, etc.

For the Rabin cryptosystem, the fact that obtaining the original plaintext from the ciphertext alone is computationally equivalent to being able to factorize the public key has been shown (see, [5] M. O. Rabin: "Digitalized Signatures and Public-Key Functions as Intractable as Factorization", MIT Technical Report MIT/LCS/TR-212 (1979)).

Also, the cryptosystem extending the Rabin cryptosystem into two dimensions has been proposed (see, [6] K. Koyama: "Security and Unique Decipherability of Two-Dimensional Public Key Cryptosystems". IEICE Transactions, Vol. E73, No. 7, pp. 1058–1067 (1990)).

The characteristic of the Rabin cryptosystem is that the encryption is fast. However, in the known public key cryptosystem including the Rabin cryptosystem, in a case of carrying out a secret communication of the plaintext with a data length exceeding that of the public key, it has been necessary to divide the plaintext into blocks in the size of the public key (or twice the size of the public key in two dimensional case) and encrypt each block separately. In other words, a length of the public key dictated a unit of secret communication.

Also, the Rabin cryptosystem has been associated with a drawback that it is very weak against the partial cryptanalysis. For example, it has also shown that the Rabin cryptosystem can be easily cryptanalyzed in a case of multicast communication, a case of having a polynomial relationship between two plaintexts, a case of using a small number of bits in the plaintext, etc. (see references [2], [3] and [4] quoted above).

Thus the known cryptosystems have been associated with a problem that the security and the speed are not compatible with each other because a higher security level requires a larger key size but a larger key size implies a lower encryption/decryption speed.

SUMMARY OF THE INVENTION

It is therefore an object of the present invention to provide a secret communication and authentication scheme based on a public key cryptosystem which can considerably improve a decryption speed while maintaining an equivalent security level as the known public key cryptosystem such as RSA cryptosystem and Rabin cryptosystem.

It is another object of the present invention to provide a secret communication and authentication scheme based on a public key cryptosystem which enables a single apparatus to carry out both the secret communication and the authentication.

It is another object of the present invention to provide a secret communication and authentication scheme based on a public key cryptosystem which can resolve the problem associated with the known public key cryptosystem such as RSA cryptosystem and Rabin cryptosystem regarding the fact that a security level of the cryptosystem is considerably lowered in a case of multicast communication, a case of having a polynomial relationship between two plaintexts, a case of using a small number of bits in the plaintext, etc.

According to one aspect of the present invention there is provided a secret communication method based on a base n public key cryptosystem using a first secret key formed by two prime numbers p and q, a second secret key d, a first public key n=pq, a second public key e, and a number of partial blocks k which is an integer greater than or equal to 2, the method comprising the steps of: expressing a plaintext in a form of a k-digit base n number at a sender side; obtaining a ciphertext in which the plaintext is encrypted by applying a calculation using the first public key n and the second public key e to the base n number, and transmitting the ciphertext from the sender side to a receiver side; receiving the ciphertext and decrypting a lowest digit of the base n number from the ciphertext by using the first public key n and the second secret key d at the receiver side; sequentially decrypting upper digits of the base n number by using a decrypted value of the lowest digit of the base n number at the receiver side; and recovering the plaintext by using decrypted values of respective digits of the base n number at the receiver side.

According to another aspect of the present invention there is provided an encryption method for generating a ciphertext corresponding to a plaintext based on a base n public key cryptosystem using a first secret key formed by two prime numbers p and q, a second secret key d, a first public key n=pq, a second public key e, and a number of partial blocks k which is an integer greater than or equal to 2, the method comprising the steps of: dividing the plaintext into k plaintext blocks of a block size within a range of a residue class of n; forming a k-digit base n number by sequentially coupling the plaintext blocks so that different digits of the base n number correspond to different plaintext blocks; and obtaining the ciphertext as an e-th power of the base n number in modulo $n^k$.

According to another aspect of the present invention there is provided an article of manufacture, comprising: a computer usable medium having computer readable program code means embodied therein for causing a computer to function as an encryption device for generating a ciphertext corresponding to a plaintext based on a base n public key cryptosystem using a first secret key formed by two prime numbers p and q, a second secret key d, a first public key n=pq, a second public key e, and a number of partial blocks k which is an integer greater than or equal to 2, the computer readable program code means including:

first computer readable program code means for causing said computer to divide the plaintext into k plaintext blocks of a block size within a range of a residue class of n; second computer readable program code means for causing said computer to form a k-digit base n number by sequentially coupling the plaintext blocks so that different digits of the base n number correspond to different plaintext blocks; and third computer readable program code means for causing said computer to obtain the ciphertext as an e-th power of the base n number in modulo $n^k$.

According to another aspect of the present invention there is provided an encryption device for generating a ciphertext corresponding to a plaintext based on a base n public key cryptosystem using a first secret key formed by two prime numbers p and q, a second secret key d, a first public key n=pq, a second public key e, and a number of partial blocks k which is an integer greater than or equal to 2, the device comprising: a plaintext division unit for dividing the plaintext into k plaintext blocks of a block size within a range of a residue class of n; a data coupling unit for forming a k-digit base n number by sequentially coupling the plaintext blocks so that different digits of the base n number correspond to different plaintext blocks; and an encryption unit for obtaining the ciphertext as an e-th power of the base n number in modulo $n^k$.

According to another aspect of the present invention there is provided a decryption method for recovering a plaintext corresponding to a ciphertext based on a base n public key cryptosystem using a first secret key formed by two prime numbers p and q, a second secret key d, a first public key n=pq, a second public key e, and a number of partial blocks k which is an integer greater than or equal to 2, the method comprising the steps of: obtaining a lowest digit M0 of a base n number expressing the plaintext, by calculating a d-th power of the ciphertext in modulo n; sequentially obtaining upper digits $M_i$ ($1 \leq i \leq k-1$) of the base n number by solving linear modular equations based on the lowest digit M0 of the base n number in modulo n; and recovering the plaintext by sequentially concatenating the lowest digit M0 and the upper digits $M_i$ of the base n number.

According to another aspect of the present invention there is provided an article of manufacture, comprising: a computer usable medium having computer readable program code means embodied therein for causing a computer to function as a decryption device for recovering a plaintext corresponding to a ciphertext based on a base n public key cryptosystem using a first secret key formed by two prime numbers p and q, a second secret key d, a first public key n=pq, a second public key e, and a number of partial blocks k which is an integer greater than or equal to 2, the computer readable program code means including: first computer readable program code means for causing said computer to obtain a lowest digit M0 of a base n number expressing the plaintext, by calculating a d-th power of the ciphertext in modulo n: second computer readable program code means for causing said computer to sequentially obtain upper digits $M_i$ ($1 \leq i \leq k-1$) of the base n number by solving linear modular equations based on the lowest digit M0 of the base n number in modulo n; and third computer readable program code means for causing said computer to recover the plaintext by sequentially concatenating the lowest digit M0 and the upper digits $M_i$ of the base n number.

According to another aspect of the present invention there is provided a decryption device for recovering a plaintext corresponding to a ciphertext based on a base n public key cryptosystem using a first secret key formed by two prime numbers p and q, a second secret key d, a first public key n=pq, a second public key e, and a number of partial blocks k which is an integer greater than or equal to 2, the device comprising: a lowest digit decryption unit for obtaining a lowest digit M0 of a base n number expressing the plaintext, by calculating a d-th power of the ciphertext in modulo n; an upper digit decryption unit for sequentially obtaining upper digits $M_i$ ($1 \leq i \leq k-1$) of the base n number by solving linear modular equations based on the lowest digit M0 of the base n number in modulo n; and a data concatenation unit for recovering the plaintext by sequentially concatenating the lowest digit M0 and the upper digits $M_i$ of the base n number.

According to another aspect of the present invention there is provided an authentication method based on a base n public key cryptosystem using a first secret key formed by two prime numbers p and q, a second secret key d, a first public key n=pq, a second public key e, and a number of partial blocks k which is an integer greater than or equal to 2, the method comprising the steps of: generating an authenticator h(M) from an authentication message M at an authentication message generating side; generating a lowest digit S0 of an encrypted base n authenticator S by applying a calculation using the first public key n and the second secret key d to the authenticator h(M) at the authentication message generating side; sequentially generating upper digits $S_i$ ($1 \leq i \leq k-1$) of the encrypted base n authenticator S by using the lowest digit S0 at the authentication message generating side; generating an encrypted authenticator by sequentially concatenating the lowest digit S0 and the upper digits $S_i$ of the encrypted base n authenticator S at the authentication message generating side; transmitting the encrypted authenticator and the authentication message M from the authentication message generating side to an authentication message verifying side; obtaining a decrypted authenticator by applying a calculation using the first public key n and the second public key e to the encrypted base n authenticator S obtained from the encrypted authenticator at the authentication message verifying side; and verifying an authenticity of the authentication message M by using the decrypted authenticator and the authentication message M at the authentication message verifying side.

According to another aspect of the present invention there is provided an authentication message generation method for generating an encrypted authenticator corresponding to an authenticator h(M) based on a base n public key cryptosystem using a first secret key formed by two prime numbers p and q, a second secret key d, a first public key n=pq, a second public key e, and a number of partial blocks k which is an integer greater than or equal to 2, the method comprising the steps of: generating a lowest digit $S_0$ of an encrypted base n authenticator S as a d-th power of the authenticator h(M) in modulo n; sequentially obtaining upper digits $S_i$ ($1 \leq i \leq k-1$) of the encrypted base n authenticator S by solving linear modular equations based on the lowest digit $S_0$ of the encrypted base n authenticator S in modulo n; and generating the encrypted authenticator by sequentially concatenating the lowest digit $S_0$ and the upper digits $S_i$ of the encrypted base n authenticator S.

According to another aspect of the present invention there is provided an article of manufacture, comprising: a computer usable medium having computer readable program code means embodied therein for causing a computer to function as an authentication message generation device for generating an encrypted authenticator corresponding to an authenticator h(M) based on a base n public key cryptosystem using a first secret key formed by two prime numbers p and q, a second secret key d, a first public key n=pq, a second public key e, and a number of partial blocks k which is an integer greater than or equal to 2, the computer readable program code means including: first computer readable program code means for causing said computer to generate a lowest digit $S_0$ of an encrypted base n authenticator S as a d-th power of the authenticator h(M) in modulo n; second computer readable program code means for causing said computer to sequentially obtain upper digits $S_i$ ($1 \leq i \leq k-1$) of the encrypted base n authenticator S by solving linear modular equations based on the lowest digit $S_0$ of the encrypted base n authenticator S in modulo n; and third computer readable program code means for causing said computer to generate the encrypted authenticator by sequentially concatenating the lowest digit $S_0$ and the upper digits $S_i$ of the encrypted base n authenticator S.

According to another aspect of the present invention there is provided an authentication message generation device for generating an encrypted authenticator corresponding to an authenticator h(M) based on a base n public key cryptosystem using a first secret key formed by two prime numbers p and q, a second secret key d, a first public key n=pq, a second public key e, and a number of partial blocks k which is an integer greater than or equal to 2, the device comprising: a lowest digit encryption unit for generating a lowest digit $S_0$ of an encrypted base n authenticator S as a d-th power of the authenticator h(M) in modulo n; an upper digit encryption unit for sequentially obtaining upper digits $S_i$ ($1 \leq i \leq k-1$) of the encrypted base n authenticator S by solving linear modular equations based on the lowest digit $S_0$ of the encrypted base n authenticator S in modulo n; and a data concatenation unit for generating the encrypted authenticator by sequentially concatenating the lowest digit $S_0$ and the upper digits $S_i$ of the encrypted base n authenticator S.

According to another aspect of the present invention there is provided an authentication message verification method for verifying an authenticity of an authentication message M from an encrypted authenticator based on a base n public key cryptosystem using a first secret key formed by two prime numbers p and q, a second secret key d, a first public key n=pq, a second public key e, and a number of partial blocks k which is an integer greater than or equal to 2, the method comprising the steps of: sequentially coupling authenticator blocks dividing the encrypted authenticator to obtain an encrypted base n authenticator S so that different digits of the encrypted base n authenticator S correspond to different authenticator blocks; obtaining a decrypted authenticator h(M) as an e-th power of the encrypted base n authenticator S in modulo $n^k$; obtaining an authenticator h(M)' by hashing the authentication message M; and comparing the decrypted authenticator h(M) and the authenticator h(M)', and judging that an authentication is success when the decrypted authenticator h(M) and the authenticator h(M)' match or that an authentication is failure otherwise.

According to another aspect of the present invention there is provided an article of manufacture, comprising: a computer usable medium having computer readable program code means embodied therein for causing a computer to function as an authentication message verification method for verifying an authenticity of an authentication message M from an encrypted authenticator based on a base n public key cryptosystem using a first secret key formed by two prime numbers p and q, a second secret key d, a first public key n=pq, a second public key e, and a number of partial blocks k which is an integer greater than or equal to 2, the computer readable program code means including: first computer readable program code means for causing said computer to sequentially couple authenticator blocks dividing the encrypted authenticator to obtain an encrypted base n authenticator S so that different digits of the encrypted base n authenticator S correspond to different authenticator blocks; second computer readable program code means for causing said computer to obtain a decrypted authenticator h(M) as an e-th power of the encrypted base n authenticator S in modulo $n^k$; third computer readable program code means for causing said computer to obtain an authenticator h(M)' by hashing the authentication message M; and fourth computer readable program code means for causing said computer to compare the decrypted authenticator h(M) and the authenticator h(M)', and judge that an authentication is success when the decrypted authenticator h(M) and the authenticator h(M)' match or that an authentication is failure otherwise.

According to another aspect of the present invention there is provided an authentication message verification device for verifying an authenticity of an authentication message M from an encrypted authenticator based on a base n public key cryptosystem using a first secret key formed by two prime numbers p and q, a second secret key d, a first public key n=pq, a second public key e, and a number of partial blocks k which is an integer greater than or equal to 2, the device comprising: a data coupling unit for sequentially coupling authenticator blocks dividing the encrypted authenticator to obtain an encrypted base n authenticator S so that different digits of the encrypted base n authenticator S correspond to different authenticator blocks; an authenticator decryption unit for obtaining a decrypted authenticator h(M) as an e-th power of the encrypted base n authenticator S in modulo $n^k$; an authentication message hashing unit for obtaining an authenticator h(M)' by hashing the authentication message M; and a matching judgement unit for comparing the decrypted authenticator h(M) and the authenticator h(M)', and judging that an authentication is success when the decrypted authenticator h(M) and the authenticator h(M)' match or that an authentication is failure otherwise.

According to another aspect of the present invention there is provided a secret communication method based on a base n public key cryptosystem using a secret key formed by two prime numbers p and q, a public key n=pq, and a number of partial blocks k which is an integer greater than or equal to 2, the method comprising the steps of: expressing a plaintext in a form of a k-digit base n number at a sender side; obtaining a ciphertext in which the plaintext is encrypted by applying a calculation using the public key n and the number of partial blocks k to the base n number, and transmitting the ciphertext from the sender side to a receiver side; receiving the ciphertext and decrypting a lowest digit of the base n number from the ciphertext by using the public key n and the secret key p, q at the receiver side; sequentially decrypting upper digits of the base n number by using a decrypted value of the lowest digit of the base n number at the receiver side; and recovering the plaintext by using decrypted values of respective digits of the base n number at the receiver side.

According to another aspect of the present invention there is provided an encryption method for generating a ciphertext corresponding to a plaintext based on a base n public key cryptosystem using a secret key formed by two prime numbers p and q, a public key n=pq, and a number of partial blocks k which is an integer greater than or equal to 2, the method comprising the steps of: dividing the plaintext into k plaintext blocks of a block size within a range of a residue class of n; forming a k-digit base n number by sequentially coupling the plaintext blocks so that different digits of the base n number correspond to different plaintext blocks; and obtaining the ciphertext as a square of the base n number in modulo $n^k$.

According to another aspect of the present invention there is provided an article of manufacture, comprising: a computer usable medium having computer readable program code means embodied therein for causing a computer to function as an encryption device for generating a ciphertext corresponding to a plaintext based on a base n public key cryptosystem using a secret key formed by two prime numbers p and q, a public key n=pq, and a number of partial blocks k which is an integer greater than or equal to 2, the computer readable program code means including: first computer readable program code means for causing said computer to divide the plaintext into k plaintext blocks of a block size within a range of a residue class of n; second computer readable program code means for causing said computer to form a k-digit base n number by sequentially coupling the plaintext blocks so that different digits of the base n number correspond to different plaintext blocks; and third computer readable program code means for causing said computer to obtain the ciphertext as a square of the base n number in modulo $n^k$.

According to another aspect of the present invention there is provided an encryption device for generating a ciphertext corresponding to a plaintext based on a base n public key cryptosystem using a secret key formed by two prime numbers p and q, a public key n=pq, and a number of partial blocks k which is an integer greater than or equal to 2, the device comprising: a plaintext division unit for dividing the plaintext into k plaintext blocks of a block size within a range of a residue class of n; a data coupling unit for forming a k-digit base n number by sequentially coupling the plaintext blocks so that different digits of the base n number correspond to different plaintext blocks; and an encryption unit for obtaining the ciphertext as a square of the base n number in modulo $n^k$.

According to another aspect of the present invention there is provided a decryption method for recovering a plaintext corresponding to a ciphertext based on a base n public key cryptosystem using a secret key formed by two prime numbers p and q, a public key n=pq, and a number of partial blocks k which is an integer greater than or equal to 2, the method comprising the steps of: obtaining a lowest digit $M_0$ of a base n number expressing the plaintext, by solving simultaneous modular equations for finding a number whose square in modulo p and whose square in modulo q are both equal to the ciphertext; sequentially obtaining upper digits $M_i$ ($1 \leq i \leq k-1$) of the base n number by solving linear modular equations based on the lowest digit $M_0$ of the base n number in modulo n; and recovering the plaintext by sequentially concatenating the lowest digit $M_0$ and the upper digits $M_i$ of the base n number.

According to another aspect of the present invention there is provided an article of manufacture, comprising: a computer usable medium having computer readable program code means embodied therein for causing a computer to function as a decryption device for recovering a plaintext corresponding to a ciphertext based on a base n public key cryptosystem using a secret key formed by two prime numbers p and q, a public key n=pq, and a number of partial blocks k which is an integer greater than or equal to 2, the computer readable program code means including: first computer readable program code means for causing said computer to obtain a lowest digit $M_0$ of a base n number expressing the plaintext, by solving simultaneous modular equations for finding a number whose square in modulo p and whose square in modulo q are both equal to the ciphertext; second computer readable program code means for causing said computer to sequentially obtain upper digits $M_i$ ($1 \leq i \leq k-1$) of the base n number by solving linear modular equations based on the lowest digit $M_0$ of the base n number in modulo n; and third computer readable program code means for causing said computer to recover the plaintext by sequentially concatenating the lowest digit $M_0$ and the upper digits $M_i$ of the base n number.

According to another aspect of the present invention there is provided a decryption device for recovering a plaintext corresponding to a ciphertext based on a base n public key cryptosystem using a secret key formed by two prime numbers p and q, a public key n=pq, and a number of partial blocks k which is an integer greater than or equal to 2, the device comprising: a lowest digit decryption unit for obtaining a lowest digit $M_0$ of a base n number expressing the plaintext, by solving simultaneous modular equations for finding a number whose square in modulo p and whose square in modulo q are both equal to the ciphertext; an upper digit decryption unit for sequentially obtaining upper digits $M_i$ ($1 \leq i \leq k-1$) of the base n number by solving linear modular equations based on the lowest digit $M_0$ of the base n number in modulo n; and a data concatenation unit for recovering the plaintext by sequentially concatenating the lowest digit $M_0$ and the upper digits $M_i$ of the base n number.

According to another aspect of the present invention there is provided an authentication method based on a base n public key cryptosystem using a secret key formed by two prime numbers p and q, a public key n=pq, and a number of partial blocks k which is an integer greater than or equal to 2, the method comprising the steps of: generating an authenticator h(M) from an authentication message M at an authentication message generating side; generating a lowest digit $S_0$ of an encrypted base n authenticator S by applying a calculation using the public key n and the secret key p, q to the authenticator h(M) at the authentication message generating side; sequentially generating upper digits $S_i$ ($1 \leq i \leq k-1$) of the encrypted base n authenticator S by using the lowest digit S0 at the authentication message generating side; generating an encrypted authenticator by sequentially concatenating the lowest digit S0 and the upper digits $S_i$ of the encrypted base n authenticator S at the authentication message generating side; transmitting the encrypted authenticator and the authentication message M from the authentication message generating side to an authentication message verifying side; obtaining a decrypted authenticator by applying a calculation using the public key n and the number of partial blocks k to the encrypted base n authenticator S obtained from the encrypted authenticator at the authentication message verifying side; and verifying an authenticity of the authentication message M by using the decrypted authenticator and the authentication message M at the authentication message verifying side.

According to another aspect of the present invention there is provided an authentication message generation method for generating an encrypted authenticator corresponding to an authenticator h(M) based on a base n public key cryptosystem using a secret key formed by two prime numbers p and q, a public key n=pq, and a number of partial blocks k which is an integer greater than or equal to 2, the method comprising the steps of: generating a lowest digit S0 of an encrypted base n authenticator S by solving simultaneous modular equations for finding a number whose square in modulo p and whose square in modulo q are both equal to the ciphertext; sequentially obtaining upper digits $S_i$ ($1 \leq i \leq k-1$) of the encrypted base n authenticator S by solving linear modular equations based on the lowest digit S0 of the encrypted base n authenticator S in modulo n; and generating the encrypted authenticator by sequentially concatenating the lowest digit S0 and the upper digits $S_i$ of the encrypted base n authenticator S.

According to another aspect of the present invention there is provided an article of manufacture, comprising: a computer usable medium having computer readable program code means embodied therein for causing a computer to function as an authentication message generation device for generating an encrypted authenticator corresponding to an authenticator h(M) based on a base n public key cryptosystem using a secret key formed by two prime numbers p and q, a public key n=pq, and a number of partial blocks k which is an integer greater than or equal to 2, the computer readable program code means including: first computer readable program code means for causing said computer to generate a lowest digit S0 of an encrypted base n authenticator S by solving simultaneous modular equations for finding a number whose square in modulo p and whose square in modulo q are both equal to the ciphertext; second computer readable program code means for causing said computer to sequentially obtain upper digits $S_i$ ($1>i \leq k-1$) of the encrypted base n authenticator S by solving linear modular equations based on the lowest digit S0 of the encrypted base n authenticator S in modulo n; and third computer readable program code means for causing said computer to generate the encrypted authenticator by sequentially concatenating the lowest digit S0 and the upper digits $S_i$ of the encrypted base n authenticator S.

According to another aspect of the present invention there is provided an authentication message generation device for generating an encrypted authenticator corresponding to an authenticator h(M) based on a base n public key cryptosystem using a secret key formed by two prime numbers p and q, a public key n=pq, and a number of partial blocks k which is an integer greater than or equal to 2, the device comprising: a lowest digit encryption unit for generating a lowest digit S0 of an encrypted base n authenticator S by solving simultaneous modular equations for finding a number whose square in modulo p and whose square in modulo q are both equal to the ciphertext; an upper digit encryption unit for sequentially obtaining upper digits $S_i$ ($1 \leq i \leq k-1$) of the encrypted base n authenticator S by solving linear modular equations based on the lowest digit S0 of the encrypted base n authenticator S in modulo n; and a data concatenation unit for generating the encrypted authenticator by sequentially concatenating the lowest digit S0 and the upper digits $S_i$ of the encrypted base n authenticator S.

According to another aspect of the present invention there is provided an authentication message verification method for verifying an authenticity of an authentication message M from an encrypted authenticator based on a base n public key cryptosystem using a secret key formed by two prime numbers p and q, a public key n=pq, and a number of partial blocks k which is an integer greater than or equal to 2, the method comprising the steps of: sequentially coupling authenticator blocks dividing the encrypted authenticator to obtain an encrypted base n authenticator S so that different digits of the encrypted base n authenticator S correspond to different authenticator blocks; obtaining a decrypted authenticator h(M) as a square of the encrypted base n authenticator S in modulo $n^k$; obtaining an authenticator h(M)' by hashing the authentication message M; and comparing the decrypted authenticator h(M) and the authenticator h(M)', and judging that an authentication is success when the decrypted authenticator h(M) and the authenticator h(M)' match or that an authentication is failure otherwise.

According to another aspect of the present invention there is provided an article of manufacture, comprising: a computer usable medium having computer readable program code means embodied therein for causing a computer to function as an authentication message verification method or verifying an authenticity of an authentication message from an encrypted authenticator based on a base n public key cryptosystem using a secret key formed by two prime numbers p and q, a public key n=pq, and a number of partial blocks k which is an integer greater than or equal to 2, the computer readable program code means including: first computer readable program code means for causing said computer to sequentially couple authenticator blocks dividing the encrypted authenticator to obtain an encrypted base n authenticator S so that different digits of the encrypted base n authenticator S correspond to different authenticator blocks; second computer readable program code means for causing said computer to obtain a decrypted authenticator h(M) as a square of the encrypted base n authenticator S in modulo $n^k$; third computer readable program code means for causing said computer to obtain an authenticator h(M)' by hashing the authentication message M; and fourth computer readable program code means for causing said computer to compare the decrypted authenticator h(M) and the authenticator h(M)', and judge that an authentication is success when the decrypted authenticator h(M) and the authenticator h(M)' match or that an authentication is failure otherwise.

According to another aspect of the present invention there is provided an authentication message verification device for verifying an authenticity of an authentication message M from an encrypted authenticator based on a base n public key cryptosystem using a secret key formed by two prime numbers p and q, a public key n=pq, and a number of partial blocks k which is an integer greater than or equal to 2, the device comprising: a data coupling unit for sequentially coupling authenticator blocks dividing the encrypted authenticator to obtain an encrypted base n authenticator S so that different digits of the encrypted base n authenticator S correspond to different authenticator blocks; an authenticator decryption unit for obtaining a decrypted authenticator h(M) as a square of the encrypted base n authenticator S in modulo $n^k$; an authentication message hashing unit for obtaining an authenticator h(M)' by hashing the authentication message M; and a matching judgement unit for comparing the decrypted authenticator h(M) and the authenticator h(M)', and judging that an authentication is success when the decrypted authenticator h(M) and the authenticator h(M)' match or that an authentication is failure otherwise.

Other features and advantages of the present invention will become apparent from the following description taken in conjunction with the accompanying drawings.

BRIEF DESCRIPTION OF THE DRAWINGS

FIG. 6 is a table indicating a data arrangement on a memory in the key generation processing according to the flow chart of FIG. 5.

FIG. 8 is a table indicating a data arrangement on a memory in the encryption and transmission processing according to the flow chart of FIG. 7.

FIG. 10 is a table indicating a data arrangement on a memory in the reception and decryption processing according to the flow chart of FIG. 9.

FIG. 16 is a table indicating a data arrangement on a memory in the authentication message generation processing according to the flow charts of FIG. 14 and FIG. 15.

FIG. 17 is a flow chart for an authentication message verification processing by an authentication message verification device in the authentication system of FIG. 12.

FIG. 18 is a table indicating a data arrangement on a memory in the authentication message verification processing according to the flow chart of FIG. 17.

FIG. 21 is a table indicating a data arrangement on a memory in the encryption and transmission processing according to the flow chart of FIG. 20.

FIG. 24 is a table indicating a data arrangement on a memory in the reception and decryption processing according to the flow chart of FIG. 22.

FIG. 29 is a table indicating a data arrangement on a memory in the authentication message generation processing according to the flow chart of FIG. 27.

FIG. 31 is a table indicating a data arrangement on a memory in the authentication message verification processing according to the flow chart of FIG. 30.

FIG. 33 is a table indicating a data arrangement on a memory in the reception and decryption processing according to the flow chart of FIG. 32.

FIG. 35 is a table indicating a data arrangement on a memory in the authentication message generation processing according to the flow chart of FIG. 34.

FIG. 37 is a table indicating a data arrangement on a memory in the reception and decryption processing according to the flow chart of FIG. 36.

FIG. 39 is a table indicating a data arrangement on a memory in the authentication message generation processing according to the flow chart of FIG. 39.

FIG. 40 is a table summarizing differences between the RSA type base N public key cryptosystem and the Rabin type base N public key cryptosystem according to the present invention.

DETAILED DESCRIPTION OF THE PREFERRED EMBODIMENTS

Referring now to FIG. 1 to FIG. 11, the first embodiment of a communication and authentication scheme based on a public key cryptosystem using base N expansion (a base N public key cryptosystem) according to the present invention will be described in detail. Note that, in the following description, base N number will also be denoted as base n number.

This first embodiment is directed to an RSA type secret communication system in which the base N public key cryptosystem of the present invention is applied to the RSA type public key cryptosystem.

Figure 1:
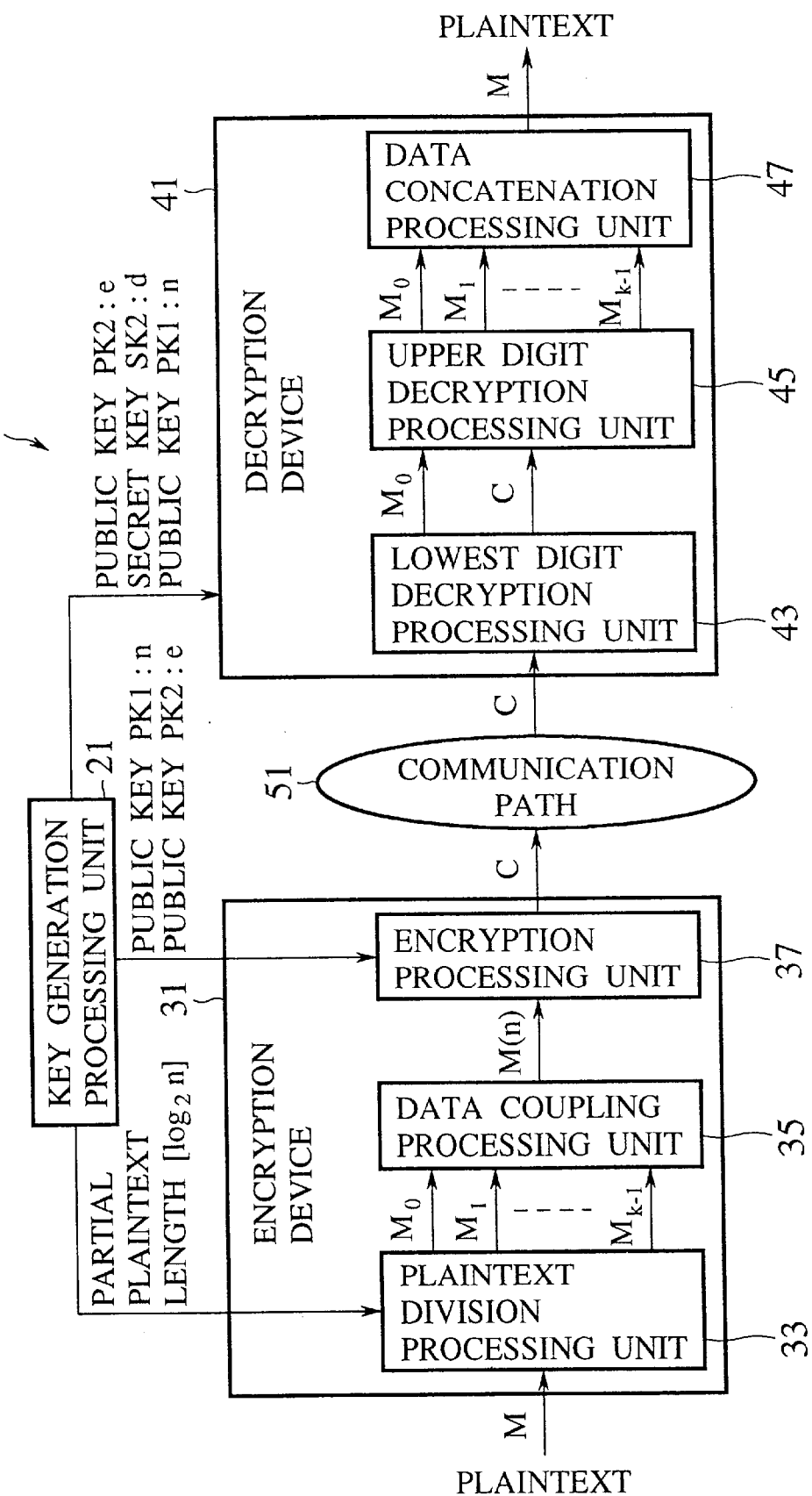
FIG. 1 is a block diagram of an RSA type secret communication system in the first embodiment of a secret communication and authentication scheme based on a public key cryptosystem according to the present invention.

FIG. 1 shows a configuration of a secret communication system 11 according to the first embodiment, which comprises a key generation processing unit 21, an encryption device 31, a decryption device 41, and a communication path 51.

[Key Generation Processing Unit]

The key generation processing unit 21 has a key generation function equivalent to that of the known public key cryptosystem, and can be provided as an independent device or contained within the decryption device 41 as will be described below.

The key generation processing unit 21 generates two prime numbers p, q as a secret key SK1, and calculates their product n=pq as a public key PK1. Also, the key generation processing unit 21 calculates L from the prime numbers p, q as will be described below, and generates e as a public key PK2 and d as a secret key SK2 by using the calculated L.

[Encryption Device]

The Encryption device 31 generates a ciphertext C obtained by encrypting a plaintext M and transmits the ciphertext C to the decryption device 41 through the communication path 51, and further comprises a plaintext division processing unit 33, a data coupling processing unit 35, and an encryption processing unit 37.

The plaintext division processing unit 33 generates partial plaintexts $(M0, M_1, \ldots, M_{k-1})$ by dividing the plaintext M into k blocks of a block size within a range of the residue class of n, and supplies these partial plaintexts to the data coupling processing unit 35.

The data coupling processing unit 35 obtains a k-digit base n number M(n) in which a value of an i-th digit corresponds to an i-th partial plaintext block $M_i$ ($0 \leq i \leq k-1$), by coupling the partial plaintext block data according to the following equation (23), and supplies this base n number M(n) to the encryption processing unit 37.

$$M(n) = M0 + nM_1 + n^2 M_2 + \ldots + n^{k-1} M_{k-1} \quad (23)$$

The encryption processing unit 37 encrypts the base n number M(n) supplied from the data coupling processing unit by using the public key PK2: e of the receiver according to the following congruence (24), and transmits the encrypted base n number as the ciphertext C to the decryption device 41 through the communication path 51.

$$C \equiv (M(n))^e \pmod{n^k} \equiv (M0 + nM_1 + \ldots + n^{k-1} M_{k-1})^e \pmod{n^k} \quad (24)$$

[Decryption Device]

The decryption device 41 decrypts the partial plaintexts $(M0, M_1, \ldots, M_{k-1})$ from the ciphertext C received through the communication path 51 and recovers the original plaintext M by concatenating these partial plaintexts, and further comprises a lowest digit decryption processing unit 43, an upper digit decryption processing unit 45, and a data concatenation processing unit 47.

The lowest digit decryption processing unit 43 decrypts the lowest digit, i.e., the block M0, by using the receiver's secret key SK2: d according to the following congruence (25), and supplies the decrypted block M0 to the upper digit decryption processing unit 45.

$$M0 \equiv C^d \pmod{n} \quad (25)$$

The upper digit decryption processing unit 45 sequentially decrypts the upper digits, i.e., the blocks $M_1, M_2, \ldots, M_{k-1}$, other than the lowest digit M0, by solving the linear modular equations in modulo n while utilizing M0, and supplies these decrypted blocks along with M0 to the data concatenation processing unit 47.

The data concatenation processing unit 47 recovers the original plaintext M by concatenating the decrypted partial plaintexts $(M0, M_1, \ldots, M_{k-1})$ together.

Now, the operations of each element in the secret communication system 11 of FIG. 1 will be described in detail.

[Key Generation Processing Unit]

First, the operation of the key generation processing unit 21 is carried out according to the flow chart of FIG. 2 as follows. Note that a pair of the secret key and the public key generated by the key generation processing unit 21 is utilizable for both the secret communication and the authentication, so that the encryption/decryption keys and the authentication message generation/authentication message verification keys will not be distinguished in the following.

At the beginning of the key generation, two rational prime numbers having as many digits as necessary for the required security of the cryptosystem are generated. These two rational prime numbers p, q are set as the secret key SK1, while their product n=pq is set as the public key PK1.

Then, for the secret key SK1: p, q, L defined by the following equation (26) is calculated (step S101).

$$L = LCM(p-1, q-1) \quad (26)$$

where LCM is a function for obtaining the least common multiplier.

Next, e, d that satisfy the following equation (27) are obtained (step S102).

$$ed \equiv 1 \pmod{L}, GCD(e, L) = GCD(e, n) = 1 \quad (27)$$

Then, d is set as the secret key SK2, while e is set as the public key PK2.

[Plaintext Division Processing Unit]

The operation of the plaintext division processing unit 33 is carried out according to the flow chart of FIG. 3 as follows.

At the initial state of the plaintext division processing unit 33, a bit sequence of the plaintext M, a number of partial blocks k, and a partial plaintext length [$\log_2 n$] (where [x] is the Gaussian symbol indicating the largest integer not exceeding x) are given.

First, a control variable i is initially set to 0 (step S201). Then, a block $M_i$ of a bit length [$\log_2 n$] is extracted from a top of M, and a remaining bit sequence is set as a new M (step S203). Then, i and k−1 are compared (step S205), and when they are not equal, i is incremented by 1 (step S207) and the operation returns to the step S203. On the other hand, when i and k−1 are equal at the step S205, $M_0$, $M_1, \ldots, M_{k-1}$ are outputted to the data coupling processing unit 35 (step S209). Then, whether M is empty or not is judged (step S211), and when it is not empty, the operation returns to the step S201. When it is empty, the operation is terminated.

Figure 3:
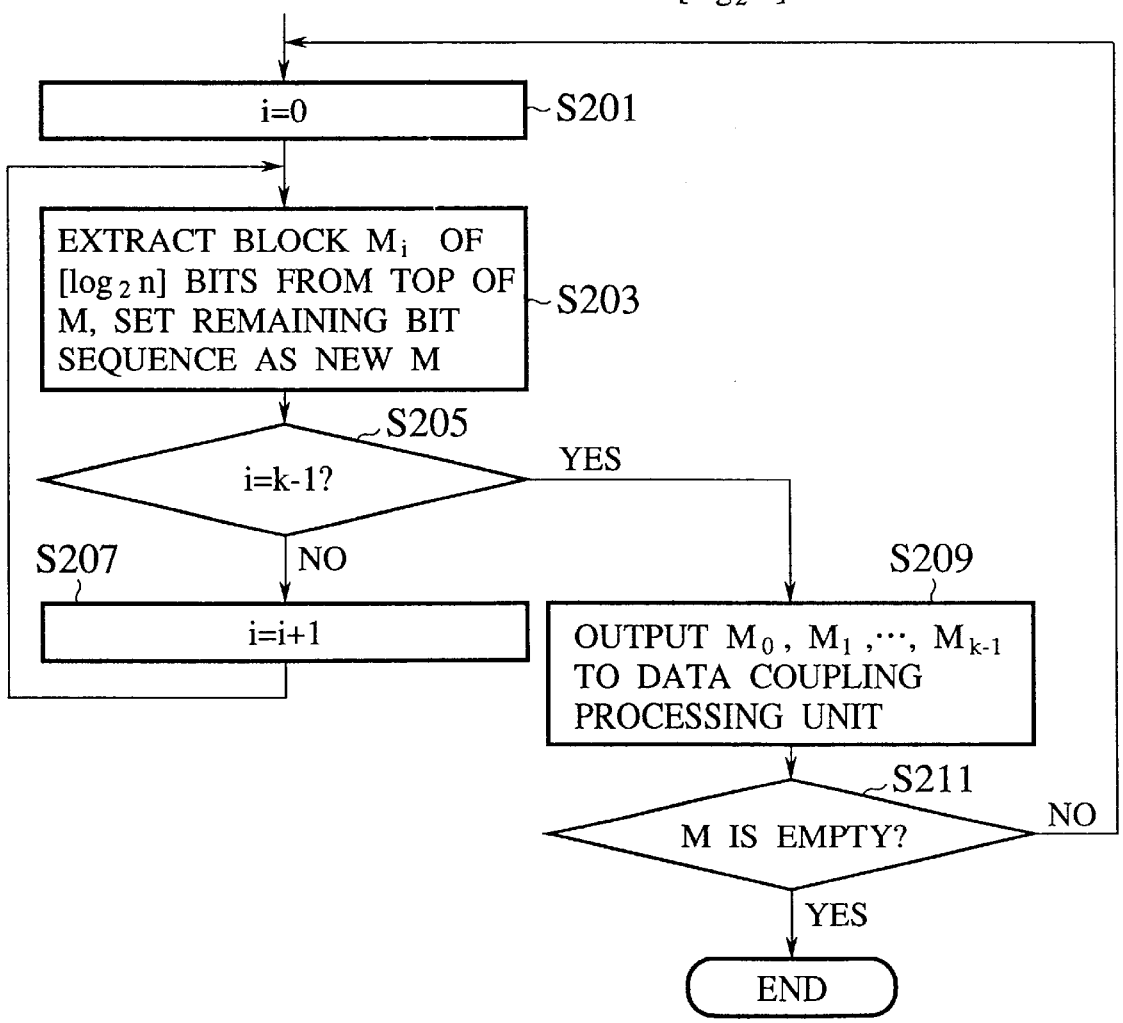
FIG. 3 is a flow chart for the operation of a plaintext division processing unit in the secret communication system of FIG. 1.

Note that, although not indicated in the flow chart of FIG. 3, the padding for the last block can be provided in the usual form of inserting blanks or 0s, or in a form of inserting randomly generated random numbers.

[Data Coupling Processing Unit]

The data coupling processing unit 35 obtains a k-digit base n number M(n) in which a value of an i-th digit corresponds to an i-th partial plaintext block $M_i$ ($0 \leq i \leq k-1$), by coupling the partial plaintext block data according to the following equation (28), and supplies this base n number M(n) to the encryption processing unit 37.

$$M(n) = M_0 + nM_1 + n^2 M_2 + \ldots + n^{k-1} M_{k-1} \tag{28}$$

[Encryption Processing Unit]

The encryption processing unit 37 encrypts the base n number M(n) supplied from the data coupling processing unit by using the public key PK2: e and the public key PK1: n of the receiver according to the following congruence (29), and transmits the encrypted base n number as the ciphertext to the decryption device 41 through the communication path 51.

$$C \equiv (M(n))^e \pmod{n^k} \equiv (M_0 + nM_1 + \ldots + n^{k-1} M_{k-1})^e \pmod{n^k} \tag{29}$$

[Lowest Digit Decryption Processing Unit]

The lowest digit decryption processing unit 43 of the decryption device 41 decrypts the lowest digit of the base n number, i.e., the block $M_0$, by calculating the following congruence (30) with respect to the received ciphertext C using the public key PK1: n and the secret key SK2: d.

$$M_0 \equiv C^d \pmod{n} \tag{30}$$

This decryption function is the same decryption function as in the usual RSA type public key cryptosystem, so that it can be said that the decryption of $M_0$ has the equivalent security level as the known RSA type public key cryptosystem.

[Upper Digit Decryption Processing Unit]

Figure 4:
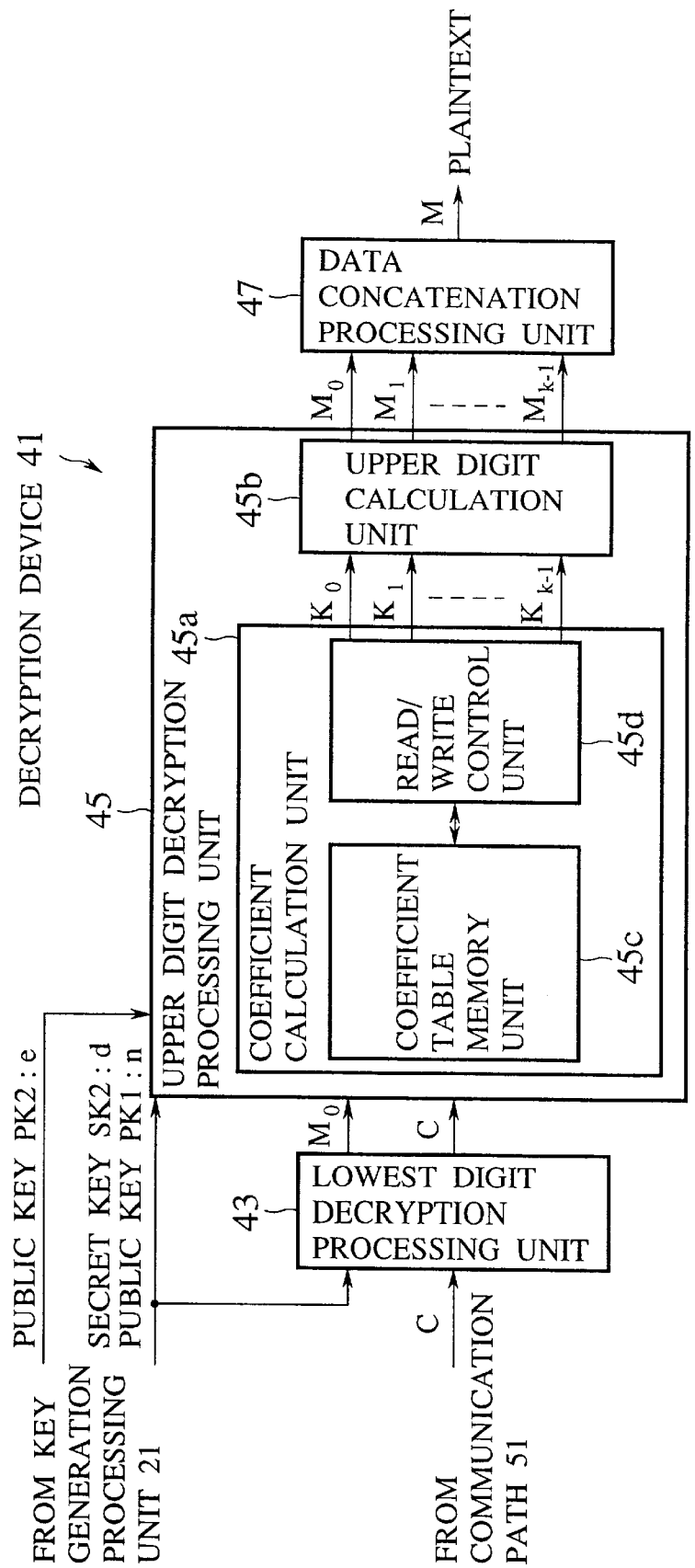
FIG. 4 is a block diagram of a decryption device in the secret communication system of FIG. 1.

As shown in FIG. 4, the upper digit decryption processing unit 45 of the decryption device 41 further comprises a coefficient calculation unit 45a and an upper digit calculation unit 45b. The coefficient calculation unit 45a further includes a coefficient table memory unit 45c and a read/write control unit 45d for controlling read/write with respect to the coefficient table memory unit 45c.

In the upper digit decryption by the upper digit decryption processing unit 45, the upper digits $M_i$ ($1 \leq i \leq k-1$) other than the lowest digit $M_0$ can be decrypted recursively by solving the linear modular equations at the upper digit calculation unit 45b, from the following congruence (31) for the encryption.

$$C \equiv (M_0 + nM_1 + \ldots + n^{k-1} M_{k-1})^e \pmod{n^k} \tag{31}$$

By denoting coefficients of $n^i$ ($0 \leq i \leq k-1$) in the expansion of the right hand side of the congruence (31), that is $(M_0 + nM_1 + \ldots + n^{k-1} M_{k-1})^e$, as $K_i$, the congruence (31) can be expanded as in the following equation (32). (How to calculate $K_i$ will be described below.)

$$(M_0 + nM_1 + \ldots + n^{k-1} M_{k-1})^e = n^0 K_0 + n^1 K_1 + n^2 K_2 + \ldots + n^{k-1} K_{k-1} + \ldots + n^{e(k-1)} K_{e(k-1)} \tag{32}$$

Here, $K_0, K_1, K_2, \ldots, K_{k-1}$ are polynomial functions with $M_0, M_1, M_2, \ldots, M_{k-1}$ as variables, that can output integer values upon entering values of $M_0, M_1, M_2, \ldots, M_{k-1}$. More specific forms of $K_0, K_1, K_2, \ldots, K_{k-1}$ will be described below. Note that $K_k, K_{k+1}, \ldots, K_{e(k-1)}$ will not be considered here as they are not used in the decryption processing.

Also, for the convenience of calculation, $K'_i$ is defined by the following equation (33).

$$K'_i = K_i - eM_0^{e-1} M_i \quad (1 \leq i \leq k-1) \tag{33}$$

Here, just like $K_0, K_1, K_2, \ldots, K_{k-1}$ described above, $K'_1, K'_2, \ldots, K'_{k-1}$ are polynomial functions with $M_0, M_1, M_2, \ldots, M_{k-2}$ as variables, that can output integer values upon entering values of $M_0, M_1, M_2, \ldots, M_{k-2}$. Note however that $K'_i$ does not depend on a value of $M_i$.

Next, how to obtain $M_1$ will be described. $K_0$ and $K'_1$ are polynomial functions with only $M_0$ as a variable, so that they can output integer values upon entering $M_0$ decrypted prior to this point. Now, using their output values $K_0$ and $K'_1$, define $b_1$ according to the following congruence (34).

$$b_1 \equiv \frac{C - (K_0 + nK'_1 (\bmod n^2))}{n} (\bmod n) \tag{34}$$

Then, $M_1$ can be decrypted by obtaining x that satisfies the following congruence (35).

$$eM_0^{e-1} x \equiv b_1 \pmod{n} \tag{35}$$

Next, how to obtain $M_2$ will be described. $K_0$, $K_1$ and $K'_2$ are polynomial functions with only $M_0$ and $M_1$ as variables, so that they can output integer values upon entering $M_0$ and $M_1$ decrypted prior to this point. Now, using their output values $K_0$, $K_1$ and $K'_2$, define $b_2$ according to the following congruence (36).

$$b_2 \equiv \frac{C - (K_0 + nK_1 + n^2 K'_2 (\bmod n^3))}{n^2} (\bmod n) \tag{36}$$

Then, $M_2$ can be decrypted by obtaining x that satisfies the following congruence (37).

$$eM_0^{e-1} x \equiv b_2 \pmod{n} \tag{37}$$

Thereafter $M_3, M_4, \ldots$ can be decrypted in substantially the similar manner.

Next, how to obtain $M_{k-1}$ from the obtained values up to $M_{k-2}$ will be described. $K_0, K_1, \ldots, K_{k-2}$ and $K'_{k-1}$ are polynomial functions with only $M_0, M_1, \ldots, M_{k-2}$ as variables, so that they can output integer values upon entering $M_0, M_1, \ldots, M_{k-2}$ decrypted prior to this point.

Now, using their output values $K_0, K_1, \ldots, K_{k-2}, K'_{k-1}$, define $b_{k-1}$ according to the following congruence (38).

$$b_{k-1} \equiv \frac{C - (K_0 + nK_1 + \cdots + n^{k-2}K_{k-2} + n^{k-1}K'_{k-1} (\bmod\ n^k))}{n^{k-1}} (\bmod\ n) \quad (38)$$

Then, $M_{k-1}$ can be decrypted by obtaining x that satisfies the following congruence (39).

$$eM_0^{e-1}x \equiv b_{k-1} \; (\bmod\ n) \quad (39)$$

[Expansion of $(M_0+nM_1+\ldots+n^{k-1}M_{k-1})^e$]

Now, how to obtain the coefficients $K_i$ (i=0, 1, 2, ..., k-1) of $n^i$ in the expansion of $(M_0+nM_1+\ldots+n^{k-1}M_{k-1})^e$ that is required by the present invention will be described.

According to the polynomial theorem that can be derived from the distributive law of the multiplication, it follows that:

$$(M_0 + nM_1 + \cdots + n^{k-1}M_{k-1})^e = \quad (40)$$

$$\sum_{\substack{s_0+s_1+\cdots+s_{k-1}=e \\ s_0+s_1+\cdots+s_{k-1}=0}} \frac{e!}{s_0! s_1! \cdots s_{k-1}!} M_0^{s_0} (nM_1)^{s_1} \cdots (n^{k-1}M_{k-1})^{s_{k-1}}$$

where the sum is taken for all values of $s_0, s_1, \ldots, s_{k-1}$ in a range where their total $s_0+s_1+\ldots+s_{k-1}$ varies from a value 0 to a value e, and the coefficients of $n^i$ can be determined by finding a set $\Gamma_i$ that satisfies the following condition (41):

$$\Gamma_i = \{s_0, s_1, \ldots, s_{k-1} | s_1 + 2s_2 + \ldots + (k-1)s_{k-1} = i,\ 0 \leq s_0, s_1, \ldots, s_{k-1} \leq e,\ s_0+s_1+\ldots+s_{k-1}=e\} \quad (41)$$

and then calculating a value defined by the following expression (42), $$\sum_{(s_0,s_1,\ldots,s_{k-1})\in \Gamma_i} \frac{e!}{s_0! s_1! \cdots s_{k-1}!} M_0^{s_0} M_1^{s_1} \cdots M_{k-1}^{s_{k-1}} \quad (42)$$

where the sum is taken for all values of $s_0, s_1, \ldots, s_{k-1}$ which belong to the set $\Gamma_i$ defined by the equation (41).

For some small values of i, the actually expressions of the coefficients $K_i$ can be enumerated as follows.

$K_0 = M_0^e$ $K_1 = eM_0^{e-1}M_1$ $K_2 = {}_eC_2 M_0^{e-2}M_1^2 + eM_0^{e-1}M_2$ $K_3 = {}_eC_3 M_0^{e-3}M_1^3 + 2{}_eC_2 M_0^{e-2}M_1 M_2 + eM_0^{e-1}M_3$ $K_4 = {}_eC_4 M_0^{e-4}M_1^4 + 3{}_eC_3 M_0^{e-3}M_1^2 M_2 + {}_eC_2 M_0^{e-2}M_2^2 + eM_0^{e-1}M_4$ $K_5 = {}_eC_5 M_0^{e-5}M_1^5 + 4{}_eC_4 M_0^{e-4}M_1^3 M_2 + 3{}_eC_3 M_0^{e-3}M_1 M_2^2 + 2{}_eC_2 M_0^{e-2} M_2 M_3 + 2{}_eC_2 M_0^{e-2}M_1 M_4 + eM_0^{e-1}M_5$ $K_6 = {}_eC_6 M_0^{e-6}M_1^6 + 5{}_eC_5 M_0^{e-5}M_1^4 M_2 + 4{}_eC_4 M_0^{e-4}M_1^3 M_3$
$+ 3{}_eC_3 M_0^{e-3}M_1^2 M_4 + {}_eC_3 M_0^{e-3}M_2^3 + {}_eC_2 M_0^{e-2}M_3^2$
$+ 2{}_eC_2 M_0^{e-2}M_2 M_4 + 2{}_eC_2 M_0^{e-2}M_1 M_5 + eM_0^{e-1}M_6$ $K_7 = {}_eC_7 M_0^{e-7}M_1^7 + 6{}_eC_6 M_0^{e-6}M_1^5 M_2 + 5{}_eC_5 M_0^{e-5}M_1^4 M_3$
$+ 5{}_eC_2 {}_eC_5 M_0^{e-5}M_1^3 M_2^2 + {}_eC_4 M_0^{e-4}M_1^3 M_4$
$+ 2{}_4C_2 {}_eC_4 M_0^{e-4}M_1 2M_2 M_3 + 4{}_eC_4 M_0^{e-4}M_1 M_2^3$
$+ 3{}_eC_3 M_0^{e-3}M_1^2 M_5 + 3{}_eC_3 M_0^{e-3}M_1 M_3^2$ $+ 3{}_eC_3 M_0^{e-3}M_2^2 M_3 + 2{}_eC_2 M_0^{e-2}M_1 M_6$ $+ 2{}_eC_2 M_0^{e-2}M_2 M_5 + 2{}_eC_2 M_0^{e-2}M_3 M_4 + eM_0^{e-1}M_7 \ldots$ $K_{k-1} = \{\text{polynomial of } M_0, M_1, \ldots, M_{k-1}\} \quad (43)$ where ${}_xC_y$ denotes a (number of) combinations for selecting y elements out of x different elements. The coefficient calculation unit 45a sequentially calculates the coefficients $K_i$ according to the above equations (43), and stores the calculated coefficients $K_i$ in the coefficient table memory unit 45c.

[Data Concatenation Processing Unit]

The data concatenation processing unit 47 recovers the original plaintext M by concatenating the decrypted partial plaintexts ($M_0, M_1, \ldots, M_{k-1}$) in an order as obtained by the lowest digit decryption processing unit 43 and the upper digit decryption processing unit 45.

Now, the overall operation in the secret communication system 11 of FIG. 1 will be described in detail with references to the flow charts and tables indicating data arrangements on a memory.

Figure 5:
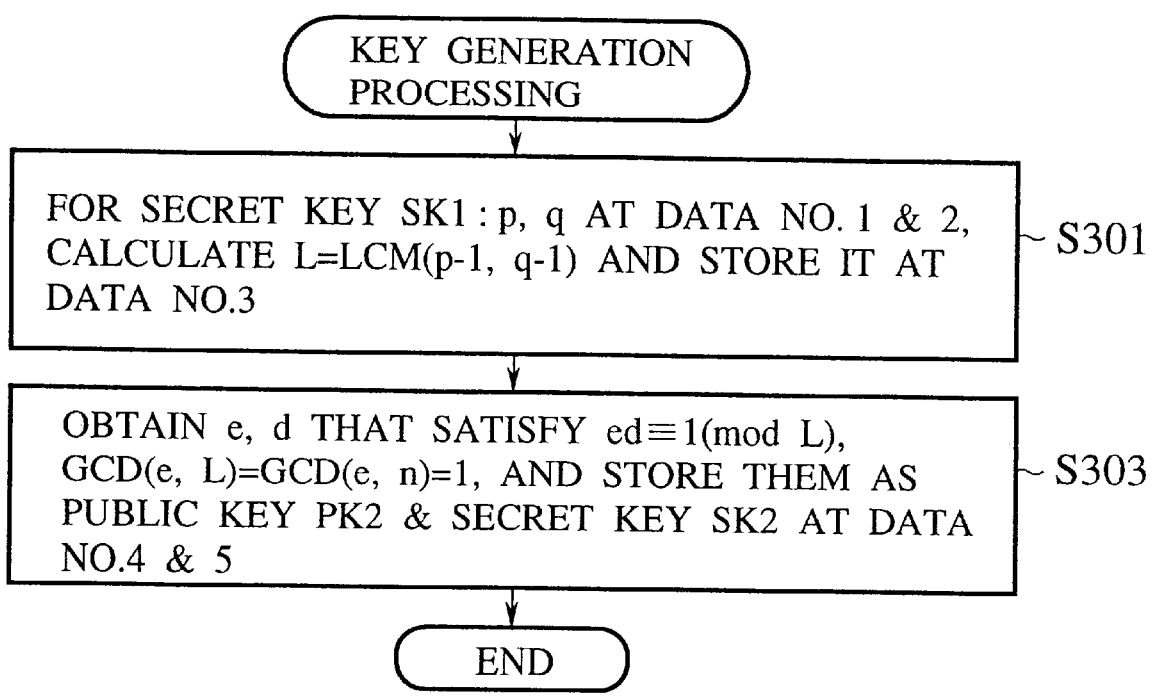
FIG. 5 is a flow chart for a key generation processing by a key generation processing unit in the secret communication system of FIG. 1.

FIG. 5 shows the flow chart for the key generation processing in a case of applying the base n public key cryptosystem of the present invention to the RSA type public key cryptosystem, while FIG. 6 shows a table indicating the data arrangement on a memory in this key generation processing. In each table used in the following description, an attribute column is provided to indicate a data attribute so as to distinguish input, work area, and output in each processing.

As shown in FIG. 6, with respect to the secret key SK1 consisting of two prime numbers p, q given at data numbers 1 and 2, the least common multiplier L of (p−1) and (q−1) is obtained and stored at a data number 3 (step S301).

Then, two numbers e, d that satisfy ed≡1 (mod L), GCD(e, L)=GCD(e, n)=1 are obtained and stored at data numbers 4 and 5 respectively, as the public key PK2 and the secret key SK2 respectively (step S303). This completes the key generation processing.

Figure 7:
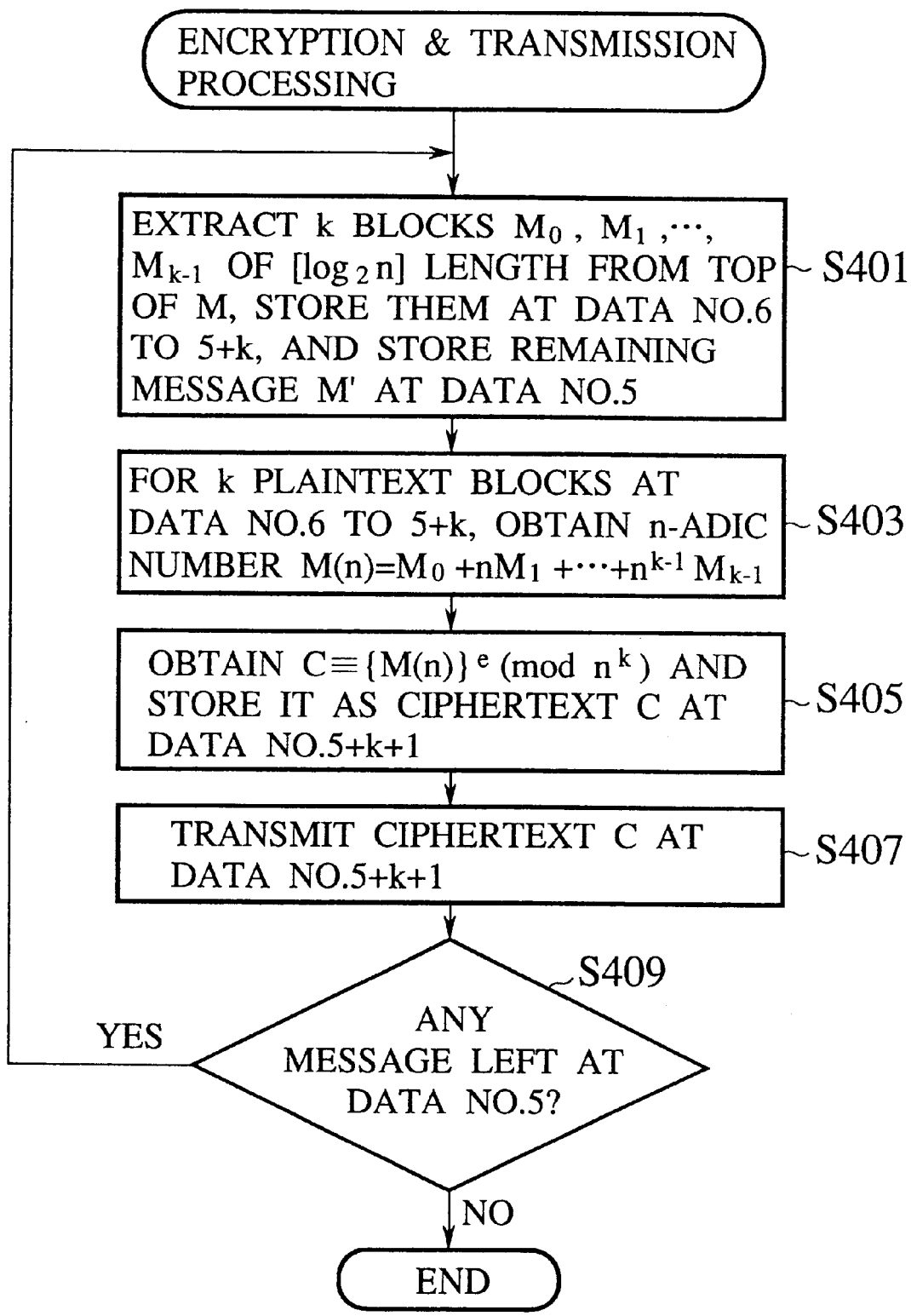
FIG. 7 is a flow chart for an encryption and transmission processing by an encryption device in the secret communication system of FIG. 1.

FIG. 7 shows the flow chart for the encryption and transmission processing by the encryption device 31, while FIG. 8 shows a table indicating the data arrangement on a memory in this encryption and transmission processing.

As shown in FIG. 8, in the encryption and transmission processing, the public key PK1: n and the public key PK2: e are given at data numbers 1 and 2 respectively, and the partial plaintext length [$\log_2 n$] and the plaintext M are given at data numbers 4 and 5 respectively. Here, it is assumed that a number of partial blocks k is to be obtained as a result of the division, but it is also possible to provide a predetermined number from the beginning and carry out the encryption for this predetermined number of partial blocks.

According to FIG. 7, the plaintext M at the data number 5 is read out first, and k plaintext blocks $M_i$ ($0 \leq i \leq k-1$) of a bit length [$\log_2 n$] each are extracted from a top of M. Then, these plaintext blocks are sequentially stored at data numbers 6 to 5+k, while the remaining message M' is stored at a data number 5 (step S401).

Then, with respect to the k plaintext blocks stored at the data numbers 6 to 5+k, the base n number $M(n)=M_0+nM_1+n^2M_2+\ldots+n_{k-1}M_{k-1}$ is obtained (step S403).

Then, using the public key PK1: n and the public key PK2: e at the data numbers 1 and 2, $C \equiv \{M(n)\}^e$ (mod $n^k$) is obtained and stored as the ciphertext C at a data number 5+k+1 (step S405), and this ciphertext C at the data number 5+k+1 is transmitted (step S407).

Then, whether there is any message left at the data number 5 or not is checked (step S409), and if there is, the operation returns to the step S401, whereas otherwise the operation is terminated.

Figure 9:
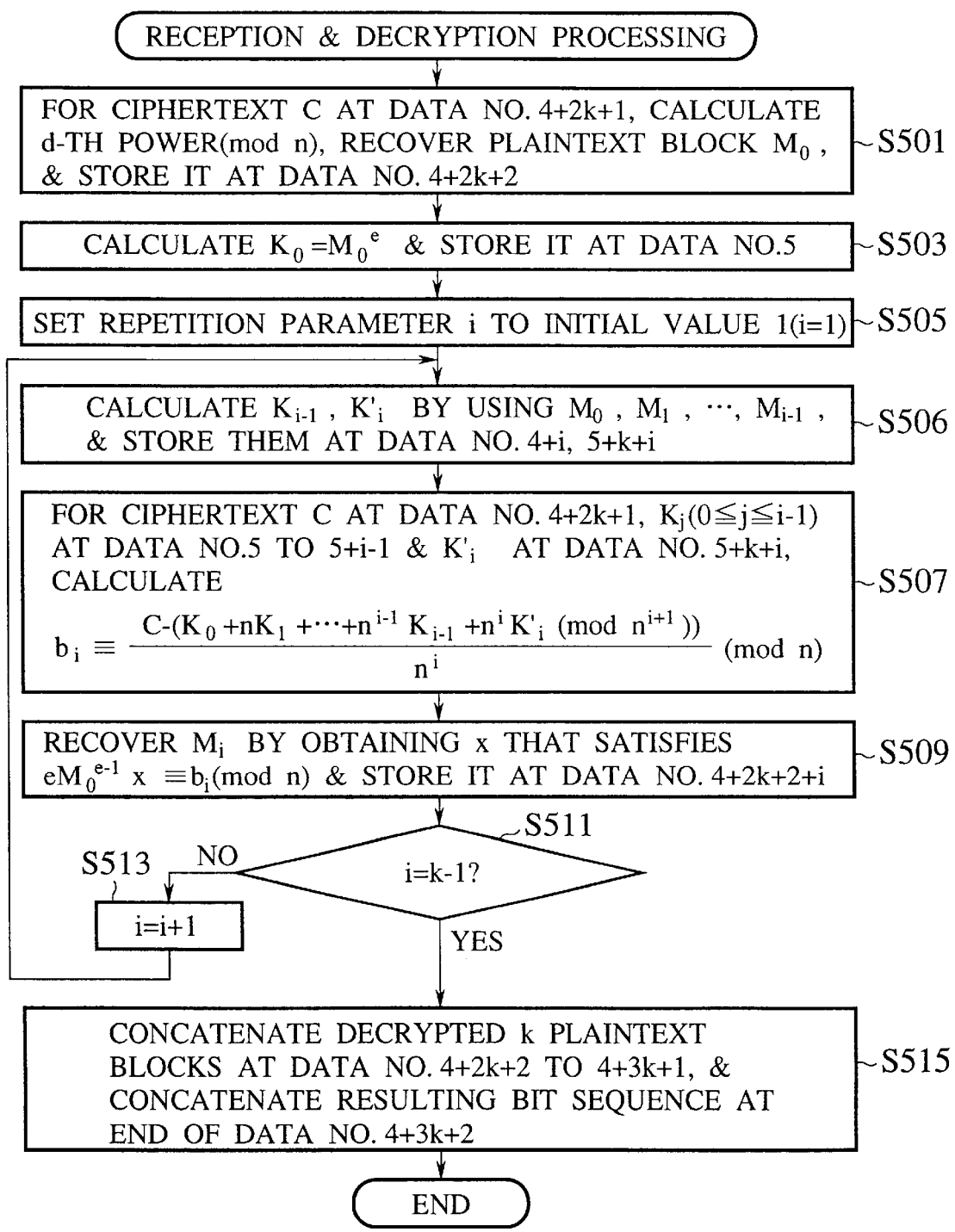
FIG. 9 is a flow chart for a reception and decryption processing by a decryption device in the secret communication system of FIG. 1.

FIG. 9 shows the flow chart for the reception and decryption processing by the decryption device 41, while FIG. 10 shows a table indicating the data arrangement on a memory in this reception and decryption processing.

As shown in FIG. 10, in the reception and decryption processing, the public key PK1: n and the public key PK2: e are given at a data number 1, the secret key SK2: d is given at a data number 2, and the number of partial blocks k and the partial plaintext length $[\log_2 n]$ are given at data numbers 3 and 4 respectively. In addition, the ciphertext C is given at a data number 4+2k+1, while data numbers 5 to 4+2k and 4+2k+2 to 4+3k+1 will be used as the work areas, and the decrypted plaintext will be stored at a data number 4+3k+2.

According to FIG. 9, with respect to the ciphertext C at the data number 4+2k+1, using the public key PK1: n and the secret key SK2: d at the data numbers 1 and 2, the d-th power of C in modulo n is calculated, the plaintext block $M\emptyset$ at the lowest digit of the plaintext in the base n expression is recovered, and this $M\emptyset$ is stored at a data number 4+2k+2 (step S501).

Then, the coefficient $K\emptyset$ of the $n^0$ term in the expansion of the e-th power of the plaintext in the base n expression in modulo $n^k$ is obtained as $K\emptyset = M\emptyset^e$ by using $M\emptyset$ obtained earlier and the public key PK2: e, and stored at a data number 5 (step S503). Then, a repetition parameter i for the purpose of sequentially obtaining the upper digits in the base n expression is initially set to 1 (step S505).

Then, for the repetition parameter i, the coefficient $K_{i-1}$ that is the polynomial function with $M\emptyset, M_1, \ldots, M_{i-1}$ as variables is calculated by using $M\emptyset, M_1, \ldots, M_{i-1}$ that are obtained earlier, and its value (integer value) is stored at a data number 4+i (step S506). Similarly, $K'_i$ that is the polynomial function with $M\emptyset, M_1, \ldots, M_{i-1}$ as variables is calculated by using $M\emptyset, M_1, \ldots, M_{i-1}$ that are obtained earlier, and its value (integer value) is stored at a data number 5+k+i (step S506).

Then, with respect to the ciphertext C at the data number 4+2k+1, $K_j$ ($0 \leq j \leq i-1$) at the data numbers 5 to 5+i-1, and $K'_i$ at the data number 5+k+i, a value $b_i$ defined by the following congruence (44) is calculated (step S507).

$$b_i \equiv \frac{C - (K_0 + nK_1 + \cdots + n^{i-1}K_{i-1} + nK'_i(\bmod\ n^{i+1}))}{n^i} (\bmod\ n) \quad (44)$$

Then, using the Euclidean algorithm, the decrypted $M_i$ is calculated by obtaining x that satisfies the following congruence (45), and the decrypted $M_i$ is stored at a data number 4+2k+2+i (step S509).

$$eM_0^{e-1}x \equiv b_i\ (\bmod\ n) \quad (45)$$

Then, whether the repetition completion condition i=k−1 holds or not is judged (step S511), and if not, the repetition parameter is incremented by 1 (step S513) and the operation returns to the step S506. Otherwise, the decrypted k plaintext blocks at the data numbers 4+2k+2 to 4+3k+1 are concatenated, and the resulting bit sequence is concatenated at an end of the data number 4+3k+2 (step S515) and the operation is terminated.

Now, with reference to FIG. 11, one modification of the secret communication system according to the first embodiment will be described.

This modification is directed to a case of providing a random number block R at a top of a plurality of plaintext blocks $M_i$ so as to replace $M\emptyset$ of the above description by R. This can be considered as a case of applying the encryption with respect to R∥M in which the random number block R and the plaintext M are concatenated, instead of the plaintext M of the above description.

Figure 11:
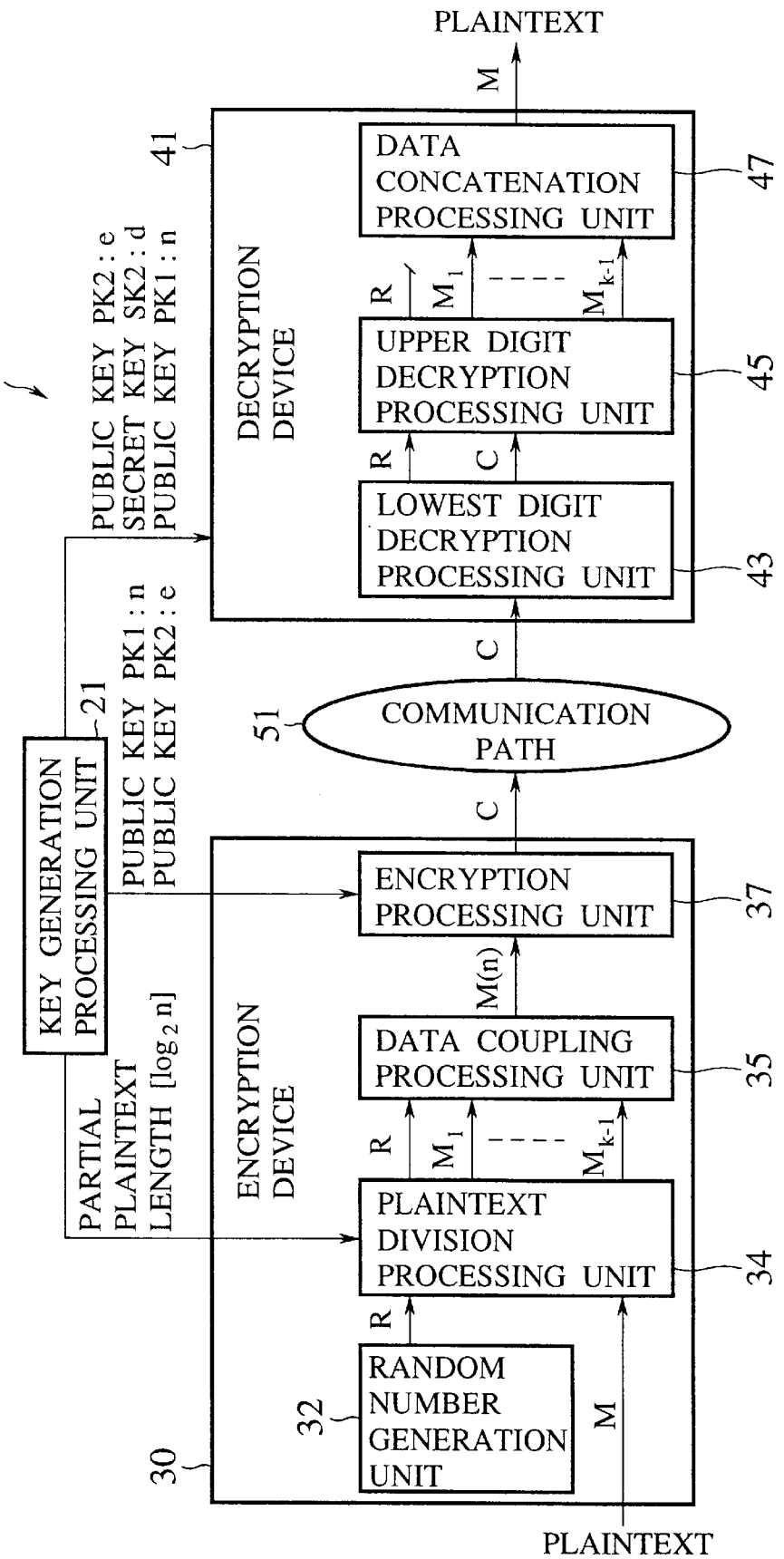
FIG. 11 is a block diagram of an RSA type secret communication system according to one modification of the first embodiment of the present invention.

FIG. 11 shows a configuration of a secret communication system 12 according to this modification, which comprises a key generation processing unit 21, an encryption device 30, a decryption device 41, and a communication path 51. Here, the elements other than the encryption device 30 are substantially the same as in FIG. 1 so that their description will be omitted.

[Encryption Device]

The encryption device 30 generates a ciphertext C obtained by encrypting a top block R and subsequent plaintext blocks $M_1, M_2, \ldots, M_{k-1}$ and transmits the ciphertext C to the decryption device 41 through the communication path 51, and further comprises a random number generation unit 32, a plaintext division processing unit 34, a data coupling processing unit 35, and an encryption processing unit 37. This encryption device 30 of FIG. 11 differs from the encryption device 31 of FIG. 1 in that the random number generation unit 32 is additionally provided and that the random number R and the plaintext M are entered into the plaintext division processing unit 34.

The random number generation unit 32 generates the random number R in a length equal to the partial plaintext length of $[\log_2 n]$ bits. This random number may very well be a reproducible pseudo-random number that can be generated mathematically or logically, or a non-reproducible random number. Also, there is no need to share this random number R with the decryption device 41, so that it is also possible to use a mathematically or logically non-reproducible random number generation means such as that which utilizes the white noise. In addition, it is preferable to generate a new random number R for use in each occasion of the secret communication from a viewpoint of the security of the cryptosystem. Even in a case of the multicast communication in which the same M is to be sent to a plurality of correspondents, the security of the cryptosystem against the multicast communication attack can be improved by using different values of the random number R for different correspondents.

The plaintext division processing unit 34 concatenates the random number R supplied from the random number generation unit 32 to a top of the entered plaintext M to form R∥M, generates the partial plaintexts (R, $M_1, \ldots, M_{k-1}$) by dividing R∥M into k blocks of a block size within a range of the residue class of n, and supplies these partial plaintexts to the data coupling processing unit 35. As a result, in this modification, the random number R is positioned in place of the top block $M\emptyset$ of the partial plaintexts used in the embodiment of FIG. 1. This can be considered as placing the random number R of a $[\log_2 n]$ bit length at a top of the bit sequence of the plaintext M to form R∥M, and redefining this message as M.

The data coupling processing unit 35 obtains a k-digit base n number M(n) in which a value of an i-th digit corresponds to the random number R (for i=0) or an i-th partial plaintext block $M_i$ ($1 \leq i \leq k-1$), by coupling the partial plaintext block data according to the following equation (46), and supplies this base n number M(n) to the encryption processing unit 37.

$$M(n) = R + nM_1 + n^2M_2 + \ldots + n^{k-1}M_{k-1} \quad (46)$$

The encryption processing unit 37 encrypts the base n number M(n) supplied from the data coupling processing unit 35 by using the public key PK2: e of the receiver according to the following congruence (47), and transmits the encrypted base n number as the ciphertext C to the decryption device 41 through the communication path 51.

$$C = (M(n))^e \pmod{n^k} = (R + nM_1 + \ldots + n^{k-1}M_{k-1})^e \pmod{n^k} \quad (47)$$

[Decryption Device]

The decryption device 41 decrypts the partial plaintexts $(R, M_1, \ldots, M_{k-1})$ from the ciphertext C received through the communication path 51 and recovers the original plaintext M by concatenating these partial plaintexts, and further comprises a lowest digit decryption processing unit 43, an upper digit decryption processing unit 45, and a data concatenation processing unit 47 similarly as in FIG. 1.

The lowest digit decryption processing unit 43 decrypts the lowest digit, i.e., the random number R, by using the receiver's secret key SK2: d according to the following congruence (48), and supplies the decrypted random number R to the upper digit decryption processing unit 45.

$$R = C^d \pmod{n} \quad (48)$$

The upper digit decryption processing unit 45 sequentially decrypts the upper digits, i.e., the blocks $M_1, M_2, \ldots, M_{k-1}$, other than the lowest digit R, by solving the linear modular equations in modulo n while utilizing R, and supplies these decrypted blocks to the data concatenation processing unit 47.

The data concatenation processing unit 47 recovers the original plaintext M by concatenating the decrypted partial plaintexts $(M_1, \ldots, M_{k-1})$ together.

Note here that the random number R is not necessary as a message in this case, so that the random number R may be discarded after being utilized in the decryption by the upper digit decryption processing unit 45.

Now, one concrete numerical example of this first embodiment for applying the base N public key cryptosystem of the present invention to the RSA type public key cryptosystem will be described.

[Key Generation Processing Unit]

Two prime numbers p=863 and q=733 (secret key SK1) are generated, and their product n=632579 (public key PK1) is determined. Then, L=315492 is calculated from the prime numbers p, q, and e=125 (public key PK2) and d=118625 (secret key SK2) are generated.

[Plaintext Division Processing Unit]

With respect to the plaintext M=1234567890, the partial plaintexts $(M0, M_1)$=(12345, 67890) are generated.

[Data Coupling Processing Unit and Encryption Processing Unit]

Using the public key PK2: e=125 of the receiver, the encryption is carried out according to the following congruence (49), and the obtained ciphertext C is transmitted to the receiver.

$$C = (12345 + 632579 \times 67890)^{125} \pmod{632579^2} = 91837206038 \quad (49)$$

[Lowest Digit Decryption Processing Unit]

At the receiver side, using the receiver's secret key SK2: d=118625, the lowest digit M0 is decrypted according the following equation (50).

$$M0 = 91837206038^{118625} \pmod{632579} = 12345 \quad (50)$$

[Upper Digit Decryption Processing Unit]

By solving the following linear modular equation (51) in modulo 632579, $M_1$=67890 is obtained.

$$53744x \equiv 59744 \pmod{632579} \quad (51)$$

[Data Concatenation Processing Unit]

By concatenating the decrypted partial plaintexts $(M0, M_1)$=(12345, 67890), the original plaintext M=1234567890 is recovered.

Referring now to FIG. 12 to FIG. 18, the second embodiment of a communication and authentication scheme based on a base N public key cryptosystem according to the present invention will be described in detail.

This second embodiment is directed to an RSA type authentication system in which the base N public key cryptosystem of the present invention is applied to the RSA type public key cryptosystem.

Figure 12:
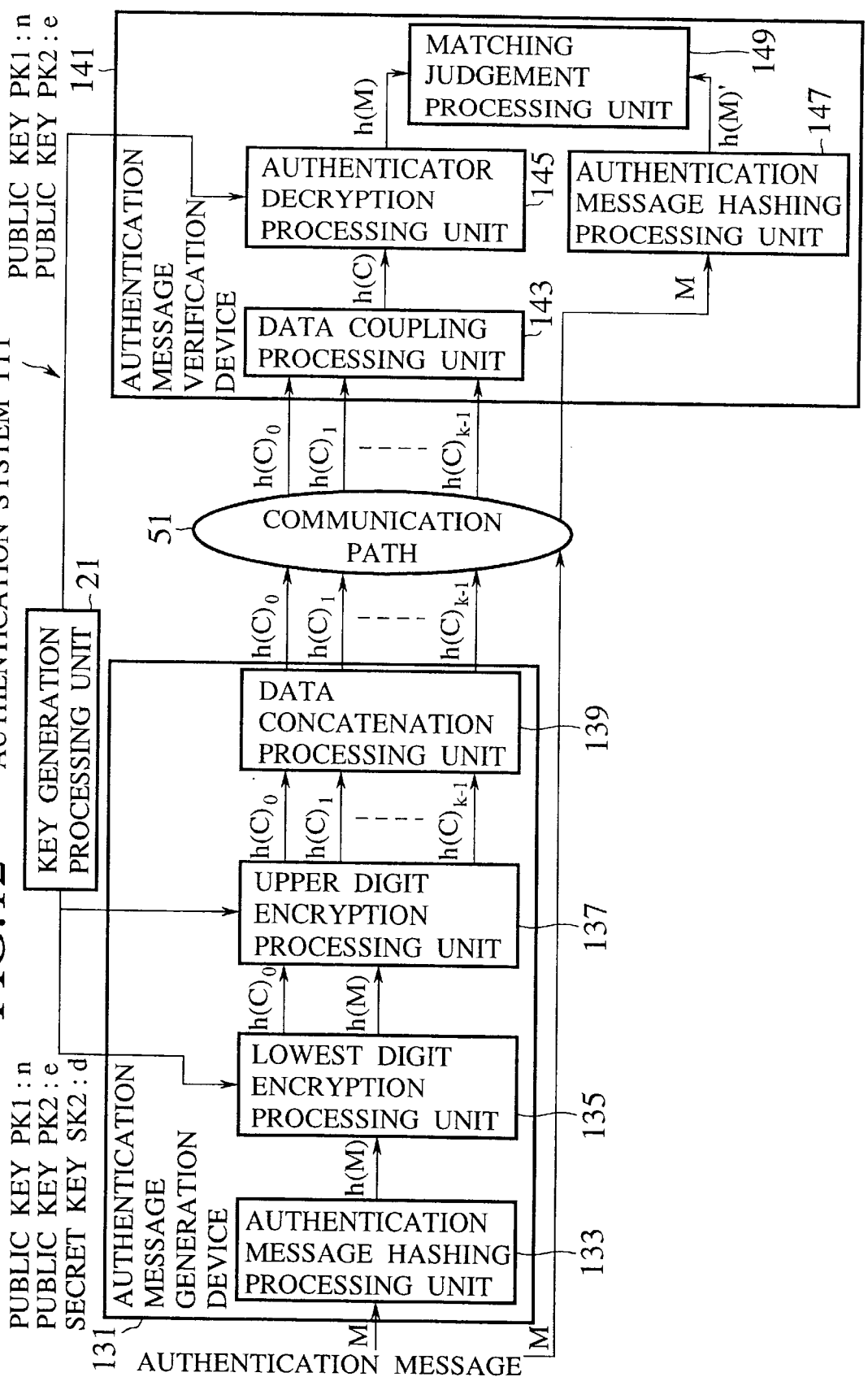
FIG. 12 is a block diagram of an RSA type authentication system in the second embodiment of a secret communication and authentication scheme based on a public key cryptosystem according to the present invention.

FIG. 12 shows a configuration of an authentication system 111 according to the second embodiment, which comprises a key generation processing unit 21, an authentication message generation device 131, an authentication message verification device 141, and a communication path 51.

This authentication system 111 of FIG. 12 realizes the authentication scheme in which a person who wishes to carry out the authentication transmits to a receiver an authenticator which is generated by encrypting an authentication message by using that person's secret key, according to the base N public key cryptosystem of the present invention.

[Key Generation Processing Unit]

The key generation processing unit 21 generates two prime numbers p, q as a secret key SK1, and calculates their product n=pq as a public key PK1. Also, the key generation processing unit 21 calculates L from the prime numbers p, q, and generates e as a public key PK2 and d as a secret key SK2 by using the calculated L. This operation by the key generation processing unit 21 is identical to that of the key generation processing unit 21 in the secret communication system 11 of FIG. 1.

[Authentication Message Generation Device]

The authentication message generation device 131 further comprises an authentication message hashing processing unit 133, a lowest digit encryption processing unit 135, an upper digit encryption processing unit 137, and a data concatenation processing unit 139.

[Authentication Message Hashing Processing Unit]

The authentication message hashing processing unit 133 hashes the authentication message M by using a hash function h, so as to obtain the authenticator h(M). Here it is assumed that $0 \leq h(M) < n^k$.

[Lowest Digit Encryption Processing Unit]

The lowest digit encryption processing unit 135 obtains the lowest digit of the authenticator in the base n expression by encrypting the authenticator h(M) according to the following congruence (52) using the public key PK1: n and the secret key SK2: d of the sender.

$$S0 = h(M)^d \pmod{n} \quad (52)$$

[Upper Digit Encryption Processing Unit]

Figure 13:
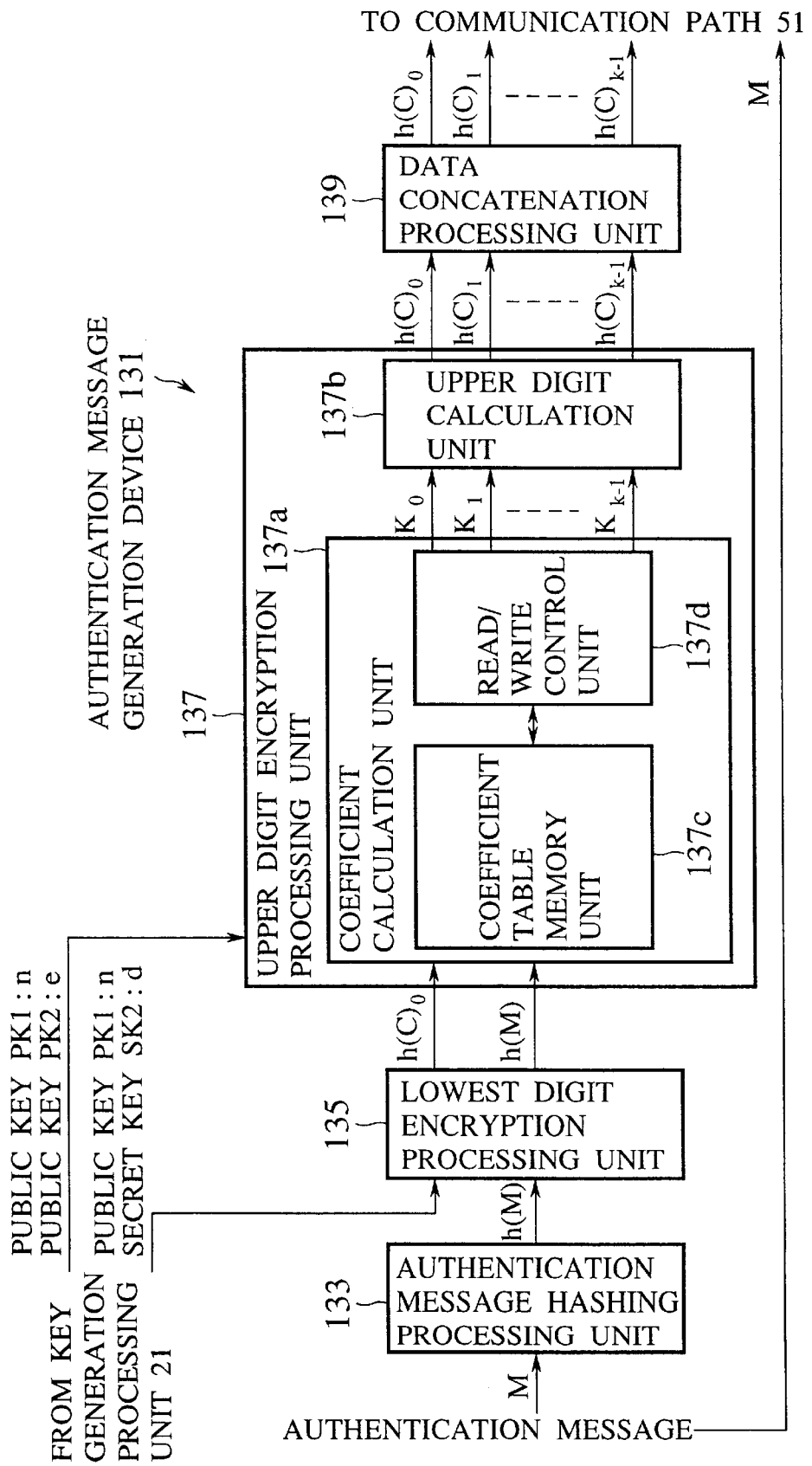
FIG. 13 is a block diagram of an authentication message generation device in the authentication system of FIG. 12.

As shown in FIG. 13, the upper digit encryption processing unit 137 further comprises a coefficient calculation unit 137a and an upper digit calculation unit 137b. The coefficient calculation unit 137a further includes a coefficient table memory unit 137c and a read/write control unit 137d for controlling read/write with respect to the coefficient table memory unit 137c.

This upper digit encryption processing unit 137 calculates the upper digits $S_1, S_2, \ldots, S_{k-1}$ other than the lowest digit of the authenticator in the base n expression, by solving the same linear modular equations as used in the decryption device 41 of the first embodiment, at the upper digit calculation unit 137b. In other words, the upper digits $S_i$ in the second embodiment can be obtained by exactly the same procedure by which the upper digits $M_i$ are obtained in the first embodiment, by replacing C and M in the first embodiment with h(M) and S respectively in the second embodiment.

[Data Concatenation Processing Unit]

The data concatenation processing unit 139 generates the encrypted authenticator $A1=\text{CONCAT}(S0, S_1, \ldots, S_{k-1})$ where CONCAT denotes concatenation, by concatenating the lowest digit and the upper digits of the authenticator in the base n expression. Then, a set of this encrypted authenticator A1 and the authentication message M is transmitted to the authentication message verification device 141 at the receiver side through the communication path 51.

[Authentication Message Verification Device]

The authentication message verification device 141 further comprises a data coupling processing unit 143, an authenticator decryption processing unit 145, an authentication message hashing processing unit 147, and a matching judgement processing unit 149.

[Data Coupling Processing Unit]

The data coupling processing unit 143 couples the received blocks of the encrypted authenticator A1 as numerical values indicating respective digits of the base n number, so as to generate the base n number $(S0+nS_1+\ldots+n^{k-1}S_{k-1})$.

[Authenticator Decryption Processing Unit]

The authenticator decryption processing unit 145 decrypts the authenticator A1 by calculating the following congruence (53) by using the public key PK2: e of the sender.

$$h(M) \equiv (S_0 + nS_1 + \ldots + n^{k-1}S_{k-1})^e \pmod{n^k} \tag{53}$$

[Authentication Message Hashing Processing Unit]

The authentication message hashing processing unit 147 hashes the authentication message M by using the hash function h so as to obtain the hashed authentication message h(M) as an authenticator A2.

[Matching Judgement Processing Unit]

The matching judgement processing unit 149 compares the authenticator A1 and the authenticator A2, and judges that the authentication is successful when they match, or that the authentication is unsuccessful when they do not match, so as to judge the authenticity of the authentication message.

Now, the overall operation in the authentication system 111 of FIG. 12 will be described in detail with references to the flow charts and tables indicating data arrangements on a memory.

Figure 14:
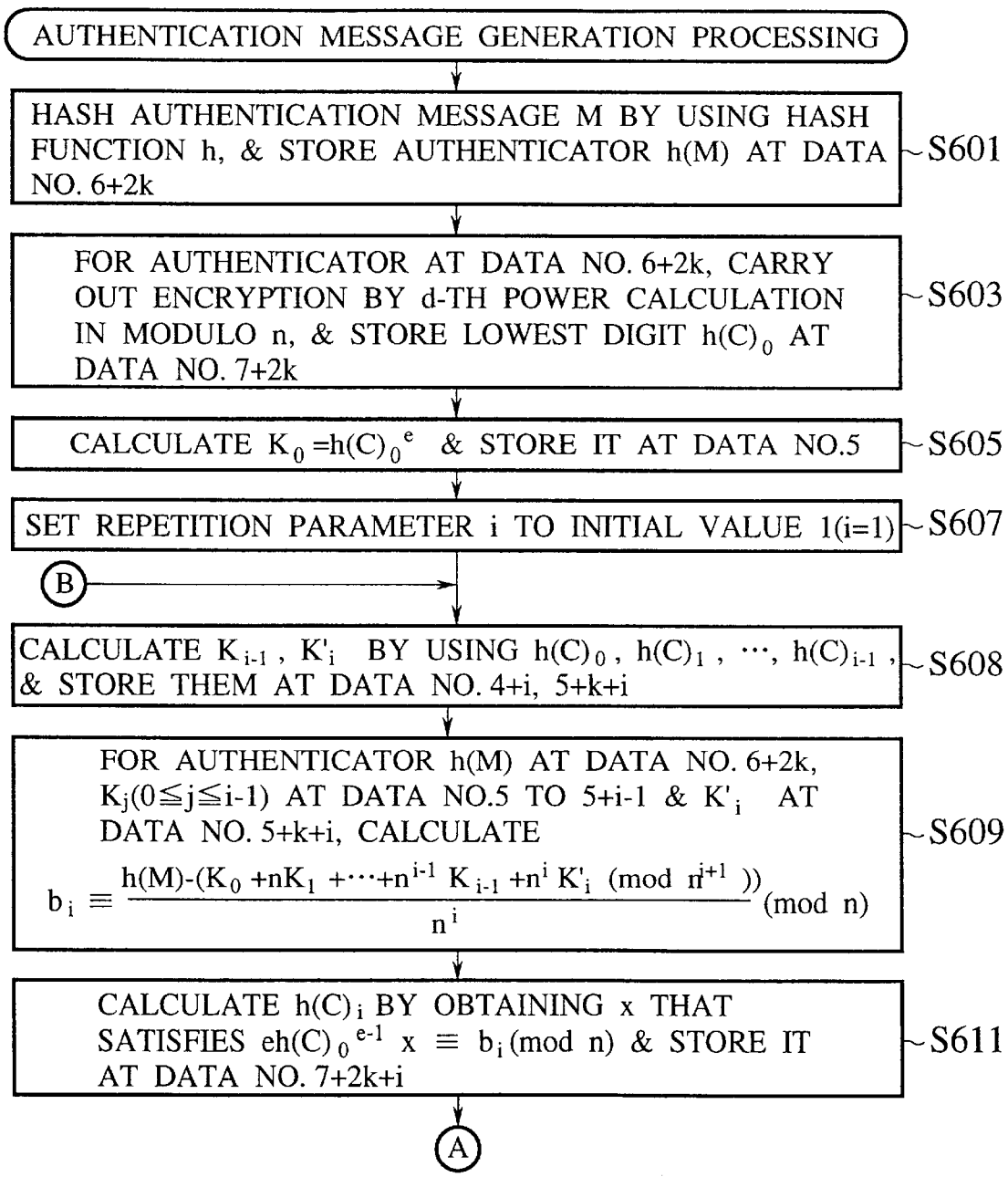
FIG. 14 is a flow chart for a part of an authentication message generation processing by the authentication message generation device in the authentication system of FIG. 12.
Figure 15:
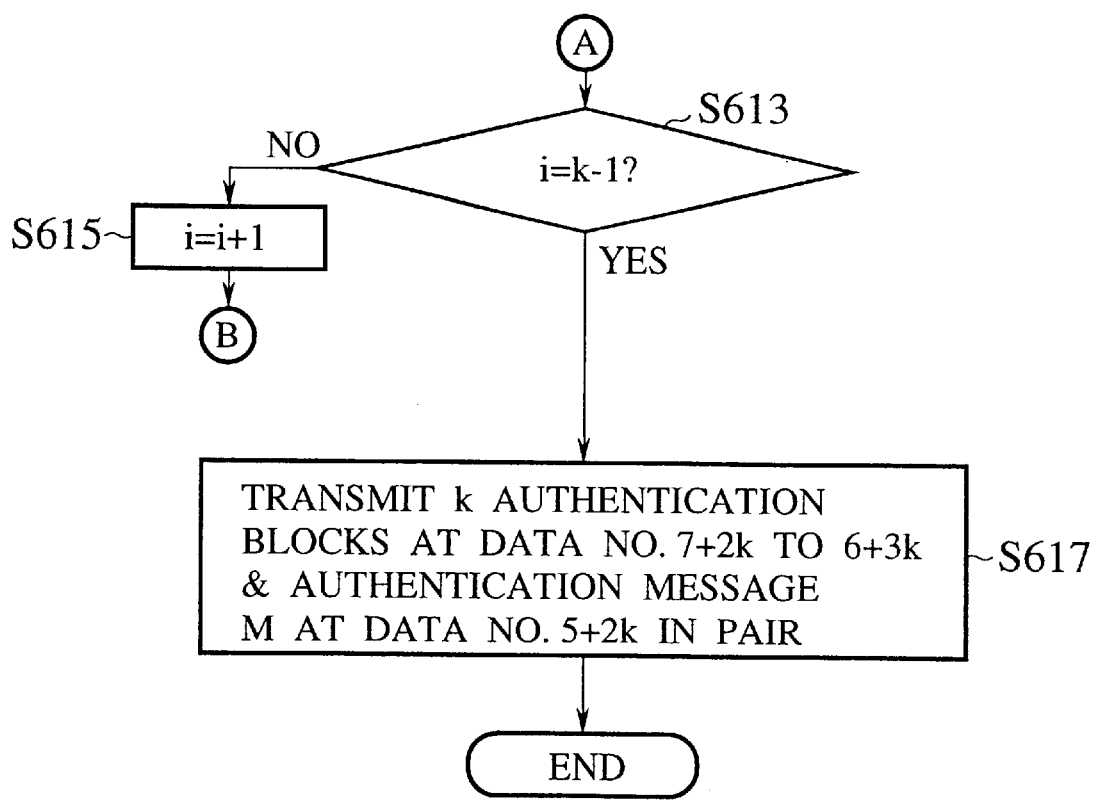
FIG. 15 is a flow chart for another part of an authentication message generation processing by the authentication message generation device in the authentication system of FIG. 12.

FIG. 14 and FIG. 15 show the flow chart for the authentication message generation processing in a case of applying the base n public key cryptosystem of the present invention to the RSA type public key cryptosystem, while FIG. 16 shows a table indicating the data arrangement on a memory in this authentication message generation processing.

As shown in FIG. 16, in the authentication message generation processing, the public key PK1: n and the public key PK2: e are given at a data number 1, and the secret key SK2: d is given at a data number 2, and the number of partial blocks k and the partial plaintext length $[\log_2 n]$ are given at data numbers 3 and 4 respectively. In addition, the authentication message M is given at a data number 5+2k, while data numbers 5 to 4+2k and 6+2k will be used as the work areas, and the processing result of the encrypted authenticator blocks will be stored at data numbers 7+2k to 6+3k.

According to FIG. 14 and FIG. 15, with respect to the authentication message M at the data number 5+2k, the hashing using the hash function h is carried out, and the resulting authenticator h(M) is stored at a data number 6+2k (step S601). Then, with respect to the authenticator at the data number 6+2k, the encryption processing using the d-th power calculation in modulo n is carried out by using the receiver's secret key SK2: d, and the resulting S0 which is the lowest digit of the authenticator in the base n expression is stored at a data number 7+2k (step S603).

Then, the coefficient K0 of the $n^0$ term in the expansion of the e-th power of the authenticator in the base n expression in modulo $n^k$ is obtained as $K0=S0^e$ by using the public key PK2: e, and stored at a data number 5 (step S605). Then, a repetition parameter i for the purpose of sequentially obtaining the upper digits in the base n expression is initially set to 1 (step S607).

Then, for the repetition parameter i, the coefficient $K_{i-1}$ that is the polynomial function with $S0, S_1, \ldots, S_{i-1}$ as variables is calculated by using $S0, S_1, \ldots, S_{i-1}$ that are obtained earlier, and its value (integer value) is stored at a data number 4+i (step S608). Similarly, $K'_i$ that is the polynomial function with $S0, S_1, \ldots, S_{i-1}$ as variables is calculated by using $S0, S_1, \ldots, S_{i-1}$ that are obtained earlier, and its value (integer value) is stored at a data number 5+k+i (step S608).

Then, with respect to the authenticator h(M) at the data number 6+2k, $K_j$ ($0 \leq j \leq i-1$) at the data numbers 5 to 5+i-1, and $K'_i$ at the data number 5+k+i, a value $b_i$ defined by the following congruence (54) is calculated (step S609).

$$b_i \equiv \frac{h(M) - (K_0 + nK_1 + \cdots + n^{i-1}K_{i-1} + n^i K'_i (\bmod\ n^{i+1}))}{n^i} \pmod{n} \tag{54}$$

Then, using the Euclidean algorithm, the encrypted $S_i$ is calculated by obtaining x that satisfies the following congruence (55), and the encrypted $S_i$ is stored at a data number 7+2k+i (step S611).

$$eS_0^{e-1}x \equiv b_i \pmod{n} \tag{55}$$

Then, whether the repetition completion condition $i=k-1$ holds or not is judged (step S613), and if not, the repetition parameter is incremented by 1 (step S615) and the operation returns to the step S608. Otherwise, a set of the encrypted k authenticator blocks at the data numbers 7+2k to 6+3k and the authentication message M at the data number 5k+2 are transmitted in pair (step S617), and the operation is terminated.

FIG. 17 shows the flow chart for the authentication message verification processing in a case of applying the base n public key cryptosystem of the present invention to the RSA type public key cryptosystem, while FIG. 18 shows a table indicating the data arrangement on a memory in this authentication message verification processing.

As shown in FIG. 18, in the authentication message verification processing, the public key PK1: n and the public key PK2: e are given at data numbers 1 and 2 respectively, and the number of partial blocks k and the partial plaintext length $[\log_2 n]$ are given at data numbers 3 and 4 respectively. In addition, the authentication message M in a form of the plaintext is given at a data number 5, and the encrypted authenticator blocks are given at data numbers 6 to 5+k, while data numbers 5+k+1 and 5+k+2 are work areas.

According to FIG. 17, with respect to the k authenticator blocks stored at the data numbers 6 to 5+k, using the public key PK2: e of the sender, the authenticator A1 is decrypted by calculating the following congruence (56) in modulo $n^k$, and the decrypted authenticator A1 is stored at a data number 5+k+1 (step S701).

$$h(M) \equiv (S0 + nS_1 + n^2 S_2 + \ldots + n^{k-1}S_{k-1})^e \pmod{n^k} \tag{56}$$

Then, with respect to the authentication message M at the data number 5, the hashing using the hash function h is carried out, and the resulting h(M)' is stored as the authenticator A2 at a data number 5+k+2 (step S703).

Then, the decrypted authenticator A1: h(M) at the data number 5+k+1 and the authenticator A2; h(M)' at the data number 5+k+2 obtained by the hashing are compared (step S705). When they match, the authentication success indication is outputted (step S707) whereas otherwise the authentication failure notice is outputted (step S709), and the operation is terminated.

Referring now to FIG. 19 to FIG. 25, the third embodiment of a communication and authentication scheme based on a base N public key cryptosystem according to the present invention will be described in detail.

This third embodiment is directed to a Rabin type secret communication system in which the base N public key cryptosystem of the present invention is applied to the Rabin type public key cryptosystem.

Figure 19:
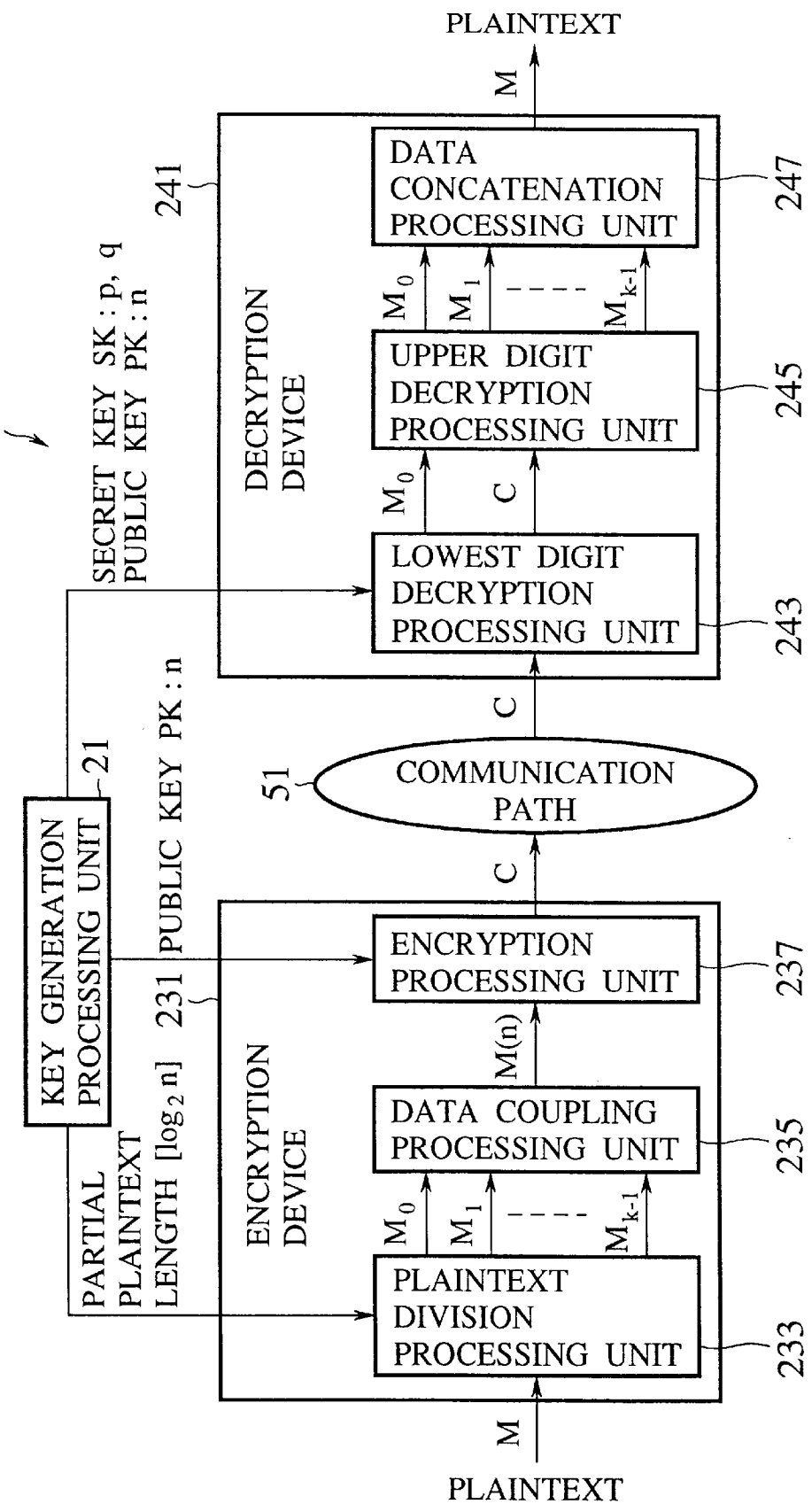
FIG. 19 is a block diagram of a Rabin type secret communication system in the third embodiment of a secret communication and authentication scheme based on a public key cryptosystem according to the present invention.

FIG. 19 shows a configuration of a secret communication system 211 according to the third embodiment, which comprises a key generation processing unit 21, an encryption device 231, a decryption device 241, and a communication path 51.

[Key Generation Processing Unit]

The key generation processing unit 21 has the same key generation function as the key generation processing unit 21 of FIG. 1, and the first half of the key generation function described above will be utilized here. Namely, the key generation processing unit 21 generates two prime numbers p, q as a secret key SK, and calculates their product n=pq as a public key PK.

[Encryption Device]

The Encryption device 231 generates a ciphertext C obtained by encrypting a plaintext M and transmits the ciphertext C to the decryption device 241 through the communication path 51, and further comprises a plaintext division processing unit 233, a data coupling processing unit 235, and an encryption processing unit 237.

The plaintext division processing unit 233 generates partial plaintexts (M0, $M_1$, ..., $M_{k-1}$) by dividing the plaintext M into k blocks of a block size within a range of the residue class of n, and supplies these partial plaintexts to the data coupling processing unit 235.

The data coupling processing unit 235 obtains a k-digit base n number M(n) in which a value of an i-th digit corresponds to an i-th partial plaintext block $M_i$ ($0 \leq i \leq k-1$), by coupling the partial plaintext block data according to the following equation (57), and supplies this base n number M(n) to the encryption processing unit 237.

$$M(n) = M0 + nM_1 + n^2 M_2 + \ldots + n^{k-1} M_{k-1} \tag{57}$$

The encryption processing unit 237 encrypts the base n number M(n) supplied from the data coupling processing unit by using the public key PK: n of the receiver according to the following congruence (58), and transmits the encrypted base n number as the ciphertext C to the decryption device 241 through the communication path 51.

$$C \equiv (M(n))^2 \pmod{n^k} \equiv (M0 + nM_1 + \ldots + n^{k-1} M_{k-1})^2 \pmod{n^k} \tag{58}$$

[Decryption Device]

The decryption device 241 decrypts the partial plaintexts (M0, $M_1$, ..., $M_{k-1}$) from the ciphertext C received through the communication path 51 and recovers the original plaintext M by concatenating these partial plaintexts, and further comprises a lowest digit decryption processing unit 243, an upper digit decryption processing unit 245, and a data concatenation processing unit 247.

The lowest digit decryption processing unit 243 decrypts the lowest digit, i.e., the block M0, by using the receiver's secret key SK: p, q (n=pq) according to the following simultaneous quadratic modular equations (59), and supplies the decrypted block M0 to the upper digit decryption processing unit 245. For the solution of the simultaneous quadratic modular equations (59), the standard technique will be utilized.

$$x^2 \equiv C \pmod{p}, x^2 \equiv C \pmod{q} \tag{59}$$

The upper digit decryption processing unit 245 sequentially decrypts the upper digits, i.e., the blocks $M_1, M_2, \ldots, M_{k-1}$, other than the lowest digit M0, by solving the linear modular equations in modulo n while utilizing M0, and supplies these decrypted blocks along with M0 to the data concatenation processing unit 247.

Here, $M_1, M_2, \ldots, M_{k-1}$ are inductively obtained as follows. Namely, the partial plaintext block $M_i$ is a solution x of the linear modular equation $2M_0 x \equiv b_i \pmod{n}$ that satisfies the following congruence (60), $$b_i \equiv \frac{\left(C - \sum_{\substack{0 \leq l,m \leq i-1 \\ l+m \leq i}}^{l+m \leq i} M_l M_m n^{l+m}\right) \pmod{n^{i+1}}}{n^i} \pmod{n} \tag{60}$$

where the sum is taken for all combinations of l and m such that each one of l and m is within a range from 0 to i−1 and l+m does not exceed i.

The data concatenation processing unit 247 recovers the original plaintext M by concatenating the decrypted partial plaintexts (M0, $M_1$, ..., $M_{k-1}$) together.

Now, the overall operation in the secret communication system 211 of FIG. 19 will be described in detail with references to the flow charts and tables indicating data arrangements on a memory.

Figure 20:
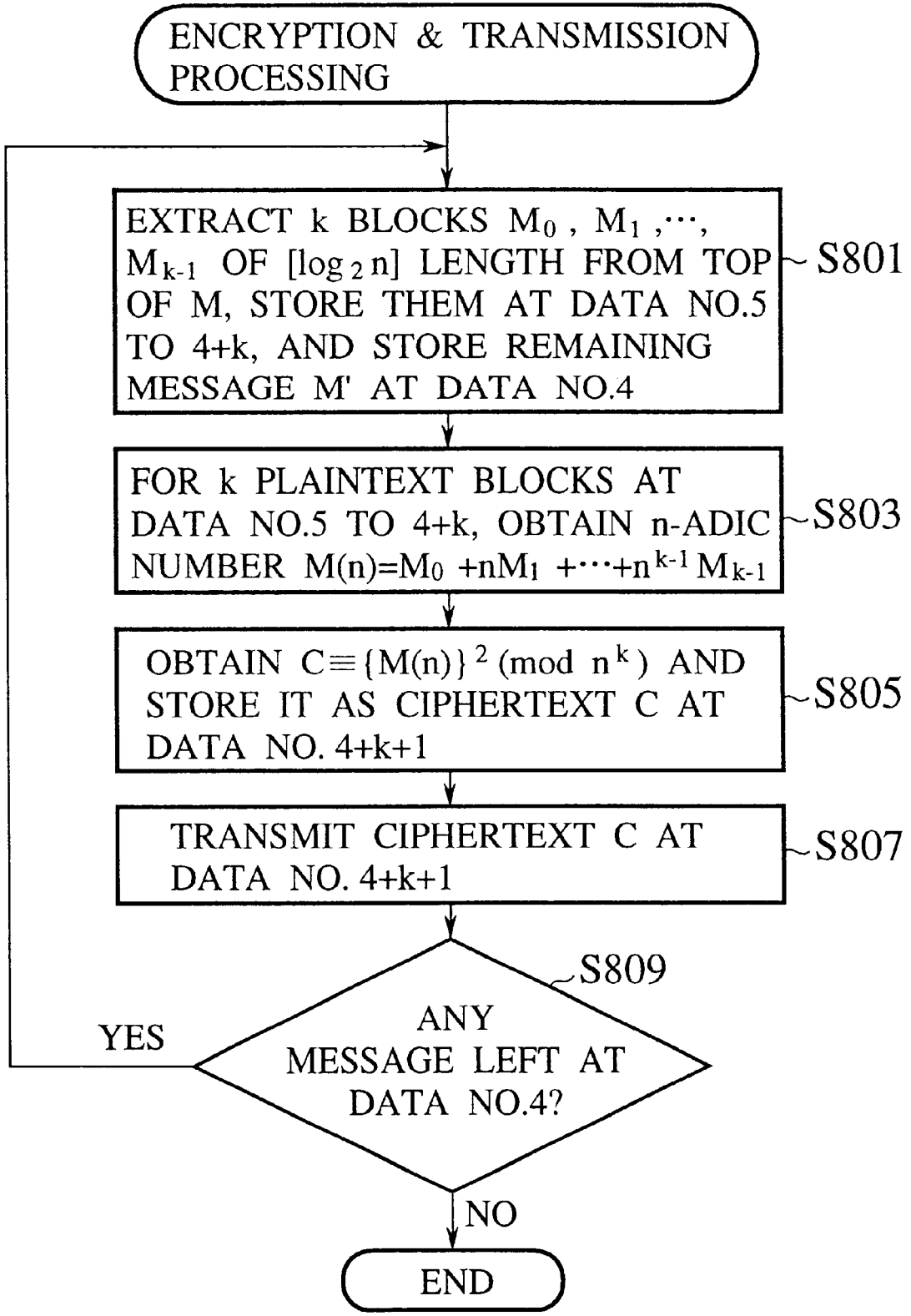
FIG. 20 is a flow chart for an encryption and transmission processing by an encryption device in the secret communication system of FIG. 19.

FIG. 20 shows the flow chart for the encryption and transmission processing by the encryption device 231, while FIG. 21 shows a table indicating the data arrangement on a memory in this encryption and transmission processing.

As shown in FIG. 21, in the encryption and transmission processing, the public key PK: n, the partial plaintext length [$\log_2 n$] and the plaintext M are given at data numbers 1, 3 and 4 respectively. Data numbers 5 to 4+k will be used as the work areas for storing the partial plaintext blocks, and a number of partial blocks k and a ciphertext C will be obtained at data numbers 2 and 4+k+1 respectively as a result of this processing. Here, it is assumed that a number of partial blocks k is to be obtained as a result of the division, but it is also possible to provide a predetermined number from the beginning and carry out the encryption for this predetermined number of partial blocks.

According to FIG. 20, the plaintext M at the data number 4 is read out first, and k plaintext blocks $M_i$ ($0 \leq i \leq k-1$) of a bit length [$\log_2 n$] each are extracted from a top of M. Then, these plaintext blocks are sequentially stored at data numbers 5 to 4+k, while the remaining message M' is stored at a data number 4 (step S801).

Then, with respect to the k plaintext blocks stored at the data numbers 5 to 4+k, the base n number given by the following equation (61) is obtained (step S803).

$$M(n) = M0 + nM_1 + n^2 M_2 + \ldots + n^{k-1} M_{k-1} \tag{61}$$

Then, using the public key PK: n at the data number 1, $C \equiv \{M(n)\}^2 \pmod{n^k}$ is obtained and stored as the ciphertext C at a data number 4+k+1 (step S805), and this ciphertext C at the data number 4+k+1 is transmitted (step S807).

Then, whether there is any message left at the data number 4 or not is checked (step S809), and if there is, the operation returns to the step S801, whereas otherwise the operation is terminated.

Figure 22:
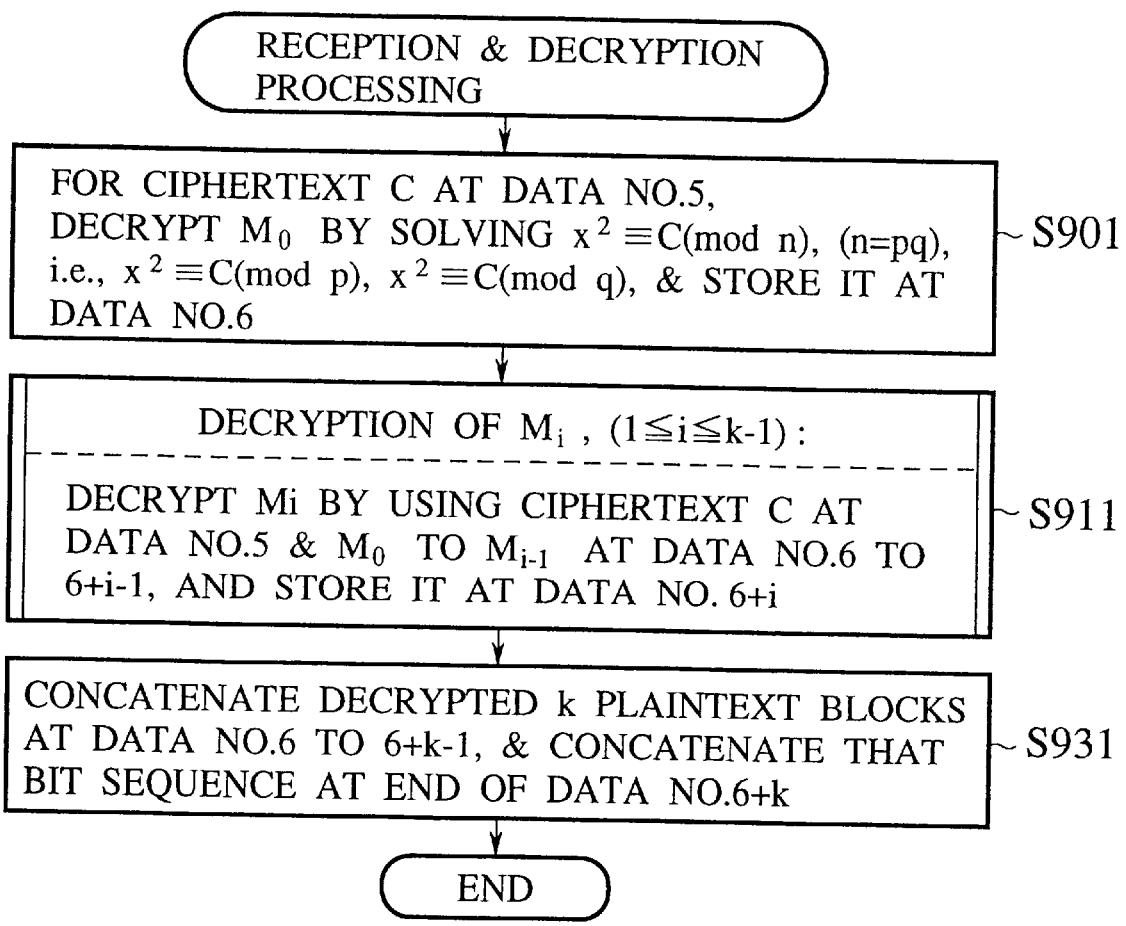
FIG. 22 is a flow chart for a reception and decryption processing by a decryption device in the secret communication system of FIG. 19.
Figure 23:
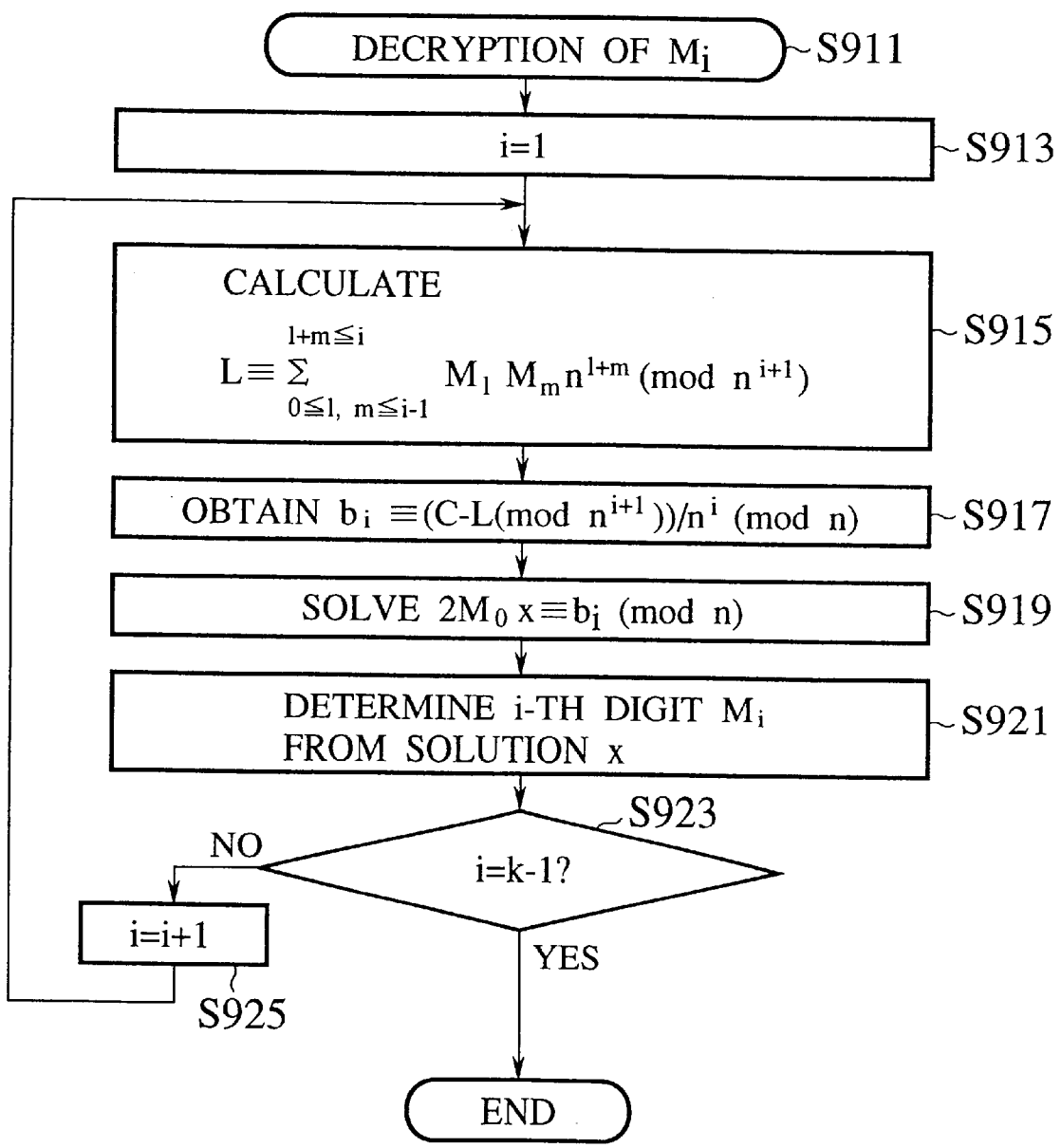
FIG. 23 is a flow chart for a plaintext block decryption step in the reception and decryption processing according to the flow chart of FIG. 22.

FIG. 22 and FIG. 23 show the flow chart for the reception and decryption processing by the decryption device 241, while FIG. 24 shows a table indicating the data arrangement on a memory in this reception and decryption processing.

As shown in FIG. 24, in the reception and decryption processing, the public key PK: n and the secret key SK: p, q are given at data numbers 1 and 2 respectively, and the number of partial blocks k, the partial plaintext length $[\log_2 n]$, and the ciphertext C are given at data numbers 3, 4 and 5 respectively. In addition, data numbers 6 to 6+k−1 will be used as the work areas for storing the partial plaintext blocks, and the decrypted plaintext will be stored at a data number 6+k.

According to FIG. 22, with respect to the ciphertext C at the data number 5, the decrypted plaintext block M0 at the lowest digit of the plaintext in the base n expression is obtained by solving $x^2 \equiv C \pmod{n}$ (n=pq). That is, the decrypted lowest digit M0 is obtained by solving the simultaneous quadratic modular equations of $x^2 \equiv \pmod{p}$ and $x^2 \equiv C \pmod{q}$, and stored at the data number 6 (step S901).

Then, the decrypted upper digits $M_i$ ($i \leq i \leq k-1$) of the plaintext in the base n expression are obtained by the procedure of FIG. 23 to be described in detail below (step S911).

Then, the decrypted k plaintext blocks at the data numbers 6 to 6+k−1 are concatenated, and the resulting bit sequence is concatenated at an end of the data number 6+k (step S931) and the operation is terminated.

In this operation of FIG. 22, an exemplary method for solving the simultaneous quadratic modular equations that can be used at the step S901 is as follows.

Namely, $x^2 \equiv C \pmod{p}$ can be solved by calculating the following equation (62).

$$GCD(x^{(p-1)/2}-1, x^2-C) = x - M_p \qquad (62)$$

where GCD denotes a function for obtaining the greatest common divisor.

Then, using this $M_p$ and $M_q$ which is also obtained similarly as $M_p$, the solution to the simultaneous quadratic modular equations can be obtained by calculating the following congruence (63).

$$M0 = q \times M_p + p \times M_q \pmod{n} \qquad (63)$$

Note that the solution method described here is only one example, and there are many other known methods for solving the simultaneous quadratic modular equations of the step S901.

Also, in the operation of FIG. 22, the decrypted upper digits $M_i$ ($1 \leq i \leq k-1$) of the plaintext in the base n expression can be obtained at the step S911 according to the flow chart of FIG. 23 as follows.

First, a repetition parameter i for the purpose of sequentially obtaining the upper digits in the base n expression is initially set to 1 (step S913).

Then, for two parameters l, m which are both in a range of greater than or equal to 0 and less than or equal to i−1, and for which l+m is in a range of less than or equal to i, a sum L of $M_l M_m n^{l+m}$ is calculated in modulo $n^{i+1}$ (step S915). Then, $b_i = (C-L \pmod{n^{i+1}})/n^i \pmod{n}$ is obtained (step S917).

Then, the linear modular equation $2M0x \equiv b_i \pmod{n}$ is solved (step S919), and the value $M_i$ of the i-th digit is determined as the obtained solution x, and stored at the data number 6+i (step S921).

Then, whether the repetition completion condition i=k−1 holds or not is judged (step S923), and if not, the repetition parameter is incremented by 1 (step S925) and the operation returns to the step S915, whereas otherwise this operation of FIG. 23 is terminated.

Now, with reference to FIG. 25, one modification of the secret communication system according to the third embodiment will be described.

This modification is directed to a case of providing a random number block R at a top of a plurality of plaintext blocks $M_i$ so as to replace M0 of the above description by R. This can be considered as a case of applying the encryption with respect to R∥M in which the random number block R and the plaintext M are concatenated, instead of the plaintext M of the above description.

Figure 25:
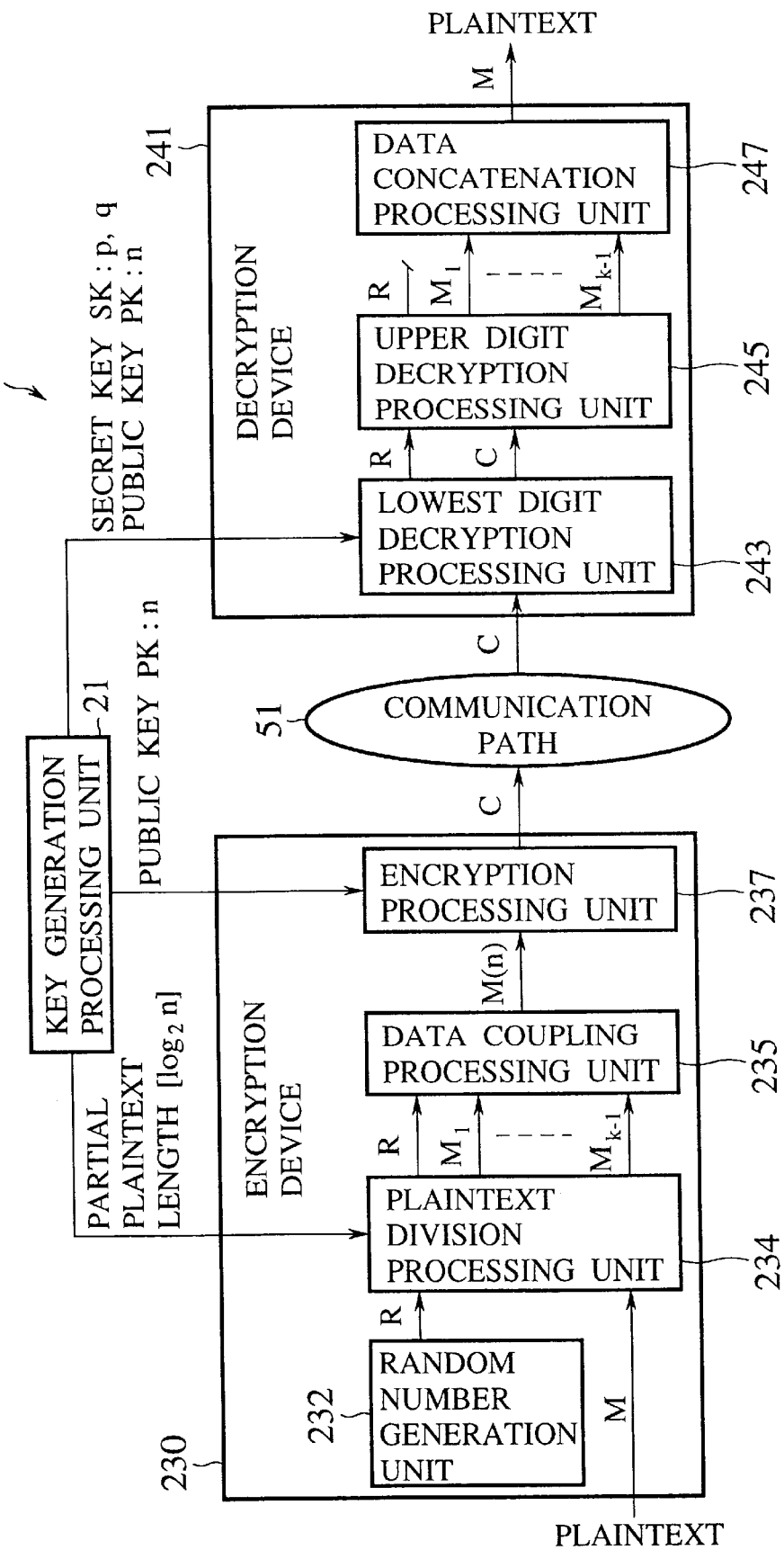
FIG. 25 is a block diagram of a Rabin type secret communication system according to one modification of the third embodiment of the present invention.

FIG. 25 shows a configuration of a secret communication system 212 according to this modification, which comprises a key generation processing unit 21, an encryption device 230, a decryption device 241, and a communication path 51. Here, the elements other than the encryption device 230 are substantially the same as in FIG. 19 so that their description will be omitted.

[Encryption Device]

The encryption device 230 generates a ciphertext C obtained by encrypting R∥M in which the random number R and the plaintext M are concatenated and transmits the ciphertext C to the decryption device 241 through the communication path 51, and further comprises a random number generation unit 232, a plaintext division processing unit 234, a data coupling processing unit 235, and an encryption processing unit 237.

The random number generation unit 232 generates the random number R in a length equal to the partial plaintext length of $[\log_2 n]$ bits. This random number may very well be a reproducible pseudo-random number that can be generated mathematically or logically, or a non-reproducible random number. Also, there is no need to share this random number R with the decryption device 241, so that it is also possible to use a mathematically or logically non-reproducible random number generation means such as that which utilizes the white noise. In addition, it is preferable to generate a new random number R for use in each occasion of the secret communication from a viewpoint of the security of the cryptosystem. Even in a case of the multicast communication in which the same M is to be sent to a plurality of correspondents, the security of the cryptosystem against the multicast communication attack can be improved by using different values of the random number R for different correspondents.

The plaintext division processing unit 234 concatenates the random number R supplied from the random number generation unit 232 to a top of the entered plaintext M to form R∥M, generates the partial plaintexts (R, $M_1$, . . . , $M_{k-1}$) by dividing R∥M into k blocks of a block size within a range of the residue class of n, and supplies these partial plaintexts to the data coupling processing unit 235. As a result, in this modification, the random number R is positioned in place of the top block M0 of the partial plaintexts used in the embodiment of FIG. 19. This can be considered as placing the random number R of a $[\log_2 n]$ bit length at a top of the bit sequence of the plaintext M to form R∥M, and re-defining this message as M.

The data coupling processing unit 235 obtains a k-digit base n number M(n) in which a value of an i-th digit corresponds to the random number R (for i=0) or an i-th partial plaintext block M; (1≦i≦k−1), by coupling the partial plaintext block data according to the following equation (64), and supplies this base n number M(n) to the encryption processing unit 237.

$$M(n) = R + nM_1 + n^2 M_2 + \ldots + n^{k-1} M_{k-1} \quad (64)$$

The encryption processing unit 237 encrypts the base n number M(n) supplied from the data coupling processing unit 235 by using the public key PK: n of the receiver according to the following congruence (65), and transmits the encrypted base n number as the ciphertext C to the decryption device 241 through the communication path 51.

$$C \equiv (M(n))^2 \pmod{n^k} \equiv (R + nM_1 + \ldots + n^{k-1} M_{k-1})^2 \pmod{n^k} \quad (65)$$

[Decryption Device]

The decryption device 241 decrypts the partial plaintexts (R, $M_1, \ldots, M_{k-1}$) from the ciphertext C received through the communication path 51 and recovers the original plaintext M by concatenating these partial plaintexts, and further comprises a lowest digit decryption processing unit 243, an upper digit decryption processing unit 245, and a data concatenation processing unit 247 similarly as in FIG. 19.

The lowest digit decryption processing unit 243 decrypts the lowest digit, i.e., the random number R, by using the receiver's secret key SK: p, q (n=pq) and solving the following simultaneous quadratic modular equations (66), and supplies the decrypted random number R to the upper digit decryption processing unit 245. For the solution of the simultaneous quadratic modular equations (66), the standard technique will be utilized.

$$x^2 \equiv C \pmod{p}, x^2 \equiv C \pmod{q} \quad (66)$$

The upper digit decryption processing unit 245 sequentially decrypts the upper digits, i.e., the blocks $M_1, M_2, \ldots, M_{k-1}$, other than the lowest digit R, by solving the linear modular equations in modulo n while utilizing R, and supplies these decrypted blocks to the data concatenation processing unit 247.

Here, $M_1, M_2, \ldots, M_{k-1}$ are recursively obtained as follows. Namely, let a solution of the linear modular equation $2M_0 x \equiv b_i \pmod{n}$ that satisfies the following congruence (67) be $M_k$, $$b_i \equiv \frac{\left(C - \sum_{\substack{0 \leq l, m \leq i-1}}^{l+m \leq i} M_l M_m n^{l+m}\right) \pmod{n^{i+1}}}{n^i} \pmod{n} \quad (67)$$

where the sum is taken for all combinations of l and m such that each one of l and m is within a range from 0 to i−1 and l+m does not exceed i. Then, from this $M_k$, it is possible to sequentially obtain $M_1, \ldots, M_{k-1}$.

The data concatenation processing unit 247 recovers the original plaintext M by concatenating the decrypted partial plaintexts ($M_1, \ldots, M_{k-1}$) together.

Note here that the random number R is not necessary as a message in this case, so that the random number R may be discarded after being utilized in the decryption by the upper digit decryption processing unit 245.

Now, one concrete numerical example of this third embodiment for applying the base N public key cryptosystem of the present invention to the Rabin type public key cryptosystem will be described.

[Key Generation Processing Unit]

Two prime numbers p=863 and q=733 (secret key SK) are generated, and their product n=632579 (public key PK) is determined. Also, it is assumed that k=2.

[Plaintext Division Processing Unit]

With respect to the plaintext M=1234567890, the partial plaintexts ($M_0, M_1$)=(12345, 67890) of a block size within a range of the residue class of n are generated.

[Encryption Processing Unit]

The encryption is carried out according to the following congruence (68), and the obtained ciphertext C is transmitted to the receiver.

$$C \equiv (12345 + 632579 \times 67890)^2 \pmod{632579^2} = 317915175516 \quad (68)$$

[Lowest Digit Decryption Processing Unit]

At the receiver side, using the receiver's secret key SK: p=863, q=733, the lowest digit $M_0$=12345 is obtained by solving the following simultaneous quadratic modular equations (69).

$$x^2 \equiv C \pmod{p}, x^2 \equiv C \pmod{q} \quad (69)$$

[Upper Digit Decryption Processing Unit]

By solving the following linear modular equation (70) in modulo n=632579, the upper digit $M_1$=67890 is obtained.

$$24690 x \equiv 502329 \pmod{632579} \quad (70)$$

[Data Concatenation Processing Unit]

By concatenating the decrypted partial plaintexts ($M_0, M_1$)=(12345, 67890), the original plaintext M=1234567890 is recovered.

Referring now to FIG. 26 to FIG. 31, the fourth embodiment of a communication and authentication scheme based on a base N public key cryptosystem according to the present invention will be described in detail.

This fourth embodiment is directed to a Rabin type authentication system in which the base N public key cryptosystem of the present invention is applied to the Rabin type public key cryptosystem.

Figure 26:
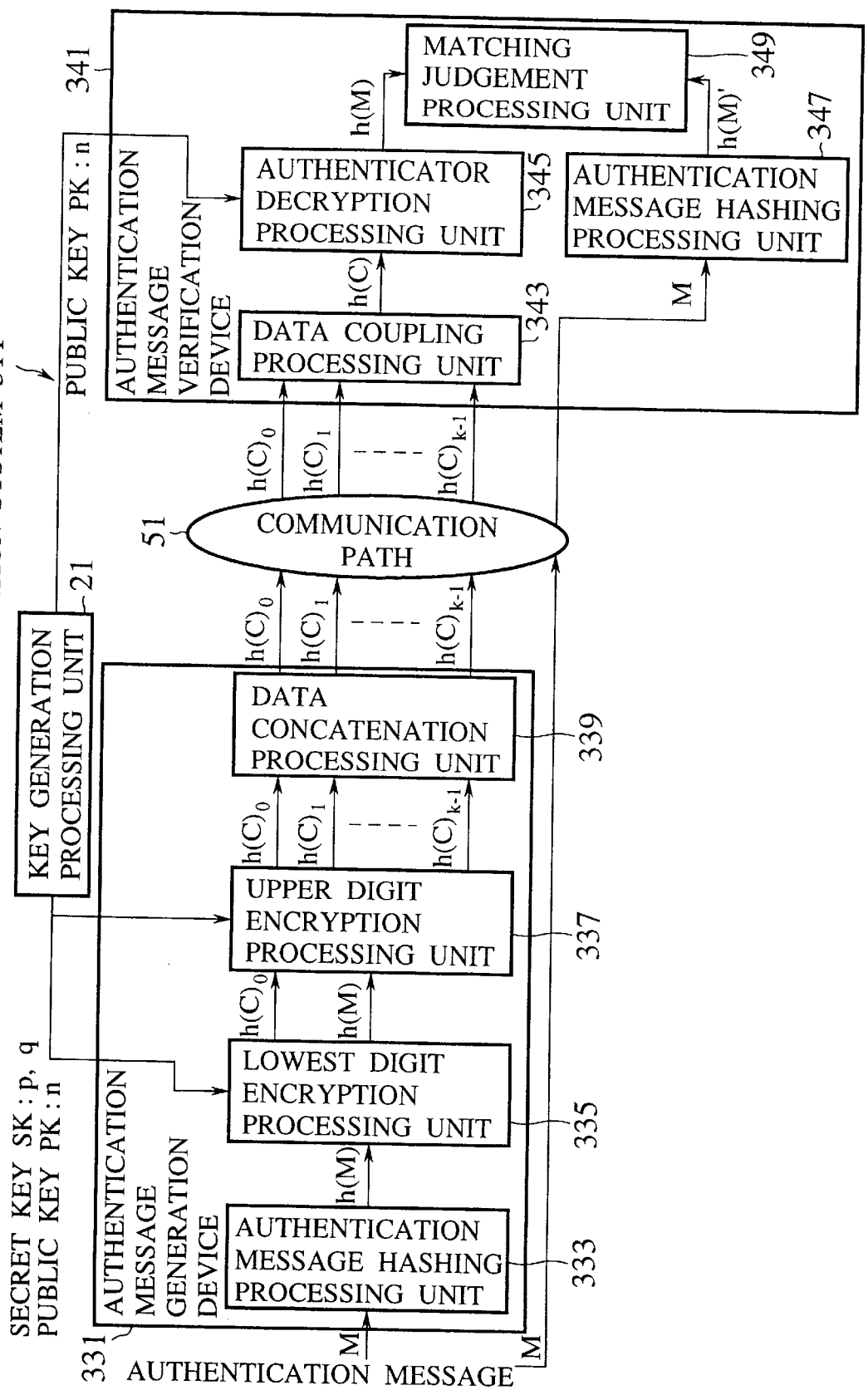
FIG. 26 is a block diagram of a Rabin type authentication system in the fourth embodiment of a secret communication and authentication scheme based on a public key cryptosystem according to the present invention.

FIG. 26 shows a configuration of an authentication system 311 according to the fourth embodiment, which comprises a key generation processing unit 21, an authentication message generation device 331, an authentication message verification device 341, and a communication path 51.

This authentication system 311 of FIG. 26 realizes the authentication scheme in which a person who wishes to carry out the authentication transmits to a receiver an authenticator which is generated by encrypting an authentication message by using that person's secret key, according to the base N public key cryptosystem of the present invention.

[Key Generation Processing Unit]

The key generation processing unit 21 generates two prime numbers p, q as a secret key SK, and calculates their product n=pq as a public key PK. This operation by the key generation processing unit 21 is identical to that of the key generation processing unit 21 in the secret communication system 211 of FIG. 19.

[Authentication Message Generation Device]

The authentication message generation device 331 further comprises an authentication message hashing processing unit 333, a lowest digit encryption processing unit 335, an upper digit encryption processing unit 337, and a data concatenation processing unit 339.

[Authentication Message Hashing Processing Unit]

The authentication message hashing processing unit 333 hashes the authentication message M by using a hash function h, so as to obtain the authenticator h(M). Here it is assumed that $0 \leq h(M) < n^k$.

[Lowest Digit Encryption Processing Unit]

The lowest digit encryption processing unit 335 obtains the lowest digit $S_0$ of the encrypted authenticator in the base n expression as a solution of the following simultaneous quadratic modular equations (71) which is calculated by using the public key PK: n and the secret key SK: p, q of the sender.

$$x^2 \equiv h(M) \pmod{p}, \ x^2 \equiv h(M) \pmod{q} \tag{71}$$

[Upper Digit Encryption Processing Unit]

The upper digit encryption processing unit 337 calculates the upper digits $S_1, S_2, \ldots, S_{k-1}$ other than the lowest digit of the authenticator in the base n expression, by solving the same linear modular equations as used in the decryption device 241 of the third embodiment. In other words, the upper digits Si in the fourth embodiment can be obtained by exactly the same procedure by which the upper digits $M_i$ are obtained in the third embodiment, by replacing C and M in the third embodiment with h(M) and S respectively in the fourth embodiment. Here, when there is no solution to the linear modular equation, the authentication message is re-defined as M=M+r, where r is a certain number, and the processing is returned to the authentication message hashing processing described above.

[Data Concatenation Processing Unit]

The data concatenation processing unit 339 generates the encrypted authenticator A1=CONCAT(S0, $S_1, \ldots, S_{k-1}$) where CONCAT denotes concatenation, by concatenating the lowest digit and the upper digits of the authenticator in the base n expression. Then, a set of this encrypted authenticator A1 and the authentication message M is transmitted to the authentication message verification device 341 at the receiver side through the communication path 51.

[Authentication Message Verification Device]

The authentication message verification device 341 further comprises a data coupling processing unit 343, an authenticator decryption processing unit 345, an authentication message hashing processing unit 347, and a matching judgement processing unit 349.

[Data Coupling Processing Unit]

The data coupling processing unit 343 couples the received blocks of the encrypted authenticator A1 as numerical values indicating respective digits of the base n number, so as to generate the base n number (S0+$nS_1$+ . . . +$n^{k-1}S_{k-1}$).

[Authenticator Decryption Processing Unit]

The authenticator decryption processing unit 345 decrypts the authenticator A1 by calculating the following congruence (72) by using the public key PK: n of the sender.

$$h(M) \equiv (S_0 + nS_1 + \ldots + n^{k-1}S_{k-1}) \pmod{n^k} \tag{72}$$

[Authentication Message Hashing Processing Unit]

The authentication message hashing processing unit 347 hashes the authentication message M by using the hash function h so as to obtain the hashed authentication message h(M) as an authenticator A2.

[Matching Judgement Processing Unit]

The matching judgement processing unit 349 compares the authenticator A1 and the authenticator A2, and judges that the authentication is successful when they match, or that the authentication is unsuccessful when they do not match, so as to judge the authenticity of the authentication message.

Now, the overall operation in the authentication system 311 of FIG. 26 will be described in detail with references to the flow charts and tables indicating data arrangements on a memory.

Figure 27:
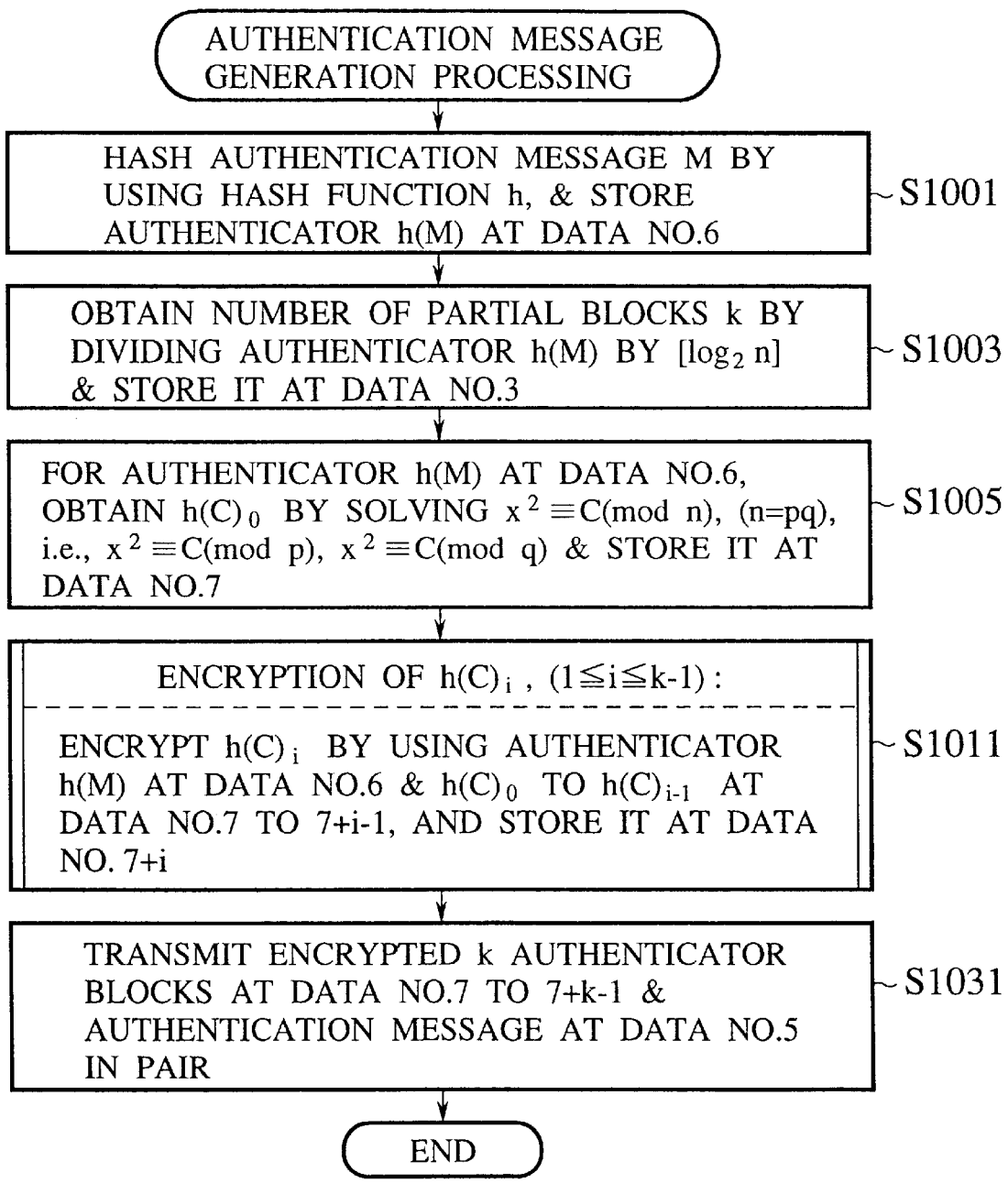
FIG. 27 is a flow chart for an authentication message generation processing by the authentication message generation device in the authentication system of FIG. 26.
Figure 28:
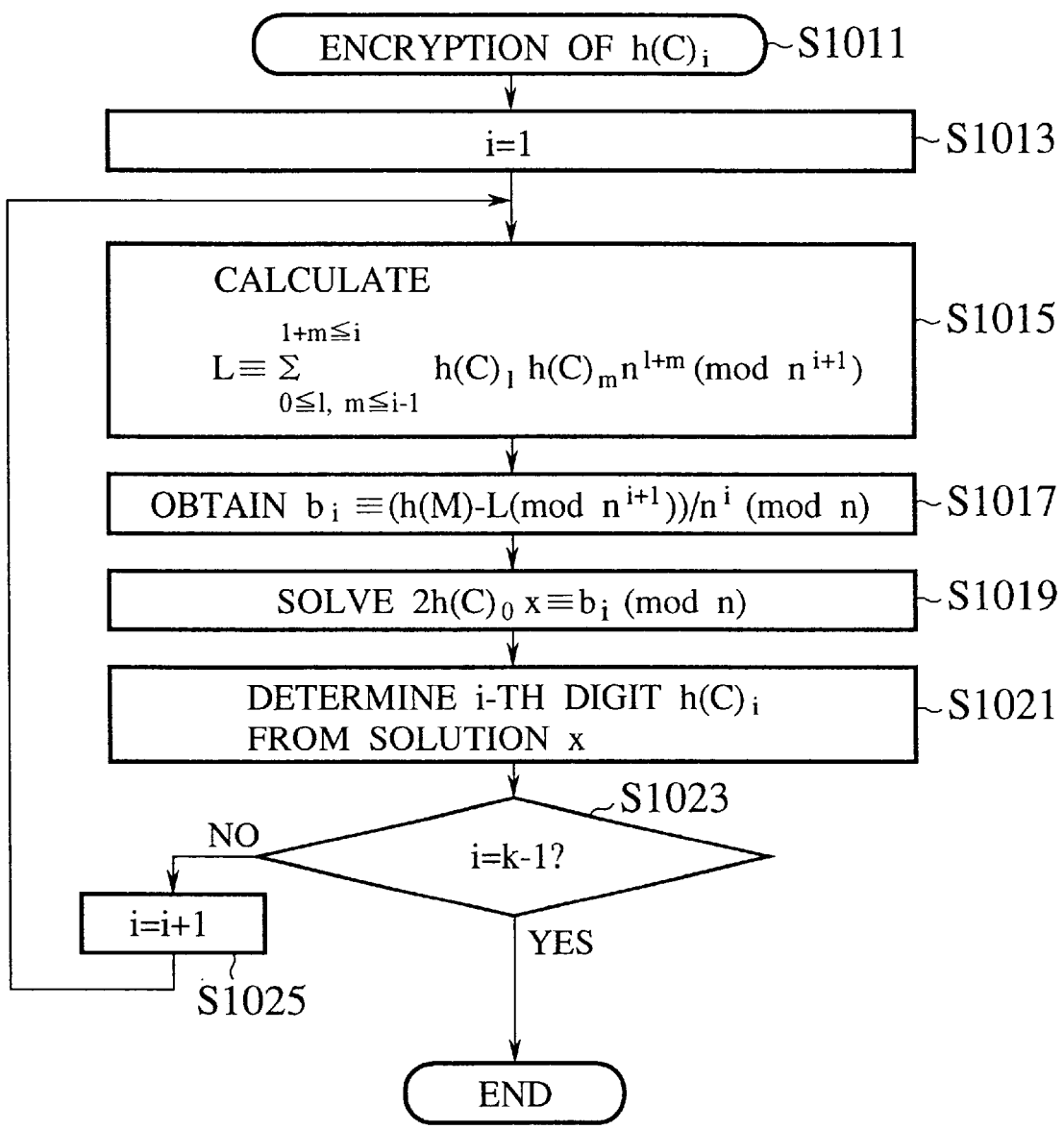
FIG. 28 is a flow chart for an authenticator block encryption step in the authentication message generation processing according to the flow chart of FIG. 27.

FIG. 27 and FIG. 28 show the flow chart for the authentication message generation processing in a case of applying the base n public key cryptosystem of the present invention to the Rabin type public key cryptosystem, while FIG. 29 shows a table indicating the data arrangement on a memory in this authentication message generation processing.

As shown in FIG. 29, in the authentication message generation processing, the public key PK: n and the secret key SK: p, q are given at data numbers 1 and 2 respectively, and the partial plaintext length [$\log_2$ n] and the authentication message M are given at data numbers 4 and 5 respectively. In addition, the number of partial blocks k will be stored at a data number 3, while a data number 6 will be used as the work area for storing the authenticator h(M) obtained by hashing the authentication message M, and the generated encrypted authenticator blocks will be stored at data numbers 7 to 6+k.

According to FIG. 27, with respect to the authentication message M at the data number 5, the hashing using the hash function h is carried out, and the resulting authenticator h(M) is stored at a data number 6 (step S1001). Then, with respect to the authenticator h(M) at the data number 6, the number of partial blocks k is obtained by dividing the authenticator h(M) by the partial plaintext length [$\log_2$ n], and stored at the data number 3 (step S1003).

Then, with respect to the authenticator h(M) at the data number 6, the authenticator block h(M)0 which is the lowest digit of the authenticator in the base n expression is encrypted by solving $x^2 \equiv h(M) \pmod{n}$ (n=pq). That is, the encrypted lowest digit S0 is obtained by solving the simultaneous quadratic modular equations of $x^2 \equiv h(M) \pmod{p}$ and $x^2 \equiv h(M) \pmod{q}$, and stored at the data number 7 (step S1005).

Then, the encrypted upper digits $S_i$ (1≦i≦k−1) of the authenticator in the base n expression are obtained by the procedure of FIG. 28 to be described in detail below (step S1011).

Then, a set of the encrypted k authenticator blocks at the data numbers 7 to 7+k−1 and the authentication message M at the data number 5 are transmitted in pair (step S1031), and the operation is terminated.

In this operation of FIG. 27, an exemplary method for solving the simultaneous quadratic modular equations that can be used at the step S1005 is as follows.

Namely, $x^2 \equiv C \pmod{p}$ can be solved by calculating the following equation (73).

$$GCD(x^{(p-1)/2}-1, x^2-h(M)) = x - S_p \tag{73}$$

where GCD denotes a function for obtaining the greatest common divisor.

Then, using this $S_p$ and $S_q$ which is also obtained similarly as $S_p$, the solution to the simultaneous quadratic modular equations can be obtained by calculating the following congruence (74).

$$S\emptyset = q \times S_p + p \times S_q \pmod{n} \tag{74}$$

Note that the solution method described here is only one example, and there are many other known methods for solving the simultaneous quadratic modular equations of the step S1005.

Also, in the operation of FIG. 27, the encrypted upper digits $S_i$ (1≦i≦k−1) of the authenticator in the base n expression can be obtained at the step S1011 according to the flow chart of FIG. 28 as follows.

First, a repetition parameter i for the purpose of sequentially obtaining the upper digits in the base n expression is initially set to 1 (step S1013).

Then, for two parameters l, m which are both in a range of greater than or equal to 0 and less than or equal to i−1, and for which l+m is in a range of less than or equal to i, a sum L of $S_lS_mn^{l+m}$ is calculated in modulo $n^{i+1}$ (step S1015). Then, $b_i \equiv (h(M)-(\text{mod } n^{i+1}))/n^i \pmod{n}$ is obtained (step S1017).

Then, the linear modular equation $2S_0 \times \equiv b_i \pmod{n}$ is solved (step S1019), and the value $S_i$ of the i-th digit is determined as the obtained solution x, and stored at the data number 7+i (step S1021).

Then, whether the repetition completion condition i=k−1 holds or not is judged (step S1023), and if not, the repetition parameter is incremented by 1 (step S1025) and the operation returns to the step S1015, whereas otherwise this operation of FIG. 28 is terminated.

Figure 30:
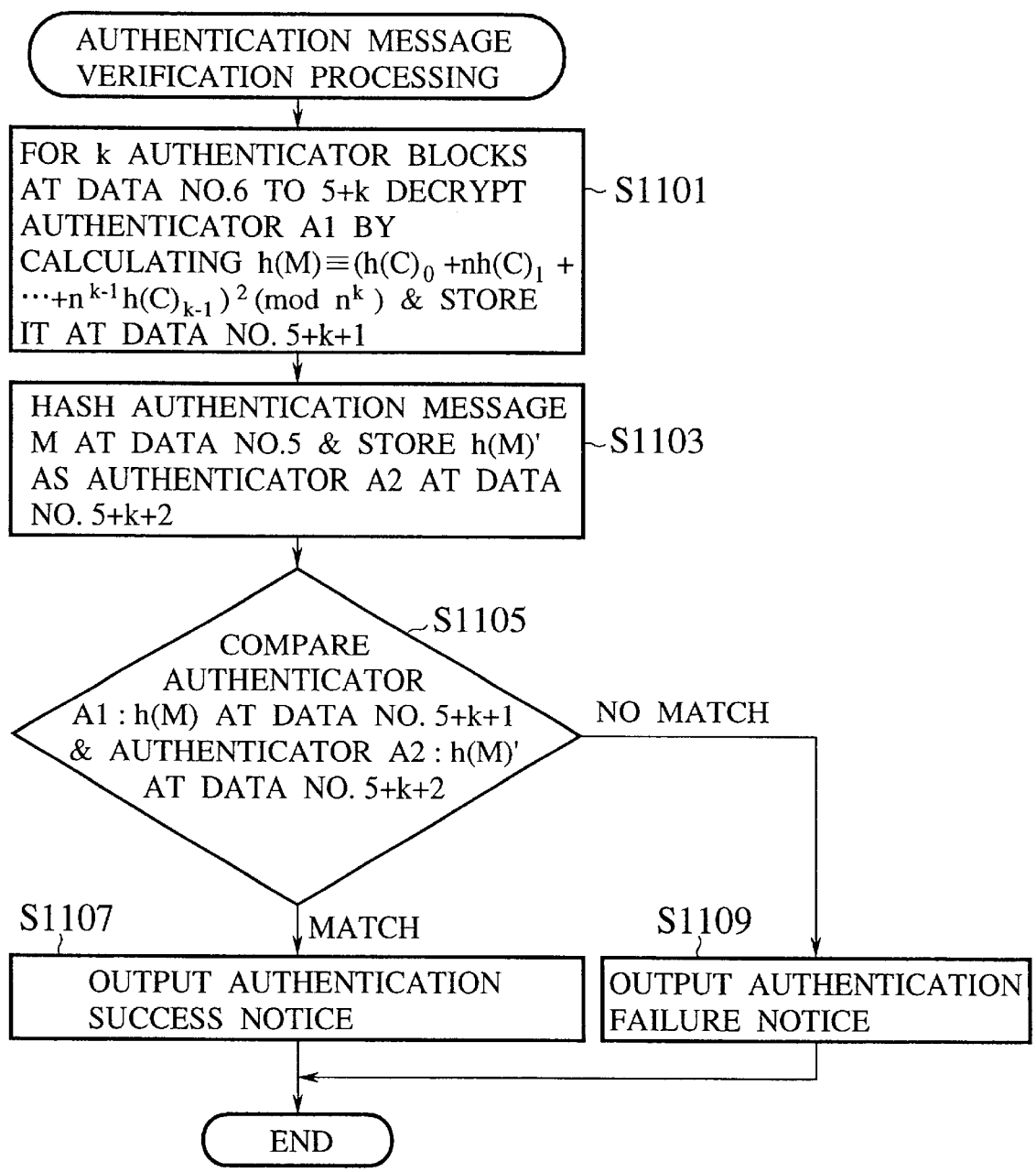
FIG. 30 is a flow chart for an authentication message verification processing by an authentication message verification device in the authentication system of FIG. 26.

FIG. 30 shows the flow chart for the authentication message verification processing in a case of applying the base n public key cryptosystem of the present invention to the Rabin type public key cryptosystem, while FIG. 31 shows a table indicating the data arrangement on a memory in this authentication message verification processing.

As shown in FIG. 31, in the authentication message verification processing, the public key PK: n, the number of partial blocks k and the partial plaintext length $[\log_2 n]$ are given at data numbers 1, 3 and 4 respectively.

In addition, the authentication message M in a form of the plaintext is given at a data number 5, and the encrypted authenticator blocks are given at data numbers 6 to 5+k, while data numbers 5+k+1 and 5+k+2 are work areas. Data number 2 will not be used in this case.

According to FIG. 30, with respect to the k authenticator blocks stored at the data numbers 6 to 5+k, using the public key PK: n of the sender, the authenticator A1 is decrypted by calculating the following congruence (75) in modulo $n^k$ where the authentication blocks are coupled together as respective digits of the base n number, and the decrypted authenticator A1 is stored at a data number 5+k+1 (step S1101).

$$h(M) \equiv (S_0 + nS_1 + n^2 S_2 + \ldots + n^{k-1} S_{k-1})^2 \pmod{n^k} \quad (75)$$

Then, with respect to the authentication message M at the data number 5, the hashing using the hash function h is carried out, and the resulting h(M)' is stored as the authenticator A2 at a data number 5+k+2 (step S1103).

Then, the decrypted authenticator A1: h(M) at the data number 5+k+1 and the authenticator A2; h(M)' at the data number 5+k+2 obtained by the hashing are compared (step S1105). When they match, the authentication success indication is outputted (step S1107) whereas otherwise the authentication failure notice is outputted (step S1109), and the operation is terminated.

Referring now to FIG. 32 to FIG. 39, the fifth embodiment of a communication and authentication scheme based on a base N public key cryptosystem according to the present invention will be described in detail.

This fifth embodiment is directed to a decryption scheme which does not require a use of a coefficient table unlike the previous embodiments. This decryption scheme of the fifth embodiment decrypts the upper digits $M_i$ ($1 \leq i \leq k-1$) recursively by the identical mapping or formula, using the value of the lowest digit $M_0$.

In the following, the principle of this decryption scheme will be described for an exemplary case of applying this decryption scheme to the RSA type base N public key cryptosystem will be described, but this decryption scheme is equally applicable to a case of decrypting the upper digits in the Rabin type base N public key cryptosystem by setting e=2. Note that the decryption of the lowest digit $M_0$ is substantially the same as in the previous embodiments so that it will not be repeated here.

Now, consider a case of decrypting the i-th digit M; after up to the (i−1)-th digits $M_{i-1}$ have been decrypted.

In this case, the already decrypted i plaintext blocks of $M_0$ to $M_{i-1}$ can be expressed as a base n number $A_{i-1}$ given by the following equation (76).

$$A_{i-1} = M_0 + nM_1 + n^2 M_2 + \ldots + n^{i-1} M_{i-1} \quad (76)$$

Then, using this $A_{i-1}$, the received ciphertext C can be expressed by the following congruence (77).

$$C \equiv (M_0 + nM_1 + \ldots + n^{k-1} M_{k-1})^e \pmod{n^k} \equiv (A_{i-1} + n^i M_i + n^{i+1} M_{i+1} + \ldots + n^{k-1} M_{k-1})^e \pmod{n^k} \quad (77)$$

Here, in order to remove an influence of the (i+1)-th digit $M_{i+1}$ and the subsequent plaintext blocks which are unnecessary in decrypting $M_i$, consider the residue obtained by dividing both sides of the congruence (77) by $n^{i+1}$. Namely, C can be given by the following congruence (78):

$$C \equiv A_{i-1}^e + eA_{i-1}^{e-1} n^i M_i \pmod{n^{i+1}} \quad (78)$$

which can be re-expressed by the following congruence (79) by transposition:

$$eA_{i-1}^{e-1} n^i M_i \equiv C - A_{i-1}^e \pmod{n^{i+1}} \quad (79)$$

Then, by dividing both sides by $n^i$, the following congruence (80) can be obtained.

$$eA_{i-1}^{e-1} M_i \equiv (C - A_{i-1}^e \pmod{n^{i+1}})/n^i \pmod{n} \quad (80)$$

Thus, it follows that it is possible to decrypt $M_i$ by obtaining x that satisfies the following congruence (81).

$$eA_{i-1}^{e-1} x \equiv (C - A_{i-1}^e \pmod{n^{i+1}})/n^i \pmod{n} \quad (81)$$

Now, an exemplary program implementing this recursive procedure for obtaining $M_i$ sequentially from a lower digit to an upper digit by the same procedure will be described. In the following program, a symbol ":=" denotes a substitution of a constant value or calculated value on the right hand side into the left hand side. Also, a sentence beginning with "for" is a repeat control command for commanding the repetition of execution commands between "begin" and "end".

Input: n, e, C, k, $M_0$
Output: $M_1, M_2, \ldots, M_{k-1}$
$A_{-1} := 0$;
for i=1 to (k−1) do
  begin
    $A_{i-1} := A_{i-2} + n^{i-1} M_{i-1}$;
    $F_{i-1} := A_{i-1}^e \pmod{n^{i+1}}$;
    $E_i := C - F_{i-1} \pmod{n^{i+1}}$;
    $B_i := E_i / n^i$;
    $M_i := (eF_{i-1})^{-1} A_{i-1} B_i \pmod{n}$;
  end The principle of the scheme for decrypting upper digits without using a coefficient table has been described here for a case of the RSA type base N public key cryptosystem, but the upper digits in the Rabin type base N public key cryptosystem can be also decrypted by the similar procedure as described above, with only a minor adaptation of setting e=2.

Also, the encryption of the upper digits in the authentication message generation is based on the same principle as the decryption of the upper digits in the secret communication in both the RSA type and the Rabin type, so that the principle of this scheme for decrypting the upper digits can be similarly utilized for encrypting the upper digits of the authentication message.

Next, the operation of a decryption device for the RSA type base N public key cryptosystem using the above described decryption scheme of this fifth embodiment will be described in detail.

Here, the configurations of the secret communication system, the encryption device and the decryption device are similar to those of FIG. 1 or FIG. 11, and the operations in the encryption processing and the decryption processing up to the decryption of the lowest digit M$\emptyset$ or R are also similar to the first embodiment described above.

Figure 32:
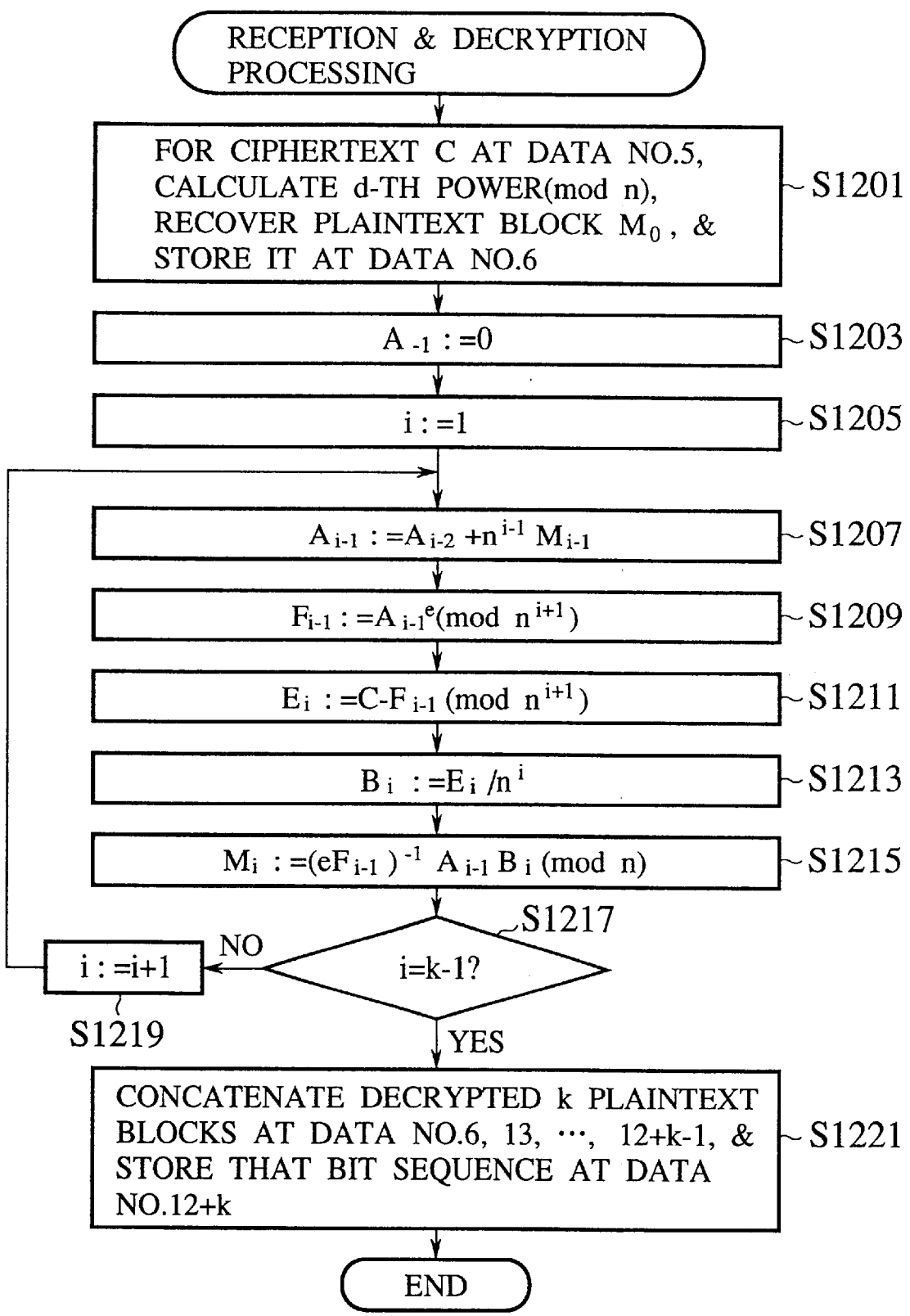
FIG. 32 is a flow chart for an RSA type reception and decryption processing in the fifth embodiment of a secret communication and authentication scheme based on a public key cryptosystem according to the present invention.

FIG. 32 shows the flow chart for the reception and decryption processing in the RSA type base N public key cryptosystem according to this fifth embodiment, while FIG. 33 shows a table indicating the data arrangement on a memory in this reception and decryption processing.

As shown in FIG. 33, in this reception and decryption processing, the public key PK1: n and the public key PK2: e are given at a data number 1, the secret key SK2: d is given at a data number 2, and the number of partial blocks k and the partial plaintext length [$\log_2$ n] are given at data numbers 3 and 4 respectively. In addition, the ciphertext C is given at a data number 5, while data numbers 6 to 12+k−1 will be used as the work areas, and the decrypted plaintext will be stored at a data number 12+k.

According to FIG. 32, with respect to the ciphertext C at the data number 5, using the public key PK1: n and the secret key SK2: d at the data numbers 1 and 2, the d-th power of C in modulo n is calculated, the plaintext block M$\emptyset$ at the lowest digit of the plaintext in the base n expression is recovered, and this M$\emptyset$ is stored at a data number 6 (step S1201).

Then, a value 0 of an initialization variable $A_{-1}$ is stored at a data number 8 (step S1203), and an initial value 1 of a loop counter i is stored at a data number 7 (step S1205).

Then, $A_{i-1}:=A_{i-2}+n^{i-1}M_{i-1}$ is calculated and stored at a data number 9 (step S1207).

Then, $F_{i-1}:=A_{i-1}^e \pmod{n^{i+1}}$ is calculated and stored at a data number 10 (step S1209).

Then, $E_i:=C-F_{i-1} \pmod{n^{i+1}}$ is calculated and stored at a data number 11 (step S1211).

Then, $B_i:=E_i/n^i$ is calculated and stored at a data number 12 (step S1213).

Then, $M_i:=(eF_{i-1})^{-1}A_{i-1}B_i \pmod{n}$ is calculated and stored at a data number 12+i (step S1215).

Then, whether the repetition completion condition i=k−1 holds or not is judged (step S1217), and if not, the loop counter i is incremented by 1 (step S1219) while $A_{i-1}$ at the data number 9 is moved to $A_{i-2}$ at the data number 8, and the operation returns to the step S1207. Otherwise, the decrypted k plaintext blocks at the data numbers 6, 13, . . . , 12+k−1 are concatenated, and the resulting plaintext M is stored at the data number 12+k (step S1221) and the operation is terminated.

According to this reception and decryption processing of the fifth embodiment, as should be apparent from a comparison of FIG. 10 and FIG. 33, nearly twice as many data memory regions as a number of plaintext blocks that are required for storing $K_i$ and $K'_i$ in the first embodiment become unnecessary, so that it is possible to save the memory regions. In addition, the program for the decryption processing becomes small and an amount of calculations required by the program also becomes less because of the use of recursive calculations, so that it becomes possible to realize the faster decryption.

Next, the operation of an authentication message generation device for the RSA type base N public key cryptosystem using the above described decryption scheme of this fifth embodiment will be described in detail.

Figure 2:
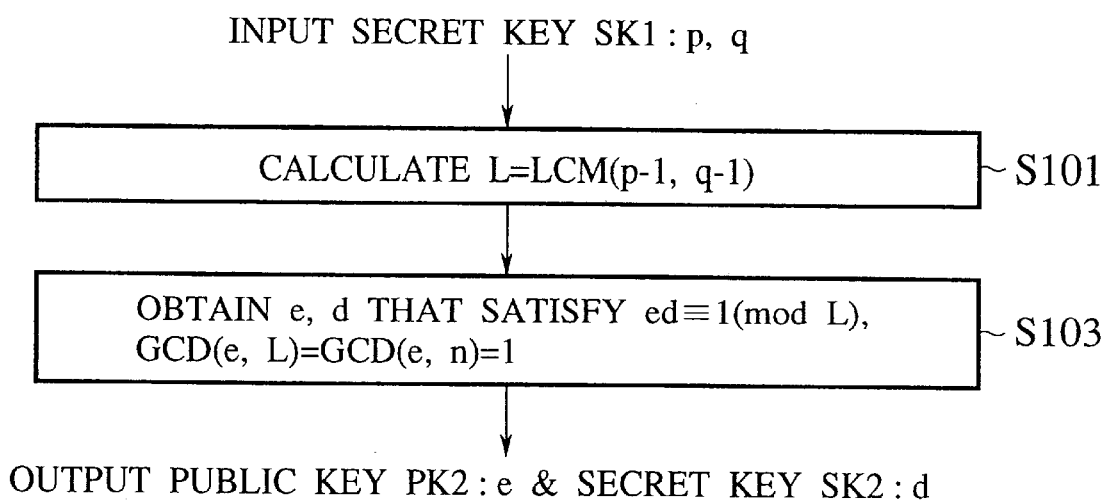
FIG. 2 is a flow chart for the operation of a key generation processing unit in the secret communication system of FIG. 1.

Here, the configurations of the authentication system, the authentication message generation device and the authentication message verification device are similar to that of FIG. 2, and the operations in the encryption processing for the lowest digit S$\emptyset$ and the authentication message verification processing are also similar to the second embodiment described above.

Figure 34:
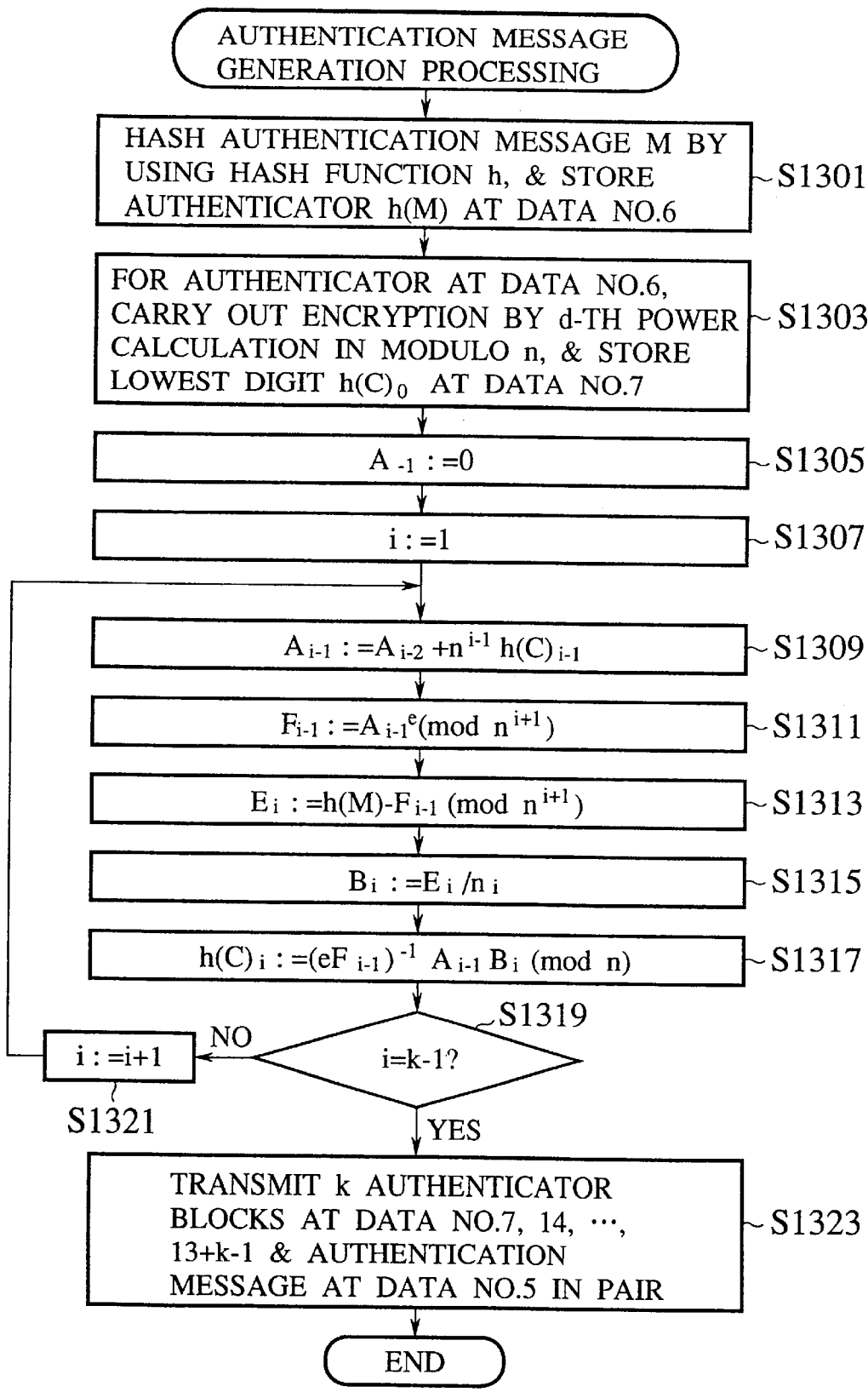
FIG. 34 is a flow chart for an RSA type authentication message generation processing in the fifth embodiment of a secret communication and authentication scheme based on a public key cryptosystem according to the present invention.

FIG. 34 shows the flow chart for the authentication message generation processing in the RSA type base N public key cryptosystem according to this fifth embodiment, while FIG. 35 shows a table indicating the data arrangement on a memory in this authentication message generation processing.

As shown in FIG. 35, in this authentication message generation processing, the public key PK1: n and the public key PK2: e are given at a data number 1, and the secret key SK2: d is given at a data number 2, and the number of partial blocks k and the partial plaintext length [$\log_2$ n] are given at data numbers 3 and 4 respectively. In addition, the authentication message M is given at a data number 5, while data numbers 6 to 13+k−1 will be used as the work areas, and the processing result of the encrypted authenticator blocks will be stored at data numbers 7 and 14 to 13+k−1.

According to FIG. 34, with respect to the authentication message M at the data number 5, the hashing using the hash function h is carried out, and the resulting authenticator h(M) is stored at a data number 6 (step S1301). Then, with respect to the authenticator h(M) at the 5 data number 6, the encryption processing using the d-th power calculation in modulo n is carried out by using the receiver's secret key SK2: d, and the resulting S$\emptyset$ which is the lowest digit of the authenticator in the base n expression is stored at a data number 7 (step S1303).

Then, a value 0 of an initialization variable $A_{-1}$ is stored at a data number 9 (step S1305), and an initial value 1 of a loop counter i is stored at a data number 8 (step S1307).

Then, $A_{i-1}:=A_{i-2}+n^{i-1}S_{i-1}$ is calculated and stored at a data number 10 (step S1309).

Then, $F_{i-1}:=A_{i-1}^e \pmod{n^{i+1}}$ is calculated and stored at a data number 11 (step S1311).

Then, $E_i:=h(M)-F_{i-1} \pmod{n^{i+1}}$ is calculated and stored at a data number 12 (step S1313).

Then, $B_i:=E_i/n^i$ is calculated and stored at a data number 13 (step S1315).

Then, $S_i:=(eF_{i-1})^{-1}A_{i-1}B_i \pmod{n}$ is calculated and stored at a data number 13+i (step S1317).

Then, whether the repetition completion condition i=k−1 holds or not is judged (step S1319), and if not, the loop counter i is incremented by 1 (step S1321) while $A_{i-1}$ at the data number 10 is moved to $A_{i-2}$ at the data number 9, and the operation returns to the step S1309. Otherwise, a set of the encrypted k authenticator blocks S$\emptyset$, $S_1$, . . . , $S_{k-1}$ at the data numbers 7, 14, 15, . . . , 13+k−1 and the authentication message M at the data number 5 are transmitted in pair (step S1323), and the operation is terminated.

According to this authentication message generation processing of the fifth embodiment, as should be apparent from a comparison of FIG. 16 and FIG. 35, nearly twice as many data memory regions as a number of plaintext blocks that are required for storing $K_i$ and $K'_i$ in the second embodiment become unnecessary, so that it is possible to save the memory regions. In addition, the program for the authenticator encryption processing becomes small and an amount of calculations required by the program also becomes less because of the use of recursive calculations, so that it becomes possible to realize the faster authenticator encryption.

Next, the operation of a decryption device for the Rabin type base N public key cryptosystem using the above described decryption scheme of this fifth embodiment will be described in detail.

Here, the configurations of the secret communication system, the encryption device and the decryption device are similar to those of FIG. 19 or FIG. 25, and the operations in the encryption processing and the decryption processing up to the decryption of the lowest digit M0 or R are also similar to the third embodiment described above.

Figure 36:
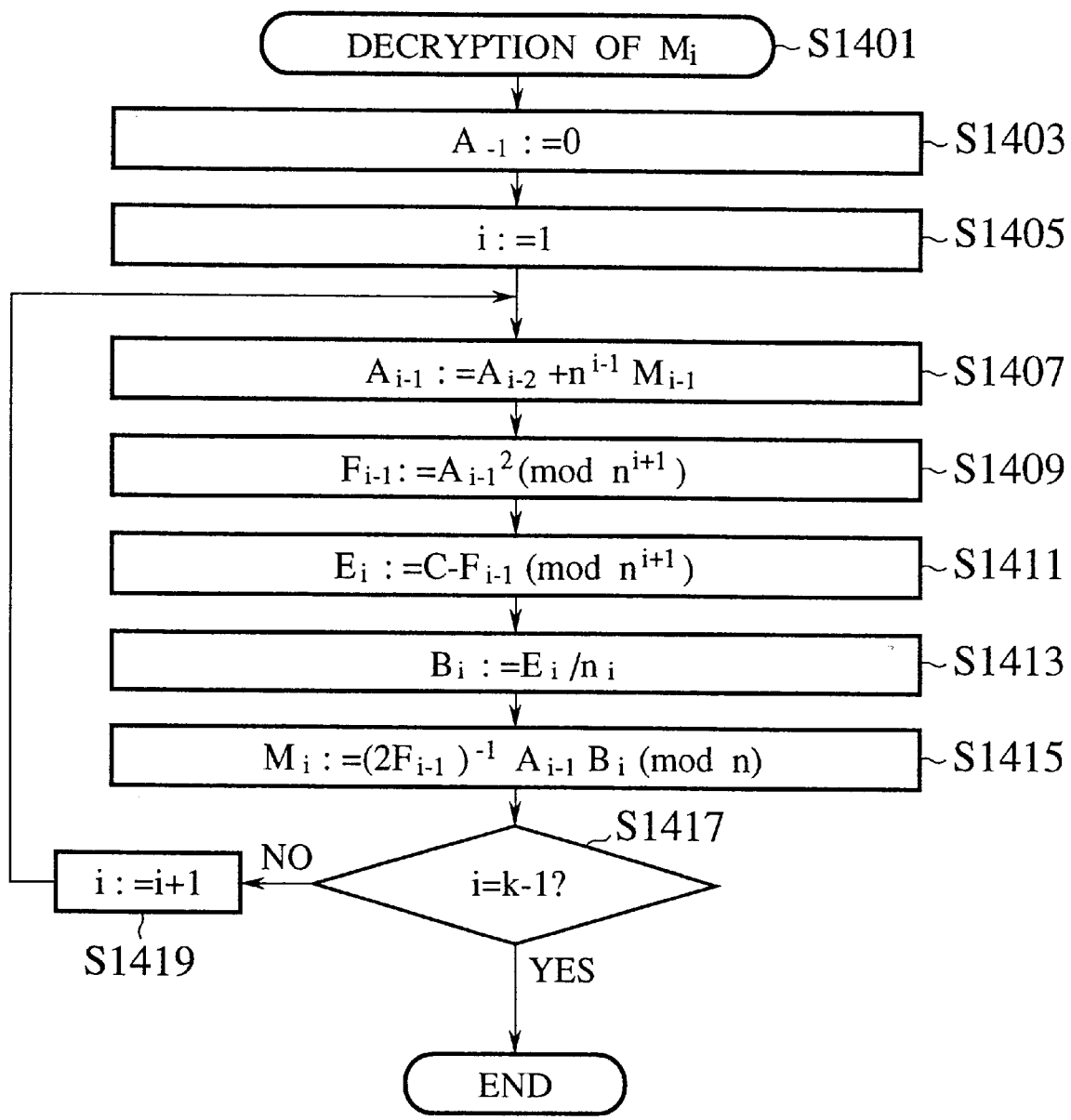
FIG. 36 is a flow chart for a Rabin type reception and decryption processing in the fifth embodiment of a secret communication and authentication scheme based on a public key cryptosystem according to the present invention.

FIG. 36 shows the flow chart for the reception and decryption processing in the Rabin type base N public key cryptosystem according to this fifth embodiment, while FIG. 37 shows a table indicating the data arrangement on a memory in this reception and decryption processing.

As shown in FIG. 37, in this reception and decryption processing, the public key PK: n and the secret key SK: p, q are given at data numbers 1 and 2 respectively, and the number of partial blocks k and the partial plaintext length $[\log_2 n]$ are given at data numbers 3 and 4 respectively. In addition, the ciphertext C is given at a data number 5, while data numbers 6 to 12+k−1 will be used as the work areas, and the decrypted plaintext will be stored at a data number 12+k.

According to FIG. 36, with respect to the ciphertext C at the data number 5, the decrypted plaintext block M0 at the lowest digit of the plaintext in the base n expression is obtained by using the public key PK: n and the secret key SK: p, q at the data numbers 1 and 2, and stored at the data number 6 (step S1401), similarly as in the step S901 of FIG. 22.

Then, a value 0 of an initialization variable $A_{-1}$ is stored at a data number 8 (step S1403), and an initial value 1 of a loop counter i is stored at a data number 7 (step S1405).

Then, $A_{i-1}:=A_{i-2}+n^{i-1}M_{i-1}$ is calculated and stored at a data number 9 (step S1407).

Then, $F_{i-1}:=A_{i-1}^2 \pmod{n^{i+1}}$ is calculated and stored at a data number 10 (step S1409).

Then, $E_i:=C-F_{i-1} \pmod{n^{i+1}}$ is calculated and stored at a data number 11 (step S1411).

Then, $B_i:=E_i/n^i$ is calculated and stored at a data number 12 (step S1413).

Then, $M_i:=(2F_{i-1})^{-1}A_{i-1}B_i \pmod{n}$ is calculated and stored at a data number 12+i (step S1415).

Then, whether the repetition completion condition i=k−1 holds or not is judged (step S1417), and if not, the loop counter i is incremented by 1 (step S1419) while $A_{i-1}$ at the data number 9 is moved to $A_{i-2}$ at the data number 8, and the operation returns to the step S1407. Otherwise, the decryption of $M_i$ is finished. Thereafter, similarly as in the step S931 of FIG. 22, the decrypted k plaintext blocks M0, $M_1$, ..., $M_{k-1}$ at the data numbers 6, 13, ..., 12+k−1 are concatenated, and the resulting plaintext M is stored at the data number 12+k.

According to this reception and decryption processing of the fifth embodiment, the program for the decryption processing becomes small and an amount of calculations required by the program also becomes less because of the use of recursive calculations, so that it becomes possible to realize the faster decryption.

Next, the operation of an authentication message generation device for the Rabin type base N public key cryptosystem using the above described decryption scheme of this fifth embodiment will be described in detail.

Here, the configurations of the authentication system, the authentication message generation device and the authentication message verification device are similar to that of FIG. 26, and the operations in the encryption processing for the lowest digit S0 and the authentication message verification processing are also similar to the fourth embodiment described above.

Figure 38:
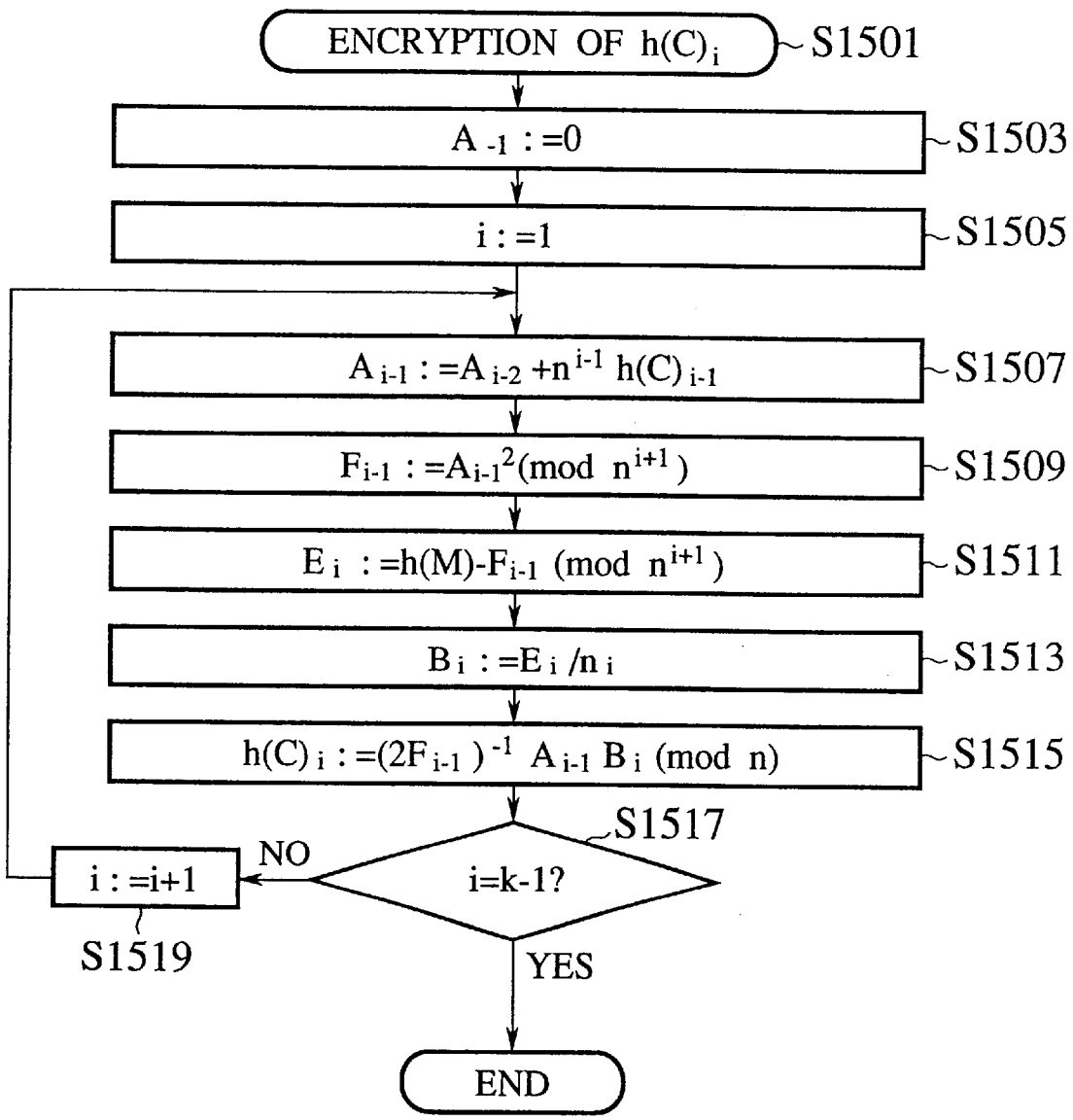
FIG. 38 is a flow chart for a Rabin type authentication message generation processing in the fifth embodiment of a secret communication and authentication scheme based on a public key cryptosystem according to the present invention.

FIG. 38 shows the flow chart for the authentication message generation processing in the Rabin type base N public key cryptosystem according to this fifth embodiment, while FIG. 39 shows a table indicating the data arrangement on a memory in this authentication message generation processing.

As shown in FIG. 39, in this authentication message generation processing, the public key PK: n is given at a data number 1, and the partial plaintext length $[\log_2 n]$ is given at a data number 4. In addition, the authentication message M is given at a data number 5, while data numbers 6 to 13+k−1 will be used as the work areas, and the generated encrypted authenticator blocks will be stored at data numbers 14 to 13+k−1.

According to FIG. 38, the operation similar to the steps S1001 to S1005 of FIG. 27 is carried out at the step S1501. Namely, with respect to the authentication message M at the data number 5, the hashing using the hash function h is carried out, and the resulting authenticator h(M) is stored at a data number 6. Then, with respect to the authenticator h(M) at the data number 6, the number of partial blocks k is obtained by dividing the authenticator h(M) by the partial plaintext length $[\log_2 n]$, and stored at the data number 3. Then, with respect to the authenticator h(M) at the data number 6, the encrypted lowest digit S0 of the authenticator in the base n expression is obtained by solving the simultaneous quadratic modular equations of $x^2 \equiv h(M) \pmod{p}$ and $x^2 \equiv h(M) \pmod{q}$, and stored at the data number 7.

Then, a value 0 of an initialization variable $A_{-1}$ is stored at a data number 9 (step S1503), and an initial value 1 of a loop counter i is stored at a data number 8 (step S1505).

Then, $A_{i-1}:=A_{i-2}+n^i S_{i-1}$ is calculated and stored at a data number 10 (step S1507).

Then, $F_{i-1}:=A_{i-1}^2 \pmod{n^{i+1}}$ is calculated and stored at a data number 11 (step S1509).

Then, $E_i:=h(M)-F_{i-1} \pmod{n^{i+1}}$ is calculated and stored at a data number 12 (step S1511).

Then, $B_i:=E_i/n^i$ is calculated and stored at a data number 13 (step S1513).

Then, $S_i:=(2F_{i-1})^{-1}A_{i-1}B_i \pmod{n}$ is calculated and stored at a data number 13+i (step S1515).

Then, whether the repetition completion condition i=k−1 holds or not is judged (step S1517), and if not, the loop counter i is incremented by 1 (step S1519) while $A_{i-1}$ at the data number 10 is moved to $A_{i-2}$ at the data number 9, and the operation returns to the step S1507. Otherwise, the encryption of the upper digits of the authenticator is finished. Thereafter, a set of the encrypted k authenticator blocks S0, $S_1$, ..., $S_{k-1}$ at the data numbers 7, 14, 15, ..., 13+k−1 and the authentication message M at the data number 5 are transmitted in pair.

According to this authentication message generation processing of the fifth embodiment, the program for the authenticator encryption processing becomes small and an amount of calculations required by the program also becomes less because of the use of recursive calculations, so that it becomes possible to realize the faster authenticator encryption.

Now, with reference to FIG. 40, differences between the RSA type base N public key cryptosystem and the Rabin type base N public key cryptosystem according to the present invention will be described from viewpoints of the key generation, the encryption, and the decryption. FIG. 40 shows a table summarizing these differences.

[Key Generation]

In the RSA type base N public key cryptosystem and the Rabin type base N public key cryptosystem, a number of keys used is different. This difference directly reflects the difference between the RSA type public key cryptosystem and the Rabin type public key cryptosystem to which the base N public key cryptosystem of the present invention is applied. Namely, the public keys n, e and the secret key d are used in the RSA type, whereas the public key n and the secret key p, q are used in the Rabin type. Note here that n=pq, ed≡1 (mod L), and L=LCM(p−1, q−1).

[Encryption]

The encryption functions used in these cryptosystems and their characteristics are as follows.

In the RSA type, the encryption is carried out by using the public keys n, e and the encryption function defined by $C \equiv M^e$ (mod $n^k$). On the other hand, in the Rabin type, the encryption is carried out by using the public key n and the encryption function defined by $C \equiv M^2$ (mod $n^k$). The RSA type which uses the exponential calculation for the encryption has a slower encryption speed than the Rabin type which uses the square calculation for the encryption. Note here that n is the public key which is used in both the RSA type and the Rabin type, while e is a key which is required only in the RSA type.

[Decryption]

The decryption functions used in these cryptosystems and their characteristics are as follows.

In the RSA type, the decryption is carried out by using the public key n, the secret key d, and the decryption function defined by $M \equiv C^d$ (mod n). On the other hand, in the Rabin type, the decryption is carried out by using the public key n and the secret key p, q and solving the quadratic modular equation $x^2 \equiv C$ in modulo p and q.

It is to be noted here that the decryption functions used in the RSA type and the Rabin type are totally different. The Rabin type cryptosystem cannot be decrypted by using the decryption function of the RSA type cryptosystem, and vice versa.

As described, according to the present invention, by using the base n expression with the public key n as a base in the encryption, it becomes possible to make the speed of the corresponding decryption considerably faster. Namely, in the present invention, a plurality of plaintext blocks are collectively encrypted by using the base n expression in the encryption processing, and in the decryption processing, the lowest digit in the base n expression is decrypted by the similar decryption function as in the conventional cryptosystem, but the upper digits other than the lowest digit are decrypted by solving the modular equations which require a significantly short calculation time than the conventionally used decryption function, while utilizing the value of the decrypted lowest digit.

Consequently, it becomes possible to provide a secret communication based on a public key cryptosystem which can considerably improve a decryption speed while maintaining an equivalent security level as the known public key cryptosystem such as RSA cryptosystem and Rabin cryptosystem.

For example, in a case of using k partial blocks, the encryption processing in the conventional RSA type public key cryptosystem uses the e-th power calculation in modulo n for each block, whereas the encryption processing in the base n public key cryptosystem of the present invention uses the e-th power calculation in modulo n for k blocks collectively but a number of bits for applying the e-th power calculation is k times larger, so that the encryption speed is substantially equivalent to the conventional case.

On the other hand, the decryption processing in the conventional RSA type public key cryptosystem uses the d-th power calculation in modulo n for each block, whereas the encryption processing in the base n public key cryptosystem of the present invention uses the d-th power calculation in modulo n only for the first block, and the modular equation calculations that require significantly shorter calculation times than the d-th power calculations for the subsequent blocks. Consequently, when a ratio of the calculation times required for the d-th power calculation and the modular equation calculation is p, a ratio of the decryption processing times for all k blocks in the conventional case and the present invention becomes k: {1+(k−1)p}. For instance, when p=0.5 and k=10, the decryption processing time required by the present invention is 45% shorter than that required by the conventional case. Thus the present invention is capable of realizing the significantly faster decryption.

Moreover, the base n public key cryptosystem of the present invention is also utilizable for the authentication processing, so that it becomes possible to provide a secret communication and authentication scheme based on a public key cryptosystem which enables a single apparatus to carry out both the secret communication and the authentication.

Note that the base n public key cryptosystem of the present invention becomes equivalent to the conventional RSA or Rabin type public key cryptosystem when a number of partial blocks k is set equal to 1.

Furthermore, when the random number of about the same bit length as the public key n is set as the first partial block while the plaintext is set to the second and subsequent partial blocks, the random nature of the random number can conceal the statistical property of the subsequent blocks in the power calculation process in the encryption processing, so that an information useful for the cryptanalysis will not be provided by the first partial block, and therefore it becomes possible to provide a secret communication and authentication scheme based on a public key cryptosystem which can resolve the problem associated with the known public key cryptosystem such as RSA cryptosystem and Rabin cryptosystem regarding the fact that a security level of the cryptosystem is considerably lowered in a case of multicast communication, a case of having a polynomial relationship between two plaintexts, a case of using a small number of bits in the plaintext, etc.

Here, the random number used in the present invention can be arbitrarily generated at a sender side of the secret communication, but it is preferable to use the same random number only once. Also, at a receiver side, the random number portion can be simply dropped from the decryption result and there is no need to share the same random number at a sender side and a receiver side, so that there is no need to provide means for notifying the random number in use.

In addition, it is also possible for the present invention to realize the decryption processing by repeating the same simpler loop calculation without using a technique for looking up a function table during the decryption processing, so that it becomes possible to save a memory capacity required for the decryption while realizing a considerably faster decryption processing.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, the encryption device, the decryption device, the authentication message generation device, and the authentication message verification device in the above described embodiments can be conveniently implemented in a form of a software package separately.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A secret communication method based on a base n public key cryptosystem using a first secret key formed by two prime numbers p and q, a second secret key d, a first public key n=pq, a second public key e, and a number of partial blocks k which is an integer greater than or equal to 2, the method comprising the steps of:

expressing a plaintext in a form of a k-digit base n number at a sender side;

obtaining a ciphertext in which the plaintext is encrypted by applying a calculation using the first public key n and the second public key e to the base n number, and transmitting the ciphertext from the sender side to a receiver side;

receiving the ciphertext and decrypting a lowest digit of the base n number from the ciphertext by using the first public key n and the second secret key d at the receiver side;

sequentially decrypting upper digits of the base n number by using a decrypted value of the lowest digit of the base n number at the receiver side; and recovering the plaintext by using decrypted values of respective digits of the base n number at the receiver side.

2. The method of claim 1, further comprising the step of:

forming the plaintext at the sender side by placing a random number of a bit length similar to that of the first public key n at a top of plaintext data.

3. An encryption method for generating a ciphertext corresponding to a plaintext based on a base n public key cryptosystem using a first secret key formed by two prime numbers p and q, a second secret key d, a first public key n=pq, a second public key e, and a number of partial blocks k which is an integer greater than or equal to 2, the method comprising the steps of:

dividing the plaintext into k plaintext blocks of a block size within a range of a residue class of n;

forming a k-digit base n number by sequentially coupling the plaintext blocks so that different digits of the base n number correspond to different plaintext blocks; and obtaining the ciphertext as an e-th power of the base n number in modulo $n^k$.

4. An article of manufacture, comprising:

a computer usable medium having computer readable program code means embodied therein for causing a computer to function as an encryption device for generating a ciphertext corresponding to a plaintext based on a base n public key cryptosystem using a first secret key formed by two prime numbers p and q, a second secret key d, a first public key n=pq, a second public key e, and a number of partial blocks k which is an integer greater than or equal to 2, the computer readable program code means including:

first computer readable program code means for causing said computer to divide the plaintext into k plaintext blocks of a block size within a range of a residue class of n;

second computer readable program code means for causing said computer to form a k-digit base n number by sequentially coupling the plaintext blocks so that different digits of the base n number correspond to different plaintext blocks; and third computer readable program code means for causing said computer to obtain the ciphertext as an e-th power of the base n number in modulo $n^k$.

5. An encryption device for generating a ciphertext corresponding to a plaintext based on a base n public key cryptosystem using a first secret key formed by two prime numbers p and q, a second secret key d, a first public key n=pq, a second public key e, and a number of partial blocks k which is an integer greater than or equal to 2, the device comprising:

a plaintext division unit for dividing the plaintext into k plaintext blocks of a block size within a range of a residue class of n;

a data coupling unit for forming a k-digit base n number by sequentially coupling the plaintext blocks so that different digits of the base n number correspond to different plaintext blocks; and an encryption unit for obtaining the ciphertext as an e-th power of the base n number in modulo $n^k$.

6. A decryption method for recovering a plaintext corresponding to a ciphertext based on a base n public key cryptosystem using a first secret key formed by two prime numbers p and q, a second secret key d, a first public key n=pq, a second public key e, and a number of partial blocks k which is an integer greater than or equal to 2, the method comprising the steps of:

obtaining a lowest digit $M_0$ of a base n number expressing the plaintext, by calculating a d-th power of the ciphertext in modulo n;

sequentially obtaining upper digits $M_i$ ($1 \leq i \leq k-1$) of the base n number by solving linear modular equations based on the lowest digit $M_0$ of the base n number in modulo n; and recovering the plaintext by sequentially concatenating the lowest digit $M_0$ and the upper digits $M_i$ of the base n number.

7. The method of claim 6, wherein at the sequentially obtaining step, the ciphertext is taken to be in a form of an e-th power of the base n number in which different digits of the base n number correspond to different plaintext blocks dividing the plaintext, and the e-th power of the base n number is expanded into a form of a (k-1)-th degree polynomial of n where coefficients of the (k-1)-th degree polynomial are expressed as polynomial functions with the plaintext blocks as variables, and the sequentially obtaining step further includes the steps of:

sequentially calculating values of the coefficients from a lower degree coefficient to a higher degree coefficient, according to the ciphertext and already obtained lower digits of the base n number; and sequentially determining the upper digits of the base n number by solving the linear modular equations in modulo n, using calculated values of the coefficients.

8. The method of claim 7, wherein the calculated values of the coefficients are stored in a coefficient table, and the sequentially determining step refers to the calculated values of the coefficients as stored in the coefficient table.

9. The method of claim 6, wherein the sequentially obtaining step sequentially obtains the upper digits $M_1$ to $M_{k-1}$ recursively by using an identical mapping or formula for obtaining each $M_i$ from $M\emptyset$ to $M_{i-1}$ by solving a linear modular equation in modulo n, using the lowest digit $M\emptyset$, the first public key n, the second public key e, the ciphertext C and the number of partial blocks k as inputs.

10. An article of manufacture, comprising:

a computer usable medium having computer readable program code means embodied therein for causing a computer to function as a decryption device for recovering a plaintext corresponding to a ciphertext based on a base n public key cryptosystem using a first secret key formed by two prime numbers p and q, a second secret key d, a first public key n=pq, a second public key e, and a number of partial blocks k which is an integer greater than or equal to 2, the computer readable program code means including:

first computer readable program code means for causing said computer to obtain a lowest digit $M\emptyset$ of a base n number expressing the plaintext, by calculating a d-th power of the ciphertext in modulo n;

second computer readable program code means for causing said computer to sequentially obtain upper digits $M_i$ ($1 \leq i \leq k-1$) of the base n number by solving linear modular equations based on the lowest digit $M\emptyset$ of the base n number in modulo n; and third computer readable program code means for causing said computer to recover the plaintext by sequentially concatenating the lowest digit $M\emptyset$ and the upper digits $M_i$ of the base n number.

11. A decryption device for recovering a plaintext corresponding to a ciphertext based on a base n public key cryptosystem using a first secret key formed by two prime numbers p and q, a second secret key d, a first public key n=pq, a second public key e, and a number of partial blocks k which is an integer greater than or equal to 2, the device comprising:

a lowest digit decryption unit for obtaining a lowest digit $M\emptyset$ of a base n number expressing the plaintext, by calculating a d-th power of the ciphertext in modulo n;

an upper digit decryption unit for sequentially obtaining upper digits $M_i$ ($1 \leq i \leq k-1$) of the base n number by solving linear modular equations based on the lowest digit $M\emptyset$ of the base n number in modulo n; and a data concatenation unit for recovering the plaintext by sequentially concatenating the lowest digit $M\emptyset$ and the upper digits $M_i$ of the base n number.

12. The device of claim 11, wherein at the upper digit decryption unit, the ciphertext is taken to be in a form of an e-th power of the base n number in which different digits of the base n number correspond to different plaintext blocks dividing the plaintext, and the e-th power of the base n number is expanded into a form of a (k−1)-th degree polynomial of n where coefficients of the (k−1)-th degree polynomial are expressed as polynomial functions with the plaintext blocks as variables, and the upper digit decryption unit further includes:

a coefficient calculation unit for sequentially calculating values of the coefficients from a lower degree coefficient to a higher degree coefficient, according to the ciphertext and already obtained lower digits of the base n number; and an upper digit calculation unit for sequentially determining the upper digits of the base n number by solving the linear modular equations in modulo n, using calculated values of the coefficients.

13. The device of claim 12, wherein the coefficient calculation unit further includes a coefficient table for storing the calculated values of the coefficients, and the upper digit calculation unit refers to the calculated values of the coefficients as stored in the coefficient table.

14. The device of claim 11, wherein the upper digit decryption unit sequentially obtains the upper digits $M_1$ to $M_{k-1}$ recursively by using an identical mapping or formula for obtaining each $M_i$ from $M\emptyset$ to $M_{i-1}$ by solving a linear modular equation in modulo n, using the lowest digit $M\emptyset$, the first public key n, the second public key e, the ciphertext C and the number of partial blocks k as inputs.

15. An authentication method based on a base n public key cryptosystem using a first secret key formed by two prime numbers p and q, a second secret key d, a first public key n=pq, a second public key e, and a number of partial blocks k which is an integer greater than or equal to 2, the method comprising the steps of:

generating an authenticator h(M) from an authentication message M at an authentication message generating side;

generating a lowest digit $S\emptyset$ of an encrypted base n authenticator S by applying a calculation using the first public key n and the second secret key d to the authenticator h(M) at the authentication message generating side;

sequentially generating upper digits $S_i$ ($1 \leq i \leq k-1$) of the encrypted base n authenticator S by using the lowest digit $S\emptyset$ at the authentication message generating side;

generating an encrypted authenticator by sequentially concatenating the lowest digit $S\emptyset$ and the upper digits $S_i$ of the encrypted base n authenticator S at the authentication message generating side;

transmitting the encrypted authenticator and the authentication message M from the authentication message generating side to an authentication message verifying side;

obtaining a decrypted authenticator by applying a calculation using the first public key n and the second public key e to the encrypted base n authenticator S obtained from the encrypted authenticator at the authentication message verifying side; and verifying an authenticity of the authentication message M by using the decrypted authenticator and the authentication message M at the authentication message verifying side.

16. An authentication message generation method for generating an encrypted authenticator corresponding to an authenticator h(M) based on a base n public key cryptosystem using a first secret key formed by two prime numbers p and q, a second secret key d, a first public key n=pq, a second public key e, and a number of partial blocks k which is an integer greater than or equal to 2, the method comprising the steps of:

generating a lowest digit S0 of an encrypted base n authenticator S as a d-th power of the authenticator h(M) in modulo n;

sequentially obtaining upper digits $S_i$ ($1 \leq i \leq k-1$) of the encrypted base n authenticator S by solving linear modular equations based on the lowest digit S0 of the encrypted base n authenticator S in modulo n; and generating the encrypted authenticator by sequentially concatenating the lowest digit S0 and the upper digits $S_i$ of the encrypted base n authenticator S.

17. The method of claim 16, wherein at the sequentially obtaining step, the authenticator h(M) is taken to be in a form of an e-th power of the encrypted base n authenticator S in which different digits of the encrypted base n authenticator S correspond to different authenticator blocks dividing the encrypted authenticator, and the e-th power of the encrypted base n authenticator S is expanded into a form of a (k−1)-th degree polynomial of n where coefficients of the (k−1)-th degree polynomial are expressed as polynomial functions with the authenticator blocks as variables, and the sequentially obtaining step further includes the steps of:

sequentially calculating values of the coefficients from a lower degree coefficient to a higher degree coefficient, according to the authenticator h(M) and already obtained lower digits of the encrypted base n authenticator S; and sequentially determining the upper digits of the encrypted base n authenticator S by solving the linear modular equations in modulo n, using calculated values of the coefficients.

18. The method of claim 17, wherein the calculated values of the coefficients are stored in a coefficient table, and the sequentially determining step refers to the calculated values of the coefficients as stored in the coefficient table.

19. The method of claim 16, wherein the sequentially obtaining step sequentially obtains the upper digits $S_1$ to $S_{k-1}$ recursively by using an identical mapping or formula for obtaining each $S_i$ from S0 to $S_{i-1}$ by solving a linear modular equation in modulo n, using the lowest digit S0, the first public key n, the second public key e, the authenticator h(M) and the number of partial blocks k as inputs.

20. An article of manufacture, comprising:

a computer usable medium having computer readable program code means embodied therein for causing a computer to function as an authentication message generation device for generating an encrypted authenticator corresponding to an authenticator h(M) based on a base n public key cryptosystem using a first secret key formed by two prime numbers p and q, a second secret key d, a first public key n=pq, a second public key e, and a number of partial blocks k which is an integer greater than or equal to 2, the computer readable program code means including:

first computer readable program code means for causing said computer to generate a lowest digit S0 of an encrypted base n authenticator S as a d-th power of the authenticator h(M) in modulo n;

second computer readable program code means for causing said computer to sequentially obtain upper digits $S_i$ ($1 \leq i \leq k-1$) of the encrypted base n authenticator S by solving linear modular equations based on the lowest digit S0 of the encrypted base n authenticator S in modulo n; and third computer readable program code means for causing said computer to generate the encrypted authenticator by sequentially concatenating the lowest digit S0 and the upper digits $S_i$ of the encrypted base n authenticator S.

21. An authentication message generation device for generating an encrypted authenticator corresponding to an authenticator h(M) based on a base n public key cryptosystem using a first secret key formed by two prime numbers p and q, a second secret key d, a first public key n=pq, a second public key e, and a number of partial blocks k which is an integer greater than or equal to 2, the device comprising:

a lowest digit encryption unit for generating a lowest digit S0 of an encrypted base n authenticator S as a d-th power of the authenticator h(M) in modulo n;

an upper digit encryption unit for sequentially obtaining upper digits $S_i$ ($1 \leq i \leq k-1$) of the encrypted base n authenticator S by solving linear modular equations based on the lowest digit S0 of the encrypted base n authenticator S in modulo n; and a data concatenation unit for generating the encrypted authenticator by sequentially concatenating the lowest digit S0 and the upper digits $S_i$ of the encrypted base n authenticator S.

22. The device of claim 21, wherein at the upper digit encryption unit, the authenticator h(M) is taken to be in a form of an e-th power of the encrypted base n authenticator S in which different digits of the encrypted base n authenticator S correspond to different authenticator blocks dividing the encrypted authenticator, and the e-th power of the encrypted base n authenticator S is expanded into a form of a (k−1)-th degree polynomial of n where coefficients of the (k−1)-th degree polynomial are expressed as polynomial functions with the authenticator blocks as variables, and the upper digit encryption unit further includes:

a coefficient calculation unit for sequentially calculating values of the coefficients from a lower degree coefficient to a higher degree coefficient, according to the authenticator h(M) and already obtained lower digits of the encrypted base n authenticator S; and an upper digit calculation unit for sequentially determining the upper digits of the encrypted base n authenticator S by solving the linear modular equations in modulo n, using calculated values of the coefficients.

23. The device of claim 22, wherein the coefficient calculation unit further includes a coefficient table for storing the calculated values of the coefficients, and the upper digit calculation unit refers to the calculated values of the coefficients as stored in the coefficient table.

24. The device of claim 21, wherein the upper digit encryption unit sequentially obtains the upper digits $S_1$ to $S_{k-1}$ recursively by using an identical mapping or formula for obtaining each $S_i$ from S0 to $S_{i-1}$ by solving a linear modular equation in modulo n, using the lowest digit S0, the first public key n, the second public key e, the authenticator h(M) and the number of partial blocks k as inputs.

25. An authentication message verification method for verifying an authenticity of an authentication message M from an encrypted authenticator based on a base n public key cryptosystem using a first secret key formed by two prime numbers p and q, a second secret key d, a first public key n=pq, a second public key e, and a number of partial blocks k which is an integer greater than or equal to 2, the method comprising the steps of:

sequentially coupling authenticator blocks dividing the encrypted authenticator to obtain an encrypted base n authenticator S so that different digits of the encrypted base n authenticator S correspond to different authenticator blocks;

obtaining a decrypted authenticator h(M) as an e-th power of the encrypted base n authenticator S in modulo $n^k$;

obtaining an authenticator h(M)' by hashing the authentication message M; and comparing the decrypted authenticator h(M) and the authenticator h(M)', and judging that an authentication is success when the decrypted authenticator h(M) and the authenticator h(M)' match or that an authentication is failure otherwise.

26. An article of manufacture, comprising:

a computer usable medium having computer readable program code means embodied therein for causing a computer to function as an authentication message verification method for verifying an authenticity of an authentication message M from an encrypted authenticator based on a base n public key cryptosystem using a first secret key formed by two prime numbers p and q, a second secret key d, a first public key n=pq, a second public key e, and a number of partial blocks k which is an integer greater than or equal to 2, the computer readable program code means including:

first computer readable program code means for causing said computer to sequentially couple authenticator blocks dividing the encrypted authenticator to obtain an encrypted base n authenticator S so that different digits of the encrypted base n authenticator S correspond to different authenticator blocks;

second computer readable program code means for causing said computer to obtain a decrypted authenticator h(M) as an e-th power of the encrypted base n authenticator S in modulo $n^k$;

third computer readable program code means for causing said computer to obtain an authenticator h(M)' by hashing the authentication message M; and fourth computer readable program code means for causing said computer to compare the decrypted authenticator h(M) and the authenticator h(M)', and judge that an authentication is success when the decrypted authenticator h(M) and the authenticator h(M)' match or that an authentication is failure otherwise.

27. An authentication message verification device for verifying an authenticity of an authentication message M from an encrypted authenticator based on a base n public key cryptosystem using a first secret key formed by two prime numbers p and q, a second secret key d, a first public key n=pq, a second public key e, and a number of partial blocks k which is an integer greater than or equal to 2, the device comprising:

a data coupling unit for sequentially coupling authenticator blocks dividing the encrypted authenticator to obtain an encrypted base n authenticator S so that different digits of the encrypted base n authenticator S correspond to different authenticator blocks;

an authenticator decryption unit for obtaining a decrypted authenticator h(M) as an e-th power of the encrypted base n authenticator S in modulo $n^k$;

an authentication message hashing unit for obtaining an authenticator h(M)' by hashing the authentication message M; and a matching judgement unit for comparing the decrypted authenticator h(M) and the authenticator h(M)', and judging that an authentication is success when the decrypted authenticator h(M) and the authenticator h(M)' match or that an authentication is failure otherwise.

28. A secret communication method based on a base n public key cryptosystem using a secret key formed by two prime numbers p and q, a public key n=pq, and a number of partial blocks k which is an integer greater than or equal to 2, the method comprising the steps of:

expressing a plaintext in a form of a k-digit base n number at a sender side;

obtaining a ciphertext in which the plaintext is encrypted by applying a calculation using the public key n and the number of partial blocks k to the base n number, and transmitting the ciphertext from the sender side to a receiver side;

receiving the ciphertext and decrypting a lowest digit of the base n number from the ciphertext by using the public key n and the secret key p, q at the receiver side;

sequentially decrypting upper digits of the base n number by using a decrypted value of the lowest digit of the base n number at the receiver side; and recovering the plaintext by using decrypted values of respective digits of the base n number at the receiver side.

29. The method of claim 28, further comprising the step of:

forming the plaintext at the sender side by placing a random number of a bit length similar to that of the first public key n at a top of plaintext data.

30. An encryption method for generating a ciphertext corresponding to a plaintext based on a base n public key cryptosystem using a secret key formed by two prime numbers p and q, a public key n=pq, and a number of partial blocks k which is an integer greater than or equal to 2, the method comprising the steps of:

dividing the plaintext into k plaintext blocks of a block size within a range of a residue class of n;

forming a k-digit base n number by sequentially coupling the plaintext blocks so that different digits of the base n number correspond to different plaintext blocks; and obtaining the ciphertext as a square of the base n number in modulo $n^k$.

31. An article of manufacture, comprising:

a computer usable medium having computer readable program code means embodied therein for causing a computer to function as an encryption device for generating a ciphertext corresponding to a plaintext based on a base n public key cryptosystem using a secret key formed by two prime numbers p and q, a public key n=pq, and a number of partial blocks k which is an integer greater than or equal to 2, the computer readable program code means including:

first computer readable program code means for causing said computer to divide the plaintext into k plaintext blocks of a block size within a range of a residue class of n;

second computer readable program code means for causing said computer to form a k-digit base n number by sequentially coupling the plaintext blocks so that different digits of the base n number correspond to different plaintext blocks; and third computer readable program code means for causing said computer to obtain the ciphertext as a square of the base n number in modulo $n^k$.

32. An encryption device for generating a ciphertext corresponding to a plaintext based on a base n public key cryptosystem using a secret key formed by two prime numbers p and q, a public key n=pq, and a number of partial blocks k which is an integer greater than or equal to 2, the device comprising:

a plaintext division unit for dividing the plaintext into k plaintext blocks of a block size within a range of a residue class of n;

a data coupling unit for forming a k-digit base n number by sequentially coupling the plaintext blocks so that different digits of the base n number correspond to different plaintext blocks; and an encryption unit for obtaining the ciphertext as a square of the base n number in modulo $n^k$.

33. A decryption method for recovering a plaintext corresponding to a ciphertext based on a base n public key cryptosystem using a secret key formed by two prime numbers p and q, a public key n=pq, and a number of partial blocks k which is an integer greater than or equal to 2, the method comprising the steps of:

obtaining a lowest digit $M_0$ of a base n number expressing the plaintext, by solving simultaneous modular equations for finding a number whose square in modulo p and whose square in modulo q are both equal to the ciphertext;

sequentially obtaining upper digits $M_i$ ($1 \leq i \leq k-1$) of the base n number by solving linear modular equations based on the lowest digit $M_0$ of the base n number in modulo n; and recovering the plaintext by sequentially concatenating the lowest digit $M_0$ and the upper digits $M_i$ of the base n number.

34. The method of claim 33, wherein at the sequentially obtaining step, the ciphertext is taken to be in a form of a square of the base n number in which different digits of the base n number correspond to different plaintext blocks dividing the plaintext, and the square of the base n number is expanded into a form of a (k-1)-th degree polynomial of n where coefficients of the (k-1)-th degree polynomial are expressed as polynomial functions with the plaintext blocks as variables, and the sequentially obtaining step further includes the steps of:

sequentially formulating the linear modular equations with the plaintext blocks as variables in modulo n, according to the ciphertext and already obtained lower digits of the base n number; and sequentially determining the upper digits of the base n number by solving the linear modular equations in modulo n.

35. The method of claim 33, wherein the sequentially obtaining step sequentially obtains the upper digits $M_1$ to $M_{k-1}$ recursively by using an identical mapping or formula for obtaining each $M_i$ from $M_0$ to $M_{i-1}$ by solving a linear modular equation in modulo n, using the lowest digit $M_0$, the public key n, the ciphertext C and the number of partial blocks k as inputs.

36. An article of manufacture, comprising:

a computer usable medium having computer readable program code means embodied therein for causing a computer to function as a decryption device for recovering a plaintext corresponding to a ciphertext based on a base n public key cryptosystem using a secret key formed by two prime numbers p and q, a public key n=pq, and a number of partial blocks k which is an integer greater than or equal to 2, the computer readable program code means including:

first computer readable program code means for causing said computer to obtain a lowest digit $M_0$ of a base n number expressing the plaintext, by solving simultaneous modular equations for finding a number whose square in modulo p and whose square in modulo q are both equal to the ciphertext;

second computer readable program code means for causing said computer to sequentially obtain upper digits $M_i$ ($1 \leq i \leq k-1$) of the base n number by solving linear modular equations based on the lowest digit $M_0$ of the base n number in modulo n; and third computer readable program code means for causing said computer to recover the plaintext by sequentially concatenating the lowest digit $M_0$ and the upper digits $M_i$ of the base n number.

37. A decryption device for recovering a plaintext corresponding to a ciphertext based on a base n public key cryptosystem using a secret key formed by two prime numbers p and q, a public key n=pq, and a number of partial blocks k which is an integer greater than or equal to 2, the device comprising:

a lowest digit decryption unit for obtaining a lowest digit $M_0$ of a base n number expressing the plaintext, by solving simultaneous modular equations for finding a number whose square in modulo p and whose square in modulo q are both equal to the ciphertext;

an upper digit decryption unit for sequentially obtaining upper digits $M_i$ ($1 \leq i \leq k-1$) of the base n number by solving linear modular equations based on the lowest digit $M_0$ of the base n number in modulo n; and a data concatenation unit for recovering the plaintext by sequentially concatenating the lowest digit $M_0$ and the upper digits $M_i$ of the base n number.

38. The device of claim 37, wherein at the upper digit decryption unit, the ciphertext is taken to be in a form of a square of the base n number in which different digits of the base n number correspond to different plaintext blocks dividing the plaintext, and the square of the base n number is expanded into a form of a (k-1)-th degree polynomial of n where coefficients of the (k-1)-th degree polynomial are expressed as polynomial functions with the plaintext blocks as variables, and the upper digit decryption unit sequentially obtains the upper digits of the base n number by:

sequentially formulating the linear modular equations with the plaintext blocks as variables in modulo n, according to the ciphertext and already obtained lower digits of the base n number; and sequentially determining the upper digits of the base n number by solving the linear modular equations in modulo n.

39. The device of claim 37, wherein the upper digit decryption unit sequentially obtains the upper digits $M_1$ to $M_{k-1}$ recursively by using an identical mapping or formula for obtaining each $M_i$ from $M_0$ to $M_{i-1}$ by solving a linear modular equation in modulo n, using the lowest digit $M_0$, the public key n, the ciphertext C and the number of partial blocks k as inputs.

40. An authentication method based on a base n public key cryptosystem using a secret key formed by two prime numbers p and q, a public key n=pq, and a number of partial blocks k which is an integer greater than or equal to 2, the method comprising the steps of:

generating an authenticator h(M) from an authentication message M at an authentication message generating side;

generating a lowest digit $S_0$ of an encrypted base n authenticator S by applying a calculation using the public key n and the secret key p, q to the authenticator h(M) at the authentication message generating side;

sequentially generating upper digits $S_i$ ($1 \leq i \leq k-1$) of the encrypted base n authenticator S by using the lowest digit $S_0$ at the authentication message generating side;

generating an encrypted authenticator by sequentially concatenating the lowest digit S0 and the upper digits $S_i$ of the encrypted base n authenticator S at the authentication message generating side;

transmitting the encrypted authenticator and the authentication message M from the authentication message generating side to an authentication message verifying side;

obtaining a decrypted authenticator by applying a calculation using the public key n and the number of partial blocks k to the encrypted base n authenticator S obtained from the encrypted authenticator at the authentication message verifying side; and verifying an authenticity of the authentication message M by using the decrypted authenticator and the authentication message M at the authentication message verifying side.

41. An authentication message generation method for generating an encrypted authenticator corresponding to an authenticator h(M) based on a base n public key cryptosystem using a secret key formed by two prime numbers p and q, a public key n=pq, and a number of partial blocks k which is an integer greater than or equal to 2, the method comprising the steps of:

generating a lowest digit S0 of an encrypted base n authenticator S by solving simultaneous modular equations for finding a number whose square in modulo p and whose square in modulo q are both equal to the ciphertext;

sequentially obtaining upper digits $S_i$ ($1 \leq i \leq k-1$) of the encrypted base n authenticator S by solving linear modular equations based on the lowest digit S0 of the encrypted base n authenticator S in modulo n; and generating the encrypted authenticator by sequentially concatenating the lowest digit S0 and the upper digits $S_i$ of the encrypted base n authenticator S.

42. The method of claim 41, wherein at the sequentially obtaining step, the authenticator h(M) is taken to be in a form of a square of the encrypted base n authenticator S in which different digits of the encrypted base n authenticator S correspond to different authenticator blocks dividing the encrypted authenticator, and the square of the encrypted base n authenticator S is expanded into a form of a (k−1)-th degree polynomial of n where coefficients of the (k−1)-th degree polynomial are expressed as polynomial functions with the authenticator blocks as variables, and the sequentially obtaining step further includes the steps of:

sequentially formulating the linear modular equations with the authenticator blocks as variables in modulo n, according to the authenticator h(M) and already obtained lower digits of the encrypted base n authenticator S; and sequentially determining the upper digits of the encrypted base n authenticator S by solving the linear modular equations in modulo n.

43. The method of claim 41, wherein the sequentially obtaining step sequentially obtains the upper digits $S_1$ to $S_{k-1}$ recursively by using an identical mapping or formula for obtaining each $S_i$ from S0 to $S_{i-1}$ by solving a linear modular equation in modulo n, using the lowest digit S0, the public key n, the authenticator h(M) and the number of partial blocks k as inputs.

44. An article of manufacture, comprising:

a computer usable medium having computer readable program code means embodied therein for causing a computer to function as an authentication message generation device for generating an encrypted authenticator corresponding to an authenticator h(M) based on a base n public key cryptosystem using a secret key formed by two prime numbers p and q, a public key n=pq, and a number of partial blocks k which is an integer greater than or equal to 2, the computer readable program code means including:

first computer readable program code means for causing said computer to generate a lowest digit S0 of an encrypted base n authenticator S by solving simultaneous modular equations for finding a number whose square in modulo p and whose square in modulo q are both equal to the ciphertext;

second computer readable program code means for causing said computer to sequentially obtain upper digits $S_i$ ($1 \leq i \leq k-1$) of the encrypted base n authenticator S by solving linear modular equations based on the lowest digit S0 of the encrypted base n authenticator S in modulo n; and third computer readable program code means for causing said computer to generate the encrypted authenticator by sequentially concatenating the lowest digit S0 and the upper digits $S_i$ of the encrypted base n authenticator S.

45. An authentication message generation device for generating an encrypted authenticator corresponding to an authenticator h(M) based on a base n public key cryptosystem using a secret key formed by two prime numbers p and q, a public key n=pq, and a number of partial blocks k which is an integer greater than or equal to 2, the device comprising:

a lowest digit encryption unit for generating a lowest digit S0 of an encrypted base n authenticator S by solving simultaneous modular equations for finding a number whose square in modulo p and whose square in modulo q are both equal to the ciphertext;

an upper digit encryption unit for sequentially obtaining upper digits $S_i$ ($1 \leq i \leq k-1$) of the encrypted base n authenticator S by solving linear modular equations based on the lowest digit S0 of the encrypted base n authenticator S in modulo n; and a data concatenation unit for generating the encrypted authenticator by sequentially concatenating the lowest digit S0 and the upper digits $S_i$ of the encrypted base n authenticator S.

46. The device of claim 45, wherein at the upper digit encryption unit, the authenticator h(M) is taken to be in a form of a square of the encrypted base n authenticator S in which different digits of the encrypted base n authenticator S correspond to different authenticator blocks dividing the encrypted authenticator, and the square of the encrypted base n authenticator S is expanded into a form of a (k−1)-th degree polynomial of n where coefficients of the (k−1)-th degree polynomial are expressed as polynomial functions with the authenticator blocks as variables, and the upper digit encryption unit sequentially obtains the upper digits of the encrypted base n authenticator S by:

sequentially formulating the linear modular equations with the authenticator blocks as variables in modulo n, according to the authenticator h(M) and already obtained lower digits of the encrypted base n authenticator S; and sequentially determining the upper digits of the encrypted base n authenticator S by solving the linear modular equations in modulo n.

47. The device of claim 45, wherein the upper digit encryption unit sequentially obtains the upper digits $S_1$ to $S_{k-1}$ recursively by using an identical mapping or formula for obtaining each $S_i$ from $S0$ to $S_{i-1}$ by solving a linear modular equation in modulo n, using the lowest digit $S0$, the public key n, the authenticator h(M) and the number of partial blocks k as inputs.

48. An authentication message verification method for verifying an authenticity of an authentication message M from an encrypted authenticator based on a base n public key cryptosystem using a secret key formed by two prime numbers p and q, a public key n=pq, and a number of partial blocks k which is an integer greater than or equal to 2, the method comprising the steps of:

sequentially coupling authenticator blocks dividing the encrypted authenticator to obtain an encrypted base n authenticator S so that different digits of the encrypted base n authenticator S correspond to different authenticator blocks;

obtaining a decrypted authenticator h(M) as a square of the encrypted base n authenticator S in modulo $n^k$;

obtaining an authenticator h(M)' by hashing the authentication message M; and comparing the decrypted authenticator h(M) and the authenticator h(M)', and judging that an authentication is success when the decrypted authenticator h(M) and the authenticator h(M)' match or that an authentication is failure otherwise.

49. An article of manufacture, comprising:

a computer usable medium having computer readable program code means embodied therein for causing a computer to function as an authentication message verification method for verifying an authenticity of an authentication message M from an encrypted authenticator based on a base n public key cryptosystem using a secret key formed by two prime numbers p and q, a public key n=pq, and a number of partial blocks k which is an integer greater than or equal to 2, the computer readable program code means including:

first computer readable program code means for causing said computer to sequentially couple authenticator blocks dividing the encrypted authenticator to obtain an encrypted base n authenticator S so that different digits of the encrypted base n authenticator S correspond to different authenticator blocks;

second computer readable program code means for causing said computer to obtain a decrypted authenticator h(M) as a square of the encrypted base n authenticator S in modulo $n^k$;

third computer readable program code means for causing said computer to obtain an authenticator h(M)' by hashing the authentication message M; and fourth computer readable program code means for causing said computer to compare the decrypted authenticator h(M) and the authenticator h(M)', and judge that an authentication is success when the decrypted authenticator h(M) and the authenticator h(M)' match or that an authentication is failure otherwise.

50. An authentication message verification device for verifying an authenticity of an authentication message M from an encrypted authenticator based on a base n public key cryptosystem using a secret key formed by two prime numbers p and q, a public key n=pq, and a number of partial blocks k which is an integer greater than or equal to 2, the device comprising:

a data coupling unit for sequentially coupling authenticator blocks dividing the encrypted authenticator to obtain an encrypted base n authenticator S so that different digits of the encrypted base n authenticator S correspond to different authenticator blocks;

an authenticator decryption unit for obtaining a decrypted authenticator h(M) as a square of the encrypted base n authenticator S in modulo $n^k$;

an authentication message hashing unit for obtaining an authenticator h(M)' by hashing the authentication message M; and a matching judgement unit for comparing the decrypted authenticator h(M) and the authenticator h(M)', and judging that an authentication is success when the decrypted authenticator h(M) and the authenticator h(M)' match or that an authentication is failure otherwise.

* * * * *